US009709972B2

(12) United States Patent
Gazdzinski

(10) Patent No.: US 9,709,972 B2
(45) Date of Patent: *Jul. 18, 2017

(54) COMPUTERIZED INFORMATION AND DISPLAY APPARATUS WITH REMOTE ENVIRONMENT CONTROL

(71) Applicant: West View Research, LLC, San Diego, CA (US)

(72) Inventor: Robert F. Gazdzinski, San Diego, CA (US)

(73) Assignee: WEST VIEW RESEARCH, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,506

(22) Filed: Dec. 16, 2016

(65) Prior Publication Data

US 2017/0115643 A1    Apr. 27, 2017

Related U.S. Application Data

(60) Division of application No. 15/230,466, filed on Aug. 7, 2016, now abandoned, which is a continuation of
(Continued)

(51) Int. Cl.
*G10L 15/00* (2013.01)
*G05B 15/02* (2006.01)
(Continued)

(52) U.S. Cl.
CPC .......... *G05B 15/02* (2013.01); *G06F 3/0482* (2013.01); *G06F 3/0488* (2013.01); *G06F 3/167* (2013.01);
(Continued)

(58) Field of Classification Search
CPC .......... G10L 15/22; H04W 8/10; G06F 3/167; G01C 21/206
(Continued)

(56) References Cited

U.S. PATENT DOCUMENTS 3,358,270 A    12/1967 Crew et al.
3,388,376 A    6/1968 Magee
(Continued)

FOREIGN PATENT DOCUMENTS

DE    3440177 A1    5/1986
DE    19709518 C1    3/1998
(Continued)

OTHER PUBLICATIONS

Abowd, Context-Awareness in Wearable and Ubiquitous Computing, IEEE, 1997.
(Continued)

*Primary Examiner* — Daniel Abebe
(74) *Attorney, Agent, or Firm* — Gazdzinski & Associates, PC

(57) ABSTRACT

A computerized information apparatus useful for providing information to a user via a display. In one embodiment, the apparatus comprises a processor apparatus, and first wireless interface, radio frequency apparatus, and at least one computer program configured to run on the processor apparatus, the at least one program being configured to enable functions within a transport device including remote control of environment functions (e.g., HVAC, lighting, imagery capture) based on authentication of a user carrying a portable radio frequency device.

30 Claims, 24 Drawing Sheets

Related U.S. Application Data application No. 13/733,098, filed on Jan. 2, 2013, now Pat. No. 9,412,367, which is a continuation of application No. 13/369,850, filed on Feb. 9, 2012, now Pat. No. 8,447,612, which is a continuation of application No. 12/711,692, filed on Feb. 24, 2010, now Pat. No. 8,117,037, which is a continuation of application No. 11/506,975, filed on Aug. 17, 2006, now Pat. No. 7,711,565, which is a division of application No. 10/935,957, filed on Sep. 7, 2004, now Pat. No. 7,093,693, which is a division of application No. 10/651,451, filed on Aug. 29, 2003, now Pat. No. 6,988,071, which is a continuation of application No. 09/330,101, filed on Jun. 10, 1999, now Pat. No. 6,615,175.

(51) Int. Cl.

| | | |
|---|---|---|
| *G06F 3/0482* | (2013.01) | |
| *G06F 3/0488* | (2013.01) | |
| *G06F 3/16* | (2006.01) | |
| *H04L 29/06* | (2006.01) | |
| *H04N 7/18* | (2006.01) | |
| *H04W 12/06* | (2009.01) | |
| *G06F 3/044* | (2006.01) | |
| *G06F 17/22* | (2006.01) | |

(52) U.S. Cl.
CPC ............ *H04L 67/42* (2013.01); *H04N 7/181* (2013.01); *H04W 12/06* (2013.01); *G06F 3/044* (2013.01); *G06F 17/2235* (2013.01); *G06F 2203/0383* (2013.01)

(58) Field of Classification Search
USPC .......................................... 704/275; 701/533
See application file for complete search history.

(56) References Cited

U.S. PATENT DOCUMENTS

| | | | |
|---|---|---|---|
| 3,733,608 A | 5/1973 | McGhay et al. | |
| 3,742,133 A | 6/1973 | O Sullivan | |
| 4,050,063 A | 9/1977 | Schull | |
| 4,075,632 A | 2/1978 | Baldwin et al. | |
| 4,149,614 A | 4/1979 | Mandel et al. | |
| 4,401,971 A | 8/1983 | Saito et al. | |
| 4,451,901 A | 5/1984 | Wolfe et al. | |
| 4,534,056 A | 8/1985 | Feilchenfeld et al. | |
| 4,558,300 A | 12/1985 | Goldman | |
| 4,577,177 A | 3/1986 | Marubashi | |
| 4,623,874 A | 11/1986 | Thoma | |
| 4,677,569 A | 6/1987 | Nakano et al. | |
| 4,691,202 A | 9/1987 | Denne et al. | |
| 4,692,769 A | 9/1987 | Gegan | |
| 4,708,224 A | 11/1987 | Schrooder | |
| 4,749,062 A | 6/1988 | Tsuji et al. | |
| 4,816,658 A | 3/1989 | Khandwala et al. | |
| 4,819,174 A | 4/1989 | Furuno et al. | |
| 4,837,822 A | 6/1989 | Crosley et al. | |
| 4,868,915 A | 9/1989 | Anderson, III et al. | |
| 4,926,182 A | 5/1990 | Ohta et al. | |
| 4,935,962 A | 6/1990 | Austin | |
| 4,954,959 A | 9/1990 | Moroto et al. | |
| 4,962,473 A | 10/1990 | Crain | |
| 4,979,593 A | 12/1990 | Watanabe et al. | |
| 4,995,479 A | 2/1991 | Fujiwara et al. | |
| 5,027,104 A | 6/1991 | Reid | |
| 5,035,563 A | 7/1991 | Mezey | |
| 5,038,283 A | 8/1991 | Caveney | |
| 5,042,620 A | 8/1991 | Yoneda et al. | |
| 5,053,774 A | 10/1991 | Schuermann et al. | |
| 5,055,968 A | 10/1991 | Nishi et al. | |
| 5,056,629 A | 10/1991 | Tsuji et al. | |
| 5,079,411 A | 1/1992 | Lee | |
| 5,085,450 A | 2/1992 | DeHart, Sr. | |
| 5,086,450 A | 2/1992 | Kitagawa et al. | |
| 5,115,398 A | 5/1992 | De Jong | |
| 5,121,407 A | 6/1992 | Partyka et al. | |
| 5,131,508 A | 7/1992 | Suzuki | |
| 5,155,689 A | 10/1992 | Wortham | |
| 5,159,163 A | 10/1992 | Bahjat et al. | |
| 5,182,570 A | 1/1993 | Nysen et al. | |
| 5,200,583 A | 4/1993 | Kupersmith et al. | |
| 5,202,759 A | 4/1993 | Laycock | |
| 5,235,633 A * | 8/1993 | Dennison ........... | H04B 7/18541 342/357.29 |
| 5,255,341 A | 10/1993 | Nakajima | |
| 5,257,314 A | 10/1993 | Kimura | |
| 5,258,837 A | 11/1993 | Gormley | |
| 5,274,560 A | 12/1993 | LaRue | |
| 5,283,559 A | 2/1994 | Kalendra et al. | |
| 5,283,731 A | 2/1994 | Lalonde et al. | |
| 5,287,266 A | 2/1994 | Malec et al. | |
| 5,293,029 A | 3/1994 | Iijima | |
| 5,295,064 A | 3/1994 | Malec et al. | |
| 5,296,064 A | 3/1994 | Muzzy et al. | |
| 5,320,561 A | 6/1994 | Cook et al. | |
| 5,334,974 A | 8/1994 | Simms et al. | |
| 5,357,596 A | 10/1994 | Takebayashi et al. | |
| 5,374,930 A | 12/1994 | Schuermann | |
| 5,406,490 A | 4/1995 | Braegas | |
| 5,414,432 A | 5/1995 | Penny, Jr. et al. | |
| 5,414,439 A | 5/1995 | Groves et al. | |
| 5,441,901 A | 8/1995 | Candelaria | |
| 5,444,444 A | 8/1995 | Ross | |
| 5,446,447 A | 8/1995 | Carney et al. | |
| 5,448,110 A | 9/1995 | Tuttle et al. | |
| 5,448,625 A | 9/1995 | Lederman | |
| 5,450,086 A | 9/1995 | Kaiser | |
| 5,463,209 A | 10/1995 | Figh et al. | |
| 5,465,099 A | 11/1995 | Mitsui et al. | |
| 5,467,099 A | 11/1995 | Bonebright et al. | |
| 5,485,897 A | 1/1996 | Matsumoto et al. | |
| 5,491,484 A | 2/1996 | Schuermann | |
| 5,491,715 A | 2/1996 | Flaxl | |
| 5,512,910 A | 4/1996 | Murakami et al. | |
| 5,528,222 A | 6/1996 | Moskowitz et al. | |
| 5,537,105 A | 7/1996 | Marsh et al. | |
| 5,539,775 A | 7/1996 | Tuttle et al. | |
| 5,551,532 A | 9/1996 | Kupersmith | |
| 5,552,806 A | 9/1996 | Lenchik | |
| 5,555,286 A | 9/1996 | Tendler | |
| 5,557,254 A | 9/1996 | Johnson et al. | |
| 5,561,435 A | 10/1996 | Nalbandian et al. | |
| 5,561,704 A * | 10/1996 | Salimando ........... | G01S 5/0027 342/457 |
| 5,572,226 A | 11/1996 | Tuttle | |
| 5,574,443 A | 11/1996 | Hsieh | |
| 5,584,070 A | 12/1996 | Harris et al. | |
| 5,598,534 A | 1/1997 | Haas | |
| 5,604,143 A | 2/1997 | Ishida et al. | |
| 5,606,154 A | 2/1997 | Doigan et al. | |
| 5,606,323 A | 2/1997 | Heinrich et al. | |
| 5,621,412 A | 4/1997 | Sharpe et al. | |
| 5,629,981 A | 5/1997 | Nerlikar | |
| 5,638,425 A | 6/1997 | Meador, III et al. | |
| 5,648,768 A | 7/1997 | Bouve | |
| 5,649,296 A | 7/1997 | MacLellan et al. | |
| 5,677,993 A | 10/1997 | Ohga et al. | |
| 5,682,139 A | 10/1997 | Pradeep et al. | |
| 5,682,143 A | 10/1997 | Brady et al. | |
| 5,682,525 A | 10/1997 | Bouve et al. | |
| 5,689,094 A | 11/1997 | Friedli et al. | |
| 5,694,335 A | 12/1997 | Hollenberg | |
| 5,701,121 A | 12/1997 | Murdoch | |
| 5,710,884 A | 1/1998 | Dedrick | |
| 5,712,623 A | 1/1998 | Kumai et al. | |
| 5,717,824 A | 2/1998 | Chhatwal | |
| 5,726,630 A | 3/1998 | Marsh et al. | |
| 5,737,485 A | 4/1998 | Flanagan et al. | |
| 5,742,509 A | 4/1998 | Goldberg et al. | |
| 5,745,036 A | 4/1998 | Clare | |

(56) References Cited

U.S. PATENT DOCUMENTS

| | | |
|---|---|---|
| 5,745,776 A | 4/1998 | Sheppard, II |
| 5,748,841 A | 5/1998 | Morin et al. |
| 5,749,443 A | 5/1998 | Romao |
| 5,758,072 A | 5/1998 | Filepp et al. |
| 5,758,088 A | 5/1998 | Bezaire et al. |
| 5,761,662 A | 6/1998 | Dasan |
| 5,769,051 A | 6/1998 | Bayron et al. |
| 5,774,859 A | 6/1998 | Houser et al. |
| 5,790,946 A | 8/1998 | Rotzoll |
| 5,809,471 A | 9/1998 | Brodsky |
| 5,818,021 A | 10/1998 | Szewczykowski |
| 5,819,201 A | 10/1998 | DeGraaf |
| 5,819,227 A | 10/1998 | Obuchi |
| 5,819,284 A | 10/1998 | Farber et al. |
| 5,842,145 A | 11/1998 | Zimmer |
| 5,844,181 A | 12/1998 | Amo et al. |
| 5,844,601 A | 12/1998 | McPheely et al. |
| 5,850,187 A | 12/1998 | Carrender et al. |
| 5,852,421 A | 12/1998 | Maldonado |
| 5,852,775 A | 12/1998 | Hidary |
| 5,859,628 A | 1/1999 | Ross et al. |
| 5,887,139 A | 3/1999 | Madison, Jr. et al. |
| 5,892,441 A | 4/1999 | Woolley et al. |
| 5,894,266 A | 4/1999 | Wood, Jr. et al. |
| 5,900,808 A | 5/1999 | Lebo |
| 5,901,211 A | 5/1999 | Dean et al. |
| 5,903,317 A | 5/1999 | Sharir et al. |
| 5,907,286 A | 5/1999 | Kuma |
| 5,908,469 A | 6/1999 | Botz et al. |
| 5,915,239 A | 6/1999 | Haavisto et al. |
| 5,917,405 A | 6/1999 | Joao |
| 5,917,433 A | 6/1999 | Keillor et al. |
| 5,918,222 A | 6/1999 | Fukui et al. |
| 5,923,298 A | 7/1999 | Miyahara et al. |
| 5,926,624 A | 7/1999 | Katz et al. |
| 5,932,853 A | 8/1999 | Friedli et al. |
| 5,943,624 A | 8/1999 | Fox et al. |
| 5,948,040 A | 9/1999 | DeLorme et al. |
| 5,951,620 A * | 9/1999 | Ahrens ............... G01C 21/26 701/450 |
| 5,955,710 A | 9/1999 | DiFranza |
| 5,959,357 A | 9/1999 | Korman |
| 5,960,074 A | 9/1999 | Clark |
| 5,979,757 A | 11/1999 | Tracy et al. |
| 5,983,073 A | 11/1999 | Ditzik |
| 5,983,161 A | 11/1999 | Lemelson et al. |
| 5,984,051 A | 11/1999 | Morgan et al. |
| 5,987,381 A | 11/1999 | Oshizawa |
| 5,995,898 A | 11/1999 | Tuttle |
| 6,002,326 A | 12/1999 | Turner |
| 6,003,135 A | 12/1999 | Bialick et al. |
| 6,009,403 A | 12/1999 | Sato |
| 6,010,074 A | 1/2000 | Kelly et al. |
| 6,011,839 A | 1/2000 | Friedli et al. |
| 6,016,476 A | 1/2000 | Maes et al. |
| 6,028,564 A | 2/2000 | Duan et al. |
| 6,032,089 A | 2/2000 | Buckley |
| 6,037,907 A | 3/2000 | Ha et al. |
| 6,040,745 A | 3/2000 | Tanaka et al. |
| 6,044,376 A | 3/2000 | Kurtzman, II |
| 6,049,745 A | 4/2000 | Douglas et al. |
| 6,055,478 A | 4/2000 | Heron |
| 6,055,536 A | 4/2000 | Shimakawa et al. |
| 6,057,779 A | 5/2000 | Bates |
| 6,064,323 A | 5/2000 | Ishii et al. |
| 6,067,297 A | 5/2000 | Beach |
| 6,067,521 A | 5/2000 | Ishii et al. |
| 6,069,648 A | 5/2000 | Suso et al. |
| 6,069,655 A | 5/2000 | Seeley et al. |
| 6,073,727 A | 6/2000 | DiFranza et al. |
| 6,078,928 A | 6/2000 | Schnase et al. |
| 6,082,500 A | 7/2000 | Amo et al. |
| 6,085,112 A | 7/2000 | Kleinschmidt et al. |
| 6,091,417 A | 7/2000 | Lefkowitz |
| 6,091,956 A | 7/2000 | Hollenberg |
| 6,098,048 A | 8/2000 | Dashefsky et al. |
| 6,112,174 A | 8/2000 | Wakisaka et al. |
| 6,115,611 A | 9/2000 | Kimoto et al. |
| 6,119,065 A | 9/2000 | Shimada et al. |
| 6,122,580 A | 9/2000 | Autermann |
| 6,125,326 A | 9/2000 | Ohmura et al. |
| 6,130,602 A | 10/2000 | O'Toole et al. |
| 6,133,947 A | 10/2000 | Mikuni |
| 6,134,549 A | 10/2000 | Regnier et al. |
| 6,141,611 A | 10/2000 | Mackey et al. |
| 6,144,301 A | 11/2000 | Frieden |
| 6,148,261 A | 11/2000 | Obradovich et al. |
| 6,157,705 A | 12/2000 | Perrone |
| 6,163,749 A | 12/2000 | McDonough et al. |
| 6,169,498 B1 | 1/2001 | King et al. |
| 6,169,552 B1 | 1/2001 | Endo et al. |
| 6,173,279 B1 | 1/2001 | Levin et al. |
| 6,177,872 B1 | 1/2001 | Kodukula et al. |
| 6,182,006 B1 | 1/2001 | Meek |
| 6,184,841 B1 | 2/2001 | Shober et al. |
| 6,188,956 B1 | 2/2001 | Walters |
| 6,192,222 B1 | 2/2001 | Greeff et al. |
| 6,201,544 B1 | 3/2001 | Ezaki |
| 6,202,006 B1 | 3/2001 | Scott |
| 6,202,008 B1 | 3/2001 | Beckert et al. |
| 6,202,023 B1 | 3/2001 | Hancock et al. |
| 6,202,799 B1 | 3/2001 | Drop |
| 6,206,142 B1 | 3/2001 | Meacham |
| 6,208,970 B1 | 3/2001 | Ramanan |
| 6,211,777 B1 | 4/2001 | Greenwood et al. |
| 6,211,907 B1 | 4/2001 | Scaman et al. |
| 6,223,160 B1 | 4/2001 | Kostka et al. |
| 6,230,082 B1 | 5/2001 | Harada et al. |
| 6,230,132 B1 | 5/2001 | Class et al. |
| 6,230,136 B1 | 5/2001 | Yamamoto et al. |
| 6,233,561 B1 | 5/2001 | Junqua et al. |
| 6,236,836 B1 | 5/2001 | Westman et al. |
| 6,236,968 B1 | 5/2001 | Kanevsky et al. |
| 6,239,765 B1 | 5/2001 | Johnson et al. |
| 6,240,360 B1 | 5/2001 | Phelan |
| 6,240,365 B1 | 5/2001 | Bunn |
| 6,249,740 B1 | 6/2001 | Ito et al. |
| 6,252,544 B1 | 6/2001 | Hoffberg |
| 6,259,891 B1 | 7/2001 | Allen |
| 6,266,614 B1 | 7/2001 | Alumbaugh |
| 6,275,231 B1 | 8/2001 | Obradovich |
| 6,285,317 B1 | 9/2001 | Ong |
| 6,317,027 B1 | 11/2001 | Watkins |
| 6,323,566 B1 | 11/2001 | Meier |
| 6,329,139 B1 | 12/2001 | Nova et al. |
| 6,331,825 B1 | 12/2001 | Ladner et al. |
| 6,332,127 B1 | 12/2001 | Bandera et al. |
| 6,335,685 B1 | 1/2002 | Schrott et al. |
| 6,341,668 B1 | 1/2002 | Fayette et al. |
| 6,349,797 B1 | 2/2002 | Newville et al. |
| 6,360,167 B1 | 3/2002 | Millington et al. |
| 6,362,440 B1 | 3/2002 | Karidis et al. |
| 6,362,737 B1 | 3/2002 | Rodgers et al. |
| 6,396,531 B1 | 5/2002 | Gerszberg et al. |
| 6,397,976 B1 | 6/2002 | Hale et al. |
| 6,401,085 B1 | 6/2002 | Gershman et al. |
| 6,401,112 B1 | 6/2002 | Boyer et al. |
| 6,405,126 B1 | 6/2002 | Palomo et al. |
| 6,411,212 B1 | 6/2002 | Hecht et al. |
| 6,411,874 B2 | 6/2002 | Morgan et al. |
| 6,421,305 B1 | 7/2002 | Gioscia et al. |
| 6,438,561 B1 | 8/2002 | Israni et al. |
| 6,442,530 B1 | 8/2002 | Miller |
| 6,460,036 B1 | 10/2002 | Herz |
| 6,466,232 B1 | 10/2002 | Newell et al. |
| 6,473,790 B1 | 10/2002 | Tagi |
| 6,477,152 B1 | 11/2002 | Hiett |
| 6,477,526 B2 | 11/2002 | Hayashi et al. |
| 6,483,433 B2 | 11/2002 | Moskowitz et al. |
| 6,486,801 B1 | 11/2002 | Jones |
| 6,504,571 B1 | 1/2003 | Narayanaswami et al. |
| 6,507,279 B2 | 1/2003 | Loof |
| 6,519,584 B1 | 2/2003 | Tognazzini et al. |
| 6,522,875 B1 | 2/2003 | Dowling et al. |

(56) References Cited

U.S. PATENT DOCUMENTS

| | | |
|---|---|---|
| 6,526,335 B1 | 2/2003 | Treyz et al. |
| 6,526,506 B1 | 2/2003 | Lewis |
| 6,535,107 B1 | 3/2003 | Bartz |
| 6,557,758 B1 | 5/2003 | Monico |
| 6,564,143 B1 | 5/2003 | Alewine et al. |
| 6,567,122 B1 | 5/2003 | Anderson et al. |
| 6,571,279 B1 | 5/2003 | Herz et al. |
| 6,577,714 B1 | 6/2003 | Darcie et al. |
| 6,583,713 B1 | 6/2003 | Bates |
| 6,584,179 B1 | 6/2003 | Fortier et al. |
| 6,587,835 B1 | 7/2003 | Treyz et al. |
| 6,590,588 B2 | 7/2003 | Lincke et al. |
| 6,594,580 B1 | 7/2003 | Tada et al. |
| 6,606,644 B1 | 8/2003 | Ford et al. |
| 6,611,691 B1 | 8/2003 | Zhou et al. |
| 6,615,175 B1 | 9/2003 | Gazdzinski |
| 6,622,083 B1 | 9/2003 | Knockeart et al. |
| 6,628,336 B2 | 9/2003 | Hamamura |
| 6,632,171 B2 | 10/2003 | Iddan et al. |
| 6,636,566 B1 | 10/2003 | Roberts et al. |
| 6,636,748 B2 | 10/2003 | Monroe |
| 6,642,956 B1 | 11/2003 | Safai |
| 6,651,045 B1 | 11/2003 | Macaulay |
| 6,658,418 B2 | 12/2003 | Burns |
| 6,662,083 B2 | 12/2003 | Angel |
| 6,707,421 B1 | 3/2004 | Drury et al. |
| 6,709,387 B1 | 3/2004 | Glukhovsky et al. |
| 6,712,276 B1 | 3/2004 | Abali et al. |
| 6,714,249 B2 | 3/2004 | May et al. |
| 6,725,200 B1 | 4/2004 | Rost |
| 6,732,077 B1 | 5/2004 | Gilbert et al. |
| D492,403 S | 6/2004 | Iddan et al. |
| 6,754,485 B1 | 6/2004 | Obradovich et al. |
| 6,760,757 B1 | 7/2004 | Lundberg et al. |
| 6,764,440 B2 | 7/2004 | Iddan et al. |
| 6,771,981 B1 | 8/2004 | Zalewski et al. |
| 6,774,762 B2 | 8/2004 | Bates |
| 6,799,327 B1 | 9/2004 | Reynolds |
| 6,801,792 B1 | 10/2004 | Schuster et al. |
| 6,806,808 B1 | 10/2004 | Watters et al. |
| 6,812,860 B1 | 11/2004 | Schwarzwalder, Jr. |
| 6,812,954 B1 | 11/2004 | Priestman et al. |
| 6,823,459 B1 | 11/2004 | Horikoshi et al. |
| 6,836,377 B1 | 12/2004 | Kislev et al. |
| 6,845,084 B2 | 1/2005 | Rangnekar et al. |
| 6,847,490 B1 | 1/2005 | Nordstrom et al. |
| 6,866,195 B2 | 3/2005 | Knowles et al. |
| 6,884,213 B2 | 4/2005 | Raz et al. |
| 6,904,308 B2 | 6/2005 | Frisch et al. |
| 6,934,093 B2 | 8/2005 | Kislev et al. |
| 6,934,573 B1 | 8/2005 | Glukhovsky et al. |
| 6,936,003 B2 | 8/2005 | Iddan |
| D510,139 S | 9/2005 | Gilad et al. |
| 6,939,290 B2 | 9/2005 | Iddan |
| 6,944,316 B2 | 9/2005 | Glukhovsky et al. |
| 6,944,533 B2 | 9/2005 | Kozak et al. |
| 6,950,690 B1 | 9/2005 | Meron et al. |
| 6,951,536 B2 | 10/2005 | Yokoi et al. |
| 6,956,470 B1 | 10/2005 | Heise et al. |
| 6,958,034 B2 | 10/2005 | Iddan |
| D512,150 S | 11/2005 | Iddan et al. |
| 6,965,863 B1 | 11/2005 | Zuberec et al. |
| 6,975,941 B1 | 12/2005 | Lau et al. |
| 6,984,205 B2 | 1/2006 | Gazdzinski |
| 6,986,738 B2 | 1/2006 | Glukhovsky et al. |
| 6,988,071 B1 | 1/2006 | Gazdzinski |
| 6,990,312 B1 | 1/2006 | Gioscia et al. |
| 6,994,253 B2 | 2/2006 | Miller et al. |
| 7,005,961 B2 | 2/2006 | Bates |
| 7,009,634 B2 | 3/2006 | Iddan et al. |
| 7,017,822 B2 | 3/2006 | Aisenbrey |
| 7,022,067 B2 | 4/2006 | Glukhovsky et al. |
| 7,058,397 B2 | 6/2006 | Ritter et al. |
| 7,065,492 B2 | 6/2006 | Cinquini et al. |
| 7,080,018 B1 | 7/2006 | Fox et al. |
| 7,093,693 B1 | 8/2006 | Gazdzinski |
| 7,114,179 B1 | 9/2006 | Ritter et al. |
| 7,117,369 B1 | 10/2006 | Burns et al. |
| 7,132,946 B2 | 11/2006 | Waldner et al. |
| 7,136,853 B1 | 11/2006 | Kohda et al. |
| 7,253,715 B2 | 8/2007 | Bates |
| 7,257,426 B1 | 8/2007 | Witkowski et al. |
| 7,305,345 B2 | 12/2007 | Bares et al. |
| 7,327,257 B2 | 2/2008 | Posamentier |
| 7,354,397 B2 | 4/2008 | Fujita et al. |
| 7,515,953 B2 | 4/2009 | Madar et al. |
| 7,577,244 B2 | 8/2009 | Taschereau |
| 7,640,185 B1 | 12/2009 | Giordano et al. |
| 7,702,798 B2 | 4/2010 | Apreutesei et al. |
| 7,711,565 B1 | 5/2010 | Gazdzinski |
| 7,765,558 B2 | 7/2010 | Kouznetsov et al. |
| 7,765,588 B2 | 7/2010 | Sahota et al. |
| 7,777,608 B2 | 8/2010 | Bates |
| 7,783,975 B2 | 8/2010 | Rhim et al. |
| 7,783,978 B1 | 8/2010 | Andrews et al. |
| 7,787,907 B2 | 8/2010 | Zeinstra et al. |
| 8,065,155 B1 | 11/2011 | Gazdzinski |
| 8,065,156 B2 | 11/2011 | Gazdzinski |
| 8,078,473 B1 | 12/2011 | Gazdzinski |
| 8,117,037 B2 | 2/2012 | Gazdzinski |
| 8,234,119 B2 | 7/2012 | Dhawan et al. |
| 8,275,617 B1 | 9/2012 | Morgan et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,301,456 B2 | 10/2012 | Gazdzinski |
| 8,311,834 B1 | 11/2012 | Gazdzinski |
| 2001/0017649 A1 | 8/2001 | Yaron |
| 2001/0021950 A1 | 9/2001 | Hawley et al. |
| 2002/0002467 A1 | 1/2002 | Ho |
| 2002/0032435 A1 | 3/2002 | Levin |
| 2002/0046084 A1 | 4/2002 | Steele et al. |
| 2002/0109774 A1 | 8/2002 | Meron et al. |
| 2002/0163443 A1 | 11/2002 | Stewart et al. |
| 2003/0016293 A1 | 1/2003 | Hamamura |
| 2003/0058345 A1 | 3/2003 | Morris et al. |
| 2003/0058354 A1 | 3/2003 | Parulski et al. |
| 2003/0065805 A1 | 4/2003 | Barnes et al. |
| 2003/0095193 A1 | 5/2003 | May et al. |
| 2003/0115289 A1 | 6/2003 | Chinn et al. |
| 2003/0125963 A1 | 7/2003 | Haken |
| 2003/0167307 A1 | 9/2003 | Filepp et al. |
| 2003/0174208 A1 | 9/2003 | Glukhovsky et al. |
| 2003/0189094 A1 | 10/2003 | Trabitz |
| 2003/0195833 A1 | 10/2003 | Baranowski |
| 2004/0010430 A1 | 1/2004 | Cinquini et al. |
| 2004/0030601 A1 | 2/2004 | Pond et al. |
| 2004/0069852 A1 | 4/2004 | Seppinen et al. |
| 2004/0092825 A1 | 5/2004 | Madar et al. |
| 2004/0104842 A1 | 6/2004 | Drury et al. |
| 2004/0124982 A1 | 7/2004 | Kovach |
| 2004/0172262 A1 | 9/2004 | Gonzales et al. |
| 2004/0178912 A1 | 9/2004 | Smith et al. |
| 2004/0199061 A1 | 10/2004 | Glukhovsky |
| 2004/0243518 A1 | 12/2004 | Clifton et al. |
| 2005/0024198 A1 | 2/2005 | Ward et al. |
| 2005/0144073 A1 | 6/2005 | Morrisroe et al. |
| 2005/0239402 A1 | 10/2005 | Gioscia et al. |
| 2005/0278991 A1 | 12/2005 | Araujo |
| 2006/0069749 A1 | 3/2006 | Herz et al. |
| 2006/0202827 A1 | 9/2006 | Volpi et al. |
| 2006/0220868 A1 | 10/2006 | Takasawa et al. |
| 2006/0239402 A1 | 10/2006 | Hu et al. |
| 2007/0071187 A1 | 3/2007 | Apreutesei et al. |
| 2007/0174258 A1 | 7/2007 | Jones et al. |
| 2007/0255835 A1 | 11/2007 | Coppinger et al. |
| 2007/0255838 A1 | 11/2007 | Hassan et al. |
| 2007/0273473 A1 | 11/2007 | Bates |
| 2007/0285207 A1 | 12/2007 | Bates |
| 2007/0285208 A1 | 12/2007 | Bates |
| 2007/0285213 A1 | 12/2007 | Bates |

(56) References Cited

U.S. PATENT DOCUMENTS

| | | | |
|---|---|---|---|
| 2007/0290807 | A1 | 12/2007 | Smith et al. |
| 2008/0187121 | A1 | 8/2008 | Agarwal et al. |
| 2008/0201748 | A1 | 8/2008 | Hasek et al. |
| 2008/0319733 | A1 | 12/2008 | Pulz et al. |
| 2009/0077100 | A1 | 3/2009 | Hancock et al. |
| 2009/0278688 | A1 | 11/2009 | Tuttle |
| 2009/0289771 | A1 | 11/2009 | Tuttle |
| 2010/0023392 | A1 | 1/2010 | Merriman et al. |
| 2012/0277889 | A1 | 11/2012 | Bennett, III et al. |

FOREIGN PATENT DOCUMENTS

| | | |
|---|---|---|
| EP | 0829704 A2 | 3/1998 |
| EP | 0737953 B1 | 2/2000 |
| JP | S5218653 U | 2/1977 |
| JP | S5239237 A | 3/1977 |
| JP | H01226681 A | 9/1989 |
| JP | H01242374 A | 9/1989 |
| JP | H0282889 A | 3/1990 |
| JP | H02255487 A | 10/1990 |
| JP | H03272977 A | 12/1991 |
| JP | H04292085 A | 10/1992 |
| JP | H0517083 A | 1/1993 |
| JP | H0558564 A | 3/1993 |
| JP | H05201624 A | 8/1993 |
| JP | H051932842 A | 8/1993 |
| JP | H061549 A | 1/1994 |
| JP | H07295784 A | 11/1995 |
| JP | H0861996 A | 3/1996 |
| JP | H08223309 A | 8/1996 |
| JP | H0970021 A | 3/1997 |
| JP | H1049604 A | 2/1998 |
| JP | H1091176 A | 4/1998 |
| JP | H10133847 A | 5/1998 |
| JP | H10164249 A | 6/1998 |
| JP | H10316318 A | 12/1998 |
| JP | H1111807 A | 1/1999 |
| JP | H1117994 A | 1/1999 |
| JP | H11118979 A | 4/1999 |
| JP | 2000191245 A | 7/2000 |
| JP | 2000289943 A | 10/2000 |
| JP | 2000289947 A | 10/2000 |
| WO | WO-0058752 A1 | 10/2000 |
| WO | WO-03085993 A1 | 10/2003 |

OTHER PUBLICATIONS

Acura Navigation System, Owners Manual for 1996 Acura RL.
Altnether, J., "In-Car Computing and Communication Enables Entertainment, Productivity and Information," Conference on ATT/ITS, 1997.
Arditi, Interactive Tactile Maps, Visual Disability and Accessibility of Building Interiors, Visual Impairment Research, Jan. 1999.
Bourbakis, An Efficient Vehicles Navigation Methodology Using Dynamic Change in Local Maps, IEEE, Sep. 1995.
Brewster, Performance Evaluation of the Transmission of Image Data over Digital Networks Involving Mobile Terminals, IEEE, Apr. 1989.
Bryan, Man-Portable Networked Sensor System, Space and Naval Warfare Systems Center, Apr. 1998.
Buchholz, Trends in Electronics (Convergence '98), Automotive Engineering International, Dec. 1998.
Buckley, The Car as a Peripheral, Adapting a Portable Computer to a Vehicle Intranet, SAE International 98C030, Oct. 19, 1998.
CASD 3:14-cv-02675, Dkt No. 60, Order Granting Motions for Judgement on the Pleadings.
CASD 3:14-cv-02675, no docket number, Defendants' Disclosures and Invalidity Contentions.
CASD 3:14-cv-02679, Dkt. No. 47-2, Declaration of Audrey Maness in Support of Moving Defendants' Motion for Judgment on the Pleadings.
CASD 3:14-cv-02679, Dkt No. 47-27, Proof of Service.
CASD 3:14-cv-02679, Dkt No. 52, Plaintiff West View Research LLC's Opposition to Defendant Tesla Motors, Inc's Motion for Judgment on the Pleadings.
CASD 3:14-cv-02679, Dkt No. 52-2, Proof of Service.
CASD 3:14-cv-02679, Dkt No. 54, Moving Defendants' Reply in Support of their Motion for Judgment on the Pleadings.
CASD Case No. 3:14-cv-02668, Docket No. 88, Order Granting Motions for Judgement on Pleadings.
Chan, Next-Generation Wireless Data Services: Architecture and Experience, IEEE Personal Communications, Feb. 1999.
Clarion AutoPC brochure, published in 1998 by Clarion Sales Corporation.
Clarion AutoPC Quick Reference Guide, published in 1998 by Clarion Co. Ltd.
Clarion AutoPC310C Owner's Manual, published in 1998 by Clarion Co. Ltd.
Crawford, Multimedia on the Move, Alpine Electronics Annual Review, 1998.
Crow, Wireless Local Area Networks, IEEE, Sep. 1997.
Customized Touch-Screen Kiosks and Services, DynaTouch, Dec. 1999.
Daimler-Benz Research and Technology previews first "Internet on Wheels" Technology; Future Mercedes-Benz drivers and passengers to accss Cyberspace, Business Wire, Apr. 30, 1997.
Declaration of Adam S. Garson in support of plaintiff West View Research LLC's Opposition to Defendant Tesla Motors Motion for Judgment on Pleadings.
Delorme's New AAA Map'n'Go 4.0 Takes Family Fun on the Road, (GARM-PRIART-009006-009008).
Delphi Teams with Saab to Exhibit Mobile Media Featuring Microsoft Windows CE-Based Auto PC, Feb. 1998.
Dias, Travelers On-Line Information System-TOI: Information System and Location Modules, Third Joint European Conference & Exhibition on Geographical Information, 1997.
Ex. B1. 126 prior art chart for WVR 778 patent.
Ex. B10. WVR 778 v Obradovich 261 Claim Chart Final.
Ex. B11. WVR 778 v Ong 317 Claim Chart Final.
Ex. B12—Final VW Claim Chart II—'778 Patent.
Ex. B2. prior art chart for WVR 778 patent.
Ex. B3. Final Claim Chart (103)—DeLorme 040 v 778 (revised).
Ex. B4. Final U.S. Pat. No. 8,290,778 Claim Chart Dowling '875 (102).
Ex. B5. Final U.S. Pat. No. 8,290,778 Claim Chart Gershman '085 (102).
Ex. B6. Final U.S. Pat. No. 8,290,778 Claim Chart Knockeart '083 (102 ref).
Ex. B7. Final U.S. Pat. No. 8,290,778 Claim Chart Obradovich 485 (103).
Ex. B8. Final U.S. Pat. No. 8,290,778 Claim Chart Alewine '143 (103).
Ex. B9. WVR 778 v Dias Claim Chart Final.
Ex. C7. U.S. Pat. No. 8,296,146 v Buchholz Claim Chart Final.
Ex. F7. U.S. Pat. No. 8,682,673 v 5915239 Haavisto Claim Chart Final.
Ex. G3. U.S. Pat. No. 8,706,504 v Buchholz Claim Chart Final.
Ex. I11. U.S. Pat. No. 8,719,037 v Buchholz Claim Chart Final.
Exhibit 1, Document 47-4.
Exhibit 10, Document 47-13.
Exhibit 11, Document 47-14.
Exhibit 12, Document 47-15.
Exhibit 13, Document 47-16.
Exhibit 14, Document 47-17.
Exhibit 15, Document 47-18.
Exhibit 16, Document 47-19.
Exhibit 17, Document 47-20.
Exhibit 18, Document 47-21.
Exhibit 19, Document 47-22.
Exhibit 2, Document 47-5.
Exhibit 20, Document 47-23.
Exhibit 21, Document 47-24.
Exhibit 22, Document 47-25.
Exhibit 23, Document 47-26.
Exhibit 3, Document 47-6.

(56) References Cited

OTHER PUBLICATIONS

Exhibit 4, Document 47-7.
Exhibit 5, Document 47-8.
Exhibit 6, Document 47-9.
Exhibit 7, Document 47-10.
Exhibit 8, Document 47-11.
Exhibit 9, Document 47-12.
Exhibit A1 261_prior_art_chart_for WVR_156_patent.
Exhibit A2 544 prior art chart for WVR 156 patent_.
Exhibit A3 561 prior art chart for VVVR_156_patent.
Exhibit A4 Final Claim Chart (102)—Ong 317 v 156.
Exhibit A5 Final U.S. Pat. No. 8,065,156 Claim Chart Gershman '085 (103).
Exhibit A7 Final U.S. Pat. No. 8,065,156 Claim Chart Dowling '875 (102).
Exhibit A8 Final VW Claim Chart I—'156 Patent.
Exhibit C1 544 prior art chart for WVR 146 patent_.
Exhibit C10 Final VW Claim Chart III—'146 Patent.
Exhibit C2 Final Claim Chart (103)—DeLorme 040 v 146 (revised).
Exhibit C3 Final U.S. Pat. No. 8,296,146 Claim Chart Dowling '875 (102).
Exhibit C4 Final U.S. Pat. No. 8,296,146 Claim Chart Gershman '085 (102).
Exhibit C5 Final U.S. Pat. No. 8,296,146 Claim Chart Noguchi (102 ref).
Exhibit C6 Final U.S. Pat. No. 8,296,146 Claim Chart Obradovich '485 (103).
Exhibit C8 WVR 146 v Obradovich 261 Claim Chart Final.
Exhibit C9 WVR 146 v Ong 317 Claim Chart Final.
Exhibit D1 Final U.S. Pat. No. 8,301,456 Claim Chart Haartsen.
Exhibit D2 Final U.S. Pat. No. 8,301,456 Claim Chart Katz '624.
Exhibit D3 Final U.S. Pat. No. 8,301,456 Claim Chart Kazuhiro 374.
Exhibit D4 Final U.S. Pat. No. 8,301,456 Claim Chart Maes '476.
Exhibit D5 Final U.S. Pat. No. 8,301,456 Claim Chart Takuro '604.
Exhibit E1 Final Gershman Claim Chart to U.S. Pat. No. 8,311,834.
Exhibit E2 Final Haartsen Claim Chart to U.S. Pat. No. 8,311,834.
Exhibit E3 Final JP10-49604 Claim Chart to U.S. Pat. No. 8,311,834.
Exhibit E4 Final Katz Claim Chart to U.S. Pat. No. 8,311,834.
Exhibit E5 Final U.S. Pat. No. 6,122,580 Claim Chart to U.S. Pat. No. 8,311,834.
Exhibit F1 544 prior art chart for WVR 673 patent.
Exhibit F2 561 prior art chart for WVR_673_patent.
Exhibit F3 Final Claim Chart (103)—DeLorme 040 v 673 (revised).
Exhibit F4 Final Claim Chart (103)—Lind 98 v 673 (revised).
Exhibit F5 Final U.S. Pat. No. 8,682,673 Claim Chart Drury '421 (103).
Exhibit F6 Final U.S. Pat. No. 8,682,673 Claim Chart Zeinstra '907 (102).
Exhibit F8—Claim Chart IV—'673 Patent.
Exhibit G1 Final Claim Chart (103)—DeLorme 040 v 504 (revised).
Exhibit G2 Final U.S. Pat. No. 8,706,504 Claim Chart Drury '421 (103).
Exhibit G4. WVR 504 v Bouve 525 Claim Chart Final.
Exhibit G5. WVR 504 v Ong 317 Claim Chart Final.
Exhibit G6. WVR 504 v. Obradovich 261 Claim Chart Final.
Exhibit G7—Claim Chart V—'504 Patent.
Exhibit H1. WVR 777 Ong 317 Claim Chart Final.
Exhibit H2. WVR 777 v DeLorme 040 Claim Chart Final.
Exhibit H3. U.S. Pat. No. 8,712,777 v Dias Claim Chart Final.
Exhibit H4. U.S. Pat. No. 8,712,777 v Dowling U.S. Pat. No. 6,522,875 Claim Chart Final.
Exhibit I1. 544 prior art chart for WVR 037 patent_.
Exhibit I12. WVR 037 Obradovich 261 Claim Chart Final.
Exhibit I13. WVR 037 Ong 317 Claim Chart Final.
Exhibit I14. Aug. 28, 2015 Draft Claim Chart VI—'037 Patent.
Exhibit I2. 561 prior art chart for WVR_037_patent.
Exhibit I3. Final Claim Chart (102)—Lind 98 v 037 (revised).
Exhibit I4. Final U.S. Pat. No. 8,719,037 Claim Chart Alewine '143 (102).
Exhibit I5. Final U.S. Pat. No. 8,719,037 Claim Chart Drury '421 (102).
Exhibit I6. Final U.S. Pat. No. 8,719,037 Claim Chart Hemphill (102).
Exhibit I8. Final U.S. Pat. No. 8,7190,37 Claim Chart Lemelson '161 (103).
Exhibit I9. Final U.S. Pat. No. 8,719,037 Claim Chart Martin (102).
Exhibit J1. 521 prior art chart for WVR 038 patent.
Exhibit J2. 544 prior art chart for WVR 038 patent.
Exhibit J3. 561 prior art chart for WVR 038 patent.
Exhibit J4. 863 prior art chart for WVR 038 patent.
Exhibit J5. Final Claim Chart (103)—DeLorme 040 v 038 (revised).
Exhibit J6. Final U.S. Pat. No. 8,719,038 Claim Chart Drury '421 (102).
Exhibit J7. Final U.S. Pat. No. 8,719,038 Claim Chart Muthusamy (103).
Exhibit J8. Aug. 28, 2015 Draft Claim Chart VII—'038 Patent.
Exhibit K1. WVR 839 Obradovich 485 Claim Chart Final.
Exhibit K2. WVR 839 Ong 317 Claim Chart Final.
Exhibit K3. U.S. Pat. No. 8,781,839 v Dowling U.S. Pat. No. 6,522,875 Claim Chart Final.
Exhibit K5. U.S. Pat. No. 8,781,839 v Dias Claim Chart Final.
Exhibit K6. Aug. 28, 2015 Draft Claim Chart VIII—'839 Patent.
Festa, Clarion to build AutoPC using MS software, CNET News, (Jan. 8, 1998).
Flynn, David, IBM's Corporate High Flier, The Sydney Morning Herald, Sep. 29, 1997.
Freeman, Springfield's New Take on City Hall, Public Management, Jun. 1996.
Gargiulo, Developing a Functional Wayfinding System from the Existing Signage System at Madigan Army Medical Center, May 1994.
Glathe, The Prometheus Programme-Objectives, Concepts and Technology for Future Road Traffic, ATA, May 1990.
GM: "Network Vehicle," Normans Media, Feb. 1998.
Grize, Cybcerone, Interaction, Nov./Dec. 1997.
Gross, Buildings, Memory and Wayfinding, EDRA 21, 1990.
Haartsen J., "Bluetooth—The Universal Radio Interface for Ad Hoc," Wireless Connectivity, Ericson Review No. 3, 1998, pp. 110-117.
Hagen, IEEE/AIAA 17th Digital Avionics Systems Conference, The Institute fo Electrical and Electronics Engineers Inc., Oct. 31, 1998.
Hemphill et al., Voice-Driven Information Access in the Automobile, SAE Paper 98C032, published Oct. 19, 1998.
Hertel, A Voice-Activated Co-Pilot: ICES, Smart Computing, vol. 8, issue 1, Jan. 2000.
Hickman, The Internet on Wheels (PC Magazine Jul. 1997).
Honda, Information Services for Greater Driving Enjoyment, SAE International, Feb. 1998.
Huang Z., et al., "A New Location Coding Scheme for Intelligent Transportation System," ITS Journal, 1996, vol. 3 (2), pp. 99-109.
Inoue, Digital Mobile Communication System Designed for Nationwide Police Activities-Wide System, IEEE, 1996.
Intel Drives Connected Car PC Technology to Las Vegas Consumer Electronics Show, Intel News Release, Jan. 6, 1998.
Interactive Electronics, Popular Science, Jun. 1996.
Jacobs, Karen (Dec. 7, 1999) "Elevator Maker to Add Commercial Touch," The Wall Street Journal, pp. 1-2.
Jameel A., et al., "Internet Multimedia on Wheels: Connecting Cars to Cyberspace," IEEE, Jan. 1998.
Jameel A., et al., "Web on Wheels: Toward Internet Enabled Cars," IEEE, Jan. 1998.
Jost, "The Car as a Mobile-Media Platform," Automotive Engineering International, May 1998.
Julia, Cooperative Agents and Recognition Systems (CARS) for Drivers and Passengers, IEEE, Nov./Dec. 1998.
Jurgen (ed.), Automotive Electronics Handbook, Chapter 11.
Kahaner, (Mar. 16, 1991) "Hitachi 1991 Technology Exhibition, Tokyo," Asian Technology Information Program, pp. 1-14.

(56) References Cited

OTHER PUBLICATIONS

Kahn, Real Space and Cyberspace, A Comparison of Museum Maps and Electronic Publication Maps, Museums and Interactive Multimedia, 1997.
Kamai, Monet—Compatible Car-Mounted Information Terminal, Fujitsu Ten Tech. J., Jun. 1998.
Kay, Stripe: Remote Driving Using Limited Image Data, Carnegie Mellon University, 1997.
Kempainen, In-car Computing gets Personal, UBM LLC, Aug. 1998.
Kirschner, Wired Wheels, Popular Science, Mar. 1998.
Kirson, The Evolution of Advance Development and Operational Test of a Probe-Based Driver Information System in an Arterial Street Network, IEEE, 1992.
Komanecky, IVHS Applications of Smart Cards, 1991.
Kraak, Integrating Multimedia in Geographical Information Systems, IEEE, 1996.
Krebs, "Cars That Tell You Where to Go," The New York Times, Dec. 15, 1996.
Kreft W., "Information and Communication Systems at Volkswagen," presentation from Automobile Electronics Conference, Nov. 1993.
Krulwich, Multimedia Consumer Applications on the Information Superhighway, IEEE, 1994.
LaPierre, Personal Navigation System for the Visually Impaired, Carleton University, 1998.
Library of Congress Public Catalog Information, 17th DASC: The AIAA/IEEE/SAE Digital Avionics Systems Conference: Proceedings: [Electronics in motion]: Bellevue, WA, Oct. 31-Nov. 7, 1998.
Lind, et al., The Network Vehicle—A Glimpse into the Future of Mobile Multi-Media, The 17th DASC—The AIAA/IEEE/SAE Digital Avionics Systems Conference—Bellevue, WA.
Lind R., et al., "The Network Vehicle—A Glimpse into the Future of Mobile Multi-Media," IEEE Aerospace and Electronic Systems Magazine,vol. 14, No. 9, pp. 27-32, 1999.
Lind R., et al., "The Network Vehicle—A Glimpse into the Future of Mobile Multi-Media," IEEE, Mar. 1998.
Lind R., et al., "The Network Vehicle—A Glimpse into the Future of Mobile Multi-Media," SAE Technical Paper Series, IEEE, Nov. 1998.
Map'n'Go, AAA, Introductory Guide, 1998 (GARM-PRIART-007633-007654).
Map'n'Go, AAA, User Manual, 1998 (GARM-PRIART-000318-000396).
"MapQuest Launches Revolutionary GeoCentric Advertising Program Enabling Businesses to Provide Geographically Sensitive Advertisements as Users Click on Destinations and Content". Nov. 4, 1996. PR Newswire.
MARC Tags corresponding to Library of Congress Public Catalog Information, 17th DASC: The AIAA/IEEE/SAE Digital Avionics Systems Conference: Proceedings: [Electronics in motion].
Markoff, Daimler-Benz to Exhibit an Early-Stage Internet Car, N.Y. Times, Apr. 29, 1997.
Martin, Intel's Powerful PC Cuts Pizzazz in New Vehicles, Automotive Industry News, Feb. 1998.
Meggers, A Multimedia Communication Architecture for Handheld Devices, IEEE, Sep. 1998.
Meleis, The Future of Information Networks and Distributed Applications, IEEE, Apr. 1995.
Microsoft Comes to the Market, Its International, Jan./Feb. 1998.
Minagawa, Open Architectural Car Multimedia Platform, 1998.
Mitchener, Focus on CeBIT: Cars May Turn to Information Superhighway—Computer Firms Envision Smart Vehicles Down the Road, Dow Jones & Company Inc., Mar. 1998.
Moving Defendants' Memorandum of Points and Authorities in Support their Motion for Judgment on the Pleadings (Doc 47-1).
Moving Defendants' Notice of Motion for Judgment on the Pleadings, Document 47.
Muthusamy Y., et al., "Speech-Enabled Information Retrieval in the Automobile Environment," IEEE, Mar. 1999.
Navigation Takes Direction, Twice Mobile Electronics, Jan. 1999.
Noguchi, Intelligent Car-History and the Future in Japan and Toyota, 1998.
Odyssey Installation and Start-Up Guide, published in 1999 by InfoGation Corp.
Odyssey Navigation Software for the Clarion AutoPC User Manual, published by InfoGation Corp., May 1999.
Odyssey Quick Reference Guide, published in 1999 by InfoGation Corp.
Oki, N., et al., "Portable Vehicle Navigation System (NV-1 ): Its Features and Operability," IEEE, 1993, pp. 482-485.
Perdue, Lewis (Jul. 20, 1999) "Forget Elevator Music Here Comes Elevator Internet," Internet VC Watch, pp. 1-2.
Perkins, Mobile-IP, Ad-Hoc Networking, and Nomadicity, IEEE, Aug. 1996.
Peters D., et al., Car Multimedia—Mobile Multimedia for the 21st Century, VDI Society for Vehicle and Traffic Technology, VDI Reports 1547, Electronic Systems for Vehicles, Meeting at Baden-B.
Peters et al., Car Multimedia—multimediale Mobilitat for das 21. Jahrhundert, Verein Deutscher Ingenieure (VDI)-Berichte 1547, Elektronik Im Kraftfahrzeug Tagung Baden-.
Petition for Inter Partes Review of U.S. Pat. No. 8,065,156, Case No. IPR2015-01941.
Popescu-Zeletin, Applying Location-Aware Computing for Electronic Commerce: Mobile Guide, Fifth Conference on Computer Communication, AFRICOMCCDC '98, Oct. 1998.
PR News, Automotive Immobilizer Anti-Theft Systems Experience Rapid Growth in 1999.
Presse-Information Hannover Messe '96, Infotainment Car.
Proposed Joint Claim Construction Schedule and Listing of Claim Terms Requiring Construction for the Patents-in-Suit (Doc 66).
Restivo, Mobile Drivers Feast on Devices Buffet, Computer Dealer News, Jan. 1999.
Rillings, Travtek, IVHS America, May 1992.
Rillings, TravTek, SAE, 1991.
Ross, Buick XP 2000-Trends, Motor Trend, Jan. 1995.
Sante, "1996 Lincoln Continental, the traditional American luxury car is big, boxy, supremely comfortable . . . ".
Schmitz, A New State-of-the-Art Keyless Entry System, SAE International, Feb. 1998.
Segarra, Escort Memories: A Key Technology Supporting the Automobile Life Cycle Processes, 1996.
Shields, U.S. Trends in Navigable Digital Map Databases, IEEE 1994.
Stein, Access: A Computer-Simulated In-Vehicle a TIS Prototype Employing Synthetic Speech and Recognition, Its America, Mar. 1995.
Stevens Institute of Technology, Spring 1999 Final Report, pp. 1-12.
Strauss H.J., "HyperMaps: Telling Your Users Where to Go," New Centerings in Computing Services, ACM SIGUCCS XVIII, 1990, pp. 377-389.
StreetPilot Owner's Manual, Garmin Corporation (GARM-PRIART-012535-012624).
Stumpf, Delivery and Test of the Digital Hardhat System at U.S. Army Corps of Engineers Fort Worth District Office, US Army Corps of Engineers, Dec. 1998.
Sugimoto, Development of Toyota In-Vehicle Equipment for the VICS Demonstration Test, IEEE, 1994.
Sweeney, An Overview of Intelligent Vehicle Highway Systems (IVHS), IEEE, Sep. 1993.
Table of Contents, Document 47-3.
Takahashi, Next, Let's Try Asking the Car, How Do Ya Get to Carnegie Hall?, Wall Street Journal, Feb. 1997.
Tanaka, Onboard System Devices for a Vehicle Information and Communication System, Fujitsu Ten Tech. J., 1995.
The Network Vehicle Presentation, Delphi, Sun Microsystems, IBM, Netscape, Delco. Computer Dealers Exhibit Show, Las Vegas Nov. 1997.
The New Universe!, Volkswagen Magazine, Dec. 1999, German and English versions.
Thoone, Carin, A Car Information and Navigation System, Philips Technical Review, Dec. 1987.

(56) References Cited

OTHER PUBLICATIONS

U.S. Copyright Office Public Catalog Information, "Quarterly technical papers on microfiche," ISSN 0148-7191.
U.S. Copyright Registration No. TX4-900-822, "1998 IEEE/AIM 17th Digital Avionics Systems Conference—Oct 31, 1998—Bellevue, WA-(98CH36267)," dated—Dec. 8, 1998.
U.S. Copyright Registration No. TX5-149-812, "Nov. 1998 Quarterly Technical Papers on Microfiche (MICQ-N98)," dated Jun. 2, 2000.
VDO Kienzle Fleet Manager 200 Product Manual, Nov. 1998.
Visteon's Mobile Office Solutions Give Busy Commuters More of What They Need-Time, Canada NewsWire, Financial News, Sep. 15, 1999.
Vollmer, "Nutzungsgerechte Mobilkommunikation," User-Friendly Communication, Proceedings of the Congress Held in Munich, Mar. 12/13, 1990.
Yankelovich, How do Users Know What to Say?, Interactions, Nov./Dec. 1996.
Yoneda, et al. (Dec., 1997) "Multi-Objective Elevator Supervisory-Control System with Individual Floor-Situation Control," Hitachi Review, p. 1.
Zhao, Efficient and Reliable Data Transmission for Cellular-and-GPS Based Mayday Systems, IEEE, Nov. 1997.
Zue, Toward Systems that Understand Spoken Language, IEEE, Feb. 1994.
Andrews S., "Declaration of Scott Andrews" 165 pages.
CASD 3:14-cv-02668, Dkt No. 89, Judgment in a Civil Case.
CASD 3:14-cv-02668, Dkt No. 92, Notice of Appeal.
CASD 3:14-cv-02670, Dkt No. 100, Response to Plaintiff's Second Sur-Reply.
CASD 3:14-cv-02670, Dkt No. 101, Motion for Leave to File Third Sur-Reply Regarding McRO.
CASD 3:14-cv-02670, Dkt No. 102, Minute Order Granting Motion for Leave to File Third Sur-Reply.
CASD 3:14-cv-02670, Dkt No. 103, Notice of Supplemental Authority by West View Research, LLC.
CASD 3:14-cv-02670, Dkt No. 104, Notice of Supplemental Authority.
CASD 3:14-cv-02670, Dkt No. 88, Order Granting Motions for Judgment on the Pleadings.
CASD 3:14-cv-02670, Dkt No. 89, Motion for Judgment on the Pleadings (including Declaration of Brian A. Biggs).
CASD 3:14-cv-02670, Dkt No. 90, Opposition to Motion for Judgment on the Pleadings.
CASD 3:14-cv-02670, Dkt No. 91, Reply to Opposition to Motion for Judgment on the Pleadings.
CASD 3:14-cv-02670, Dkt No. 92, Motion for Leave to File Sur-Reply re *Enfish, LLC* v. *Microsoft Corp. et al.*, No. 2015-1244,_F.3D_, 2016 WL 2756255 (Fed. Cir., May 12, 2016).
CASD 3:14-cv-02670, Dkt No. 93, Order Granting Request for Leave to File a Sur-Reply.
CASD 3:14-cv-02670, Dkt No. 94, Sur-Reply regarding Enfish.
CASD 3:14-cv-02670, Dkt No. 95, Motion for Leave to File Sur-Reply regarding Bascom.
CASD 3:14-cv-02670, Dkt No. 96, Order Granting Leave to File a Sur-Reply.
CASD 3:14-cv-02670, Dkt No. 97, Sur-Reply regarding Bascom.
CASD 3:14-cv-02670, Dkt No. 98, Motion for Leave to File a Response to Plaintiff's Sur-Replies.
CASD 3:14-cv-02670, Dkt No. 99, Minute Order Granting Motion for Leave to File a Response to Plaintiff's Second Sur-Reply.
CASD 3:14-cv-2668, Dkt No. 93, Notice of Docketing.
CASD 3:14-cv-2668, Order Granting Motions for Judgment on the Pleadings.
CASD 3:14-cv-2679, Dkt No. 72, Order Granting Motions for Judgment on the Pleadings.
Defendants' Invalidity Contentions. served Aug. 28, 2015.
Exhibit A6 Final Claim Chart—'485 against '156 patent.
Exhibit I10 Final Claim Chart—'485 against '037 patent.
Exhibit I7 Final Claim Chart—'083 against '037 patent.
Exhibit K4 Final Claim Chart—'261 against '839 patent.
Fed Cir, Case No. 16-1947, Dkt No. 2, Order Associating Appeals.
Information sheets on Rapid 2 Application Software Diagnostic Tools for Effective Patient Management for the Given Diagnostic System, Given Imaging (.Copyrgt. 2001-2002), (2 pages), (www.givenimaging.com).
IPR2016-00156, Exh 1002, Declaration of Scott Andrews (165 pages), filed and published Nov. 18, 2015.
CASD 3:14-cv-02668, Dkt No. 89, Judgment in a Civil Case, filed and published Mar. 31, 2016.
CASD 3:14-cv-02668, Dkt No. 92, Notice of Appeal, filed and published Apr. 29, 2016.
CASD 3:14-cv-02670, Dkt No. 100, Response to Plaintiff's Second Sur-Reply, filed and published Jul. 22, 2016.
CASD 3:14-cv-02670, Dkt No. 101, Motion for Leave to File Third Sur-Reply Regarding McRO, filed and published Sep. 14, 2016.
CASD 3:14-cv-02670, Dkt No. 102, Minute Order Granting Motion for Leave to File Third Sur-Reply, filed and published Sep. 14, 2016.
CASD 3:14-cv-02670, Dkt No. 103, Notice of Supplemental Authority by West View Research, LLC, filed and published Nov. 4, 2016.
CASD 3:14-cv-02670, Dkt No. 104, Notice of Supplemental Authority, filed and published Nov. 15, 2016.
CASD 3:14-cv-02670, Dkt No. 88, Order Granting Motions for Judgment on the Pleadings, filed and published Mar. 31, 2016.
CASD 3:14-cv-02670, Dkt No. 89, Motion for Judgment on the Pleadings (including Declaration of Brian A. Biggs), filed and published Apr. 28, 2016.
CASD 3:14-cv-02670, Dkt No. 90, Opposition to Motion for Judgment on the Pleadings, filed and published May 12, 2016.
CASD 3:14-cv-02670, Dkt No. 91, Reply to Opposition to Motion for Judgment on the Pleadings, filed and published May 19, 2016.
CASD 3:14-cv-02670, Dkt No. 92, Motion for Leave to File Sur-Reply re Enfish, filed and published May 20, 2016.
CASD 3:14-cv-02670, Dkt No. 93, Order Granting Request for Leave to File a Sur-Reply, filed and published May 20, 2016.
CASD 3:14-cv-02670, Dkt No. 94, Sur-Reply regarding Enfish, filed and published May 27, 2016.
CASD 3:14-cv-02670, Dkt No. 95, Motion for Leave to File Sur-Reply regarding Bascom, filed and published Jul. 16, 2016.
CASD 3:14-cv-02670, Dkt No. 96, Order Granting Leave to File a Sur-Reply, filed and published Jul. 7, 2016.
CASD 3:14-cv-02670, Dkt No. 97, Sur-Reply regarding Bascom, filed and published Jul. 12, 2016.
CASD 3:14-cv-02670, Dkt No. 98, Motion for Leave to File a Response to Plaintiff's Sur-Replies, filed and published Jul. 14, 2016.
CASD 3:14-cv-02670, Dkt No. 99, Minute Order Granting Motion for Leave to File a Response to Plaintiff's Second Sur-Reply, filed and published Jul. 18, 2016.
CASD 3:14-cv-02688, no docket number, West View Research, LLC's Revised Disclosure of Asserted Claims and Infringement Contentions, served Jun. 26, 2015.
CASD 3:14-cv-2668, Dkt No. 93, Notice of Docketing, filed and published May 2, 2016.
CASD 3:14-cv-2668, Order Granting Motions for Judgment on the Pleadings, filed and published Mar. 31, 2016.
CASD 3:14-cv-2679, Dkt No. 72, Order Granting Motions for Judgment on the Pleadings, filed and published Mar. 31, 2016.
Chung, D.D.L., et al., (Mar. 1998), "Carbon Fiber Polymer-Matrix Structural Composite as a Semiconductor", Part of the SPIE Conference on Sensory Phenomena and Measurement Instrumentation for Smart Structures and Materials, San Diego, California, SPIE Vo. 3330, pp. 401 to 409.
Chung, (Spring 1998), "Even Smarter Smart Materials", University of Buffalo, UB Research, vol. 8, No. 1.
Defendants' Collective Invalidity Contentions served Aug. 28, 2015.
Exhibit A6 to Defendants' Collective Invalidity Contentions—Final Claim Chart—'485 against '156 patent, served Aug. 28, 2015.
Exhibit I10 to Defendants' Collective Invalidity Contentions—Final Claim Chart—'485 against '037 patent, served Aug. 28, 2015.

(56) References Cited

OTHER PUBLICATIONS

Exhibit I7 to Defendants' Collective Invalidity Contentions—Final Claim Chart—'083 against '037 patent, served Aug. 28, 2015.
Exhibit K4 to Defendants' Collective Invalidity Contentions—Final Claim Chart—'261 against '839 patent, served Aug. 28, 2015
Fancher, In your pocket: smartcards, Feb. 1997, vol. 34, No. 2, IEEE Spectrum.
Fed Cir, Case No. 16-1947, Dkt No. 2, Order Associating Appellate Case, filed and published May 19, 2016.
House, Spoken-language access to multimedia (SLAM) : a multimodal interface to the World-Wide Web, Jul. 1995, Oregon Health & Science University, OHSU Digital Commons, http://digitalcommons.ohsu.edu/etd.
Information sheets on Rapid 2 Application Software Diagnostic Tools for Effective Patient Management for the Given Diagnostic System, Given Imaging (Copyrgt. 2001-2002), (2 pages), (www.givenimaging.com).
Information sheets on Rapid Booster System Increased Productivity for the Given Diagnostic System, Given Imaging, (.Copyrgt. 2001-2003), (2 pages), (www.givenimaging.com).
ITI Homelink Security Interface (A Quik Bridge Family Product), installation instructions, Jul. 1997.
Lind, abstract of "The Network Vehicle—A Glimpse into the Future of Mobile Multimedia," SAE Paper No. 982901, http://papers.sae.org/982901/, published Nov. 9, 1998.
Perdue, Forget Elevator Music, Here Comes Elevator Internet, Internet News.com, Jul. 20, 1999.
PulsON (May 2000), "Time Modulated Ultra-Wideband for Wireless Applications", 2000Time-Domain Corporation, Time Domain. Rev. 2, (13 pgs.).
VW is working on a Multimedia Car, Reuters AG, Monday Apr. 22.
Wang, Shoukai, at al., (1999), "Apparent Negative Electrical Resistance in Carbon Fiber Composites", Composites, Part B. vol. 30, pp. 579-590.
Yang, Xiaoyu, (Fall 1999), "Carbon Nanotubes: Synthesis, Applications, and Some New Aspects", Thin Films and Nanosynthesis Laboratory, Department of Mechanical and Aerospace Engineering, Suny at Buffalo, consisting of 32 Pages.
VW is working on a Multimedia Car, Reuters AG, in German and English, Apr. 22, 1996.
Angermüller et al., Driver Information and Traffic Telematics—The Comprehensive Concept by the Mannesmann Group, SAE Technical Paper Series 960530, International Congress & Exposition (1996).

Barnes, The Mobile Commerce Value Chain:Analysis and Future Developments, International Journal of Information Management, vol. 22, No. 2, pp. 91-108 (Apr. 2002).
Complaint for Patent Infringement, *West View Research LLC* v. *Volkswagen Group of America, Inc.*, 3:16-cv-02643-LAB-NLS, D.I. 1 (S.D. Cal. Oct. 24, 2016).
IEEE 802.11 standard, 1997, www.ieeexplore.ieee.org/document/654779.
Jagoe, Mobile Location Services, The Definitive Guide, Copyright Registration No. TX 5-732-823.
Jagoe, Mobile Location Services, The Definitive Guide, Library of Congress Date Stamp.
Jagoe, Mobile Location Services, The Definitive Guide, Pearson Education Inc.
Petition for Inter Partes Review of U.S. Pat. No. 8,290,778, Case No. IPR2016-00125, 66 pages, served Nov. 17, 2015.
Petition for Inter Partes Review of U.S. Pat. No. 8,296,146, Case No. IPR2016-00156, 64 pages, served Jan. 17, 2015.
Petition for Inter Partes Review of U.S. Pat. No. 8,682,673, Case No. IPR2016-00137, 65 pages, served Nov. 17, 2015.
Petition for Inter Partes Review of U.S. Pat. No. 8,706,504, Case No. IPR2016-00124, 59 pages, served Nov. 17, 2015.
Petition for Inter Partes Review of U.S. Pat. No. 8,719,037, Case No. IPR2016-00123, 65 pages, served Nov. 17, 2015.
Petition for Inter Partes Review of U.S. Pat. No. 8,719,038, Case No. IPR2016-00146, 66 pages, served Nov. 17, 2015.
Petition for Inter Partes Review of U.S. Pat. No. 8,781,839, Case No. IPR2016-00177, 65 pages, served Nov. 17, 2015.
Rapid 2 Application Software Diagnostic Tools for Effective Patient Management for the Given Diagnostic System, (Copyright 2001-2002) 1 page, www.givenimaging.com.
Virrantaus et al., Developing GIS-Supported Location-Based Services, Proceedings of the Second International Conference on Web Information Systems Engineering (2002).
Volkswagen Group of America, Inc. Petition for Inter Partes Review of U.S. Pat. No. 9,299,053 Pursuant to 35 USC §312 and 37 CFR §42.104, Case No. IPR2017-01156, 73 Pages.
Volkswagen Group of America, Inc. Petition for Inter Partes Review of U.S. Pat. No. 9,412,367 Pursuant to 35 USC §312 and 37 CFR §42.104, Case No. IPR2017-01155, 80 Pages.
Complaint for Patent Infringement, *West View Research LLC* v. *BMW of North America, LLC, et al.*; 3:16-cv-02590 (S.D. Cal.), filed Nov. 10, 2014.
U.S. Court of Appeals for the Federal Circuit, Case No. 16-1947, *West View Research, LLC* v. *Audi AG, et al.*, Document: 84-2; Notice of Entry of Judgment Accompanied by Opinion, filed and entered Apr. 19, 2017, 11 pages.

\* cited by examiner

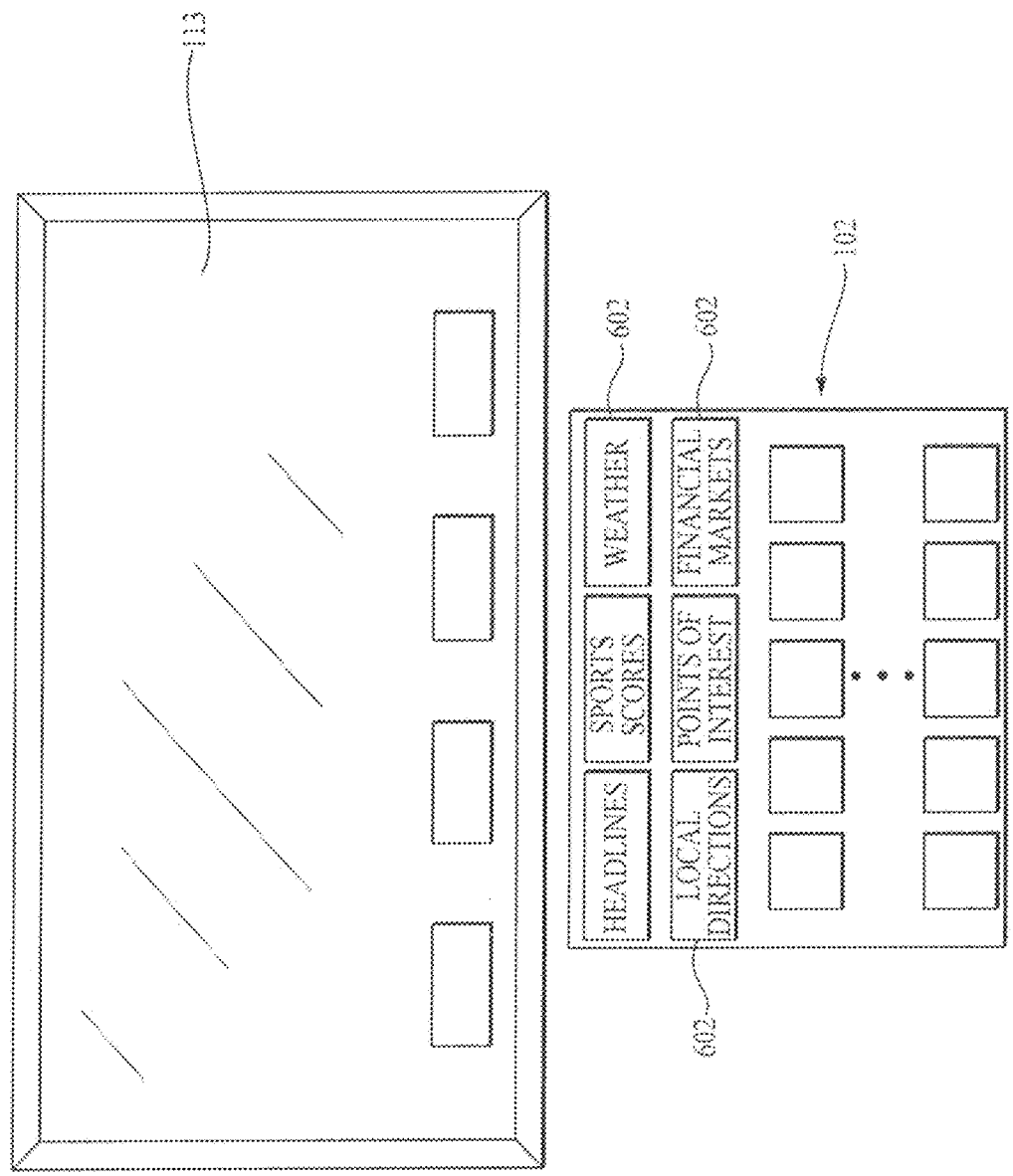

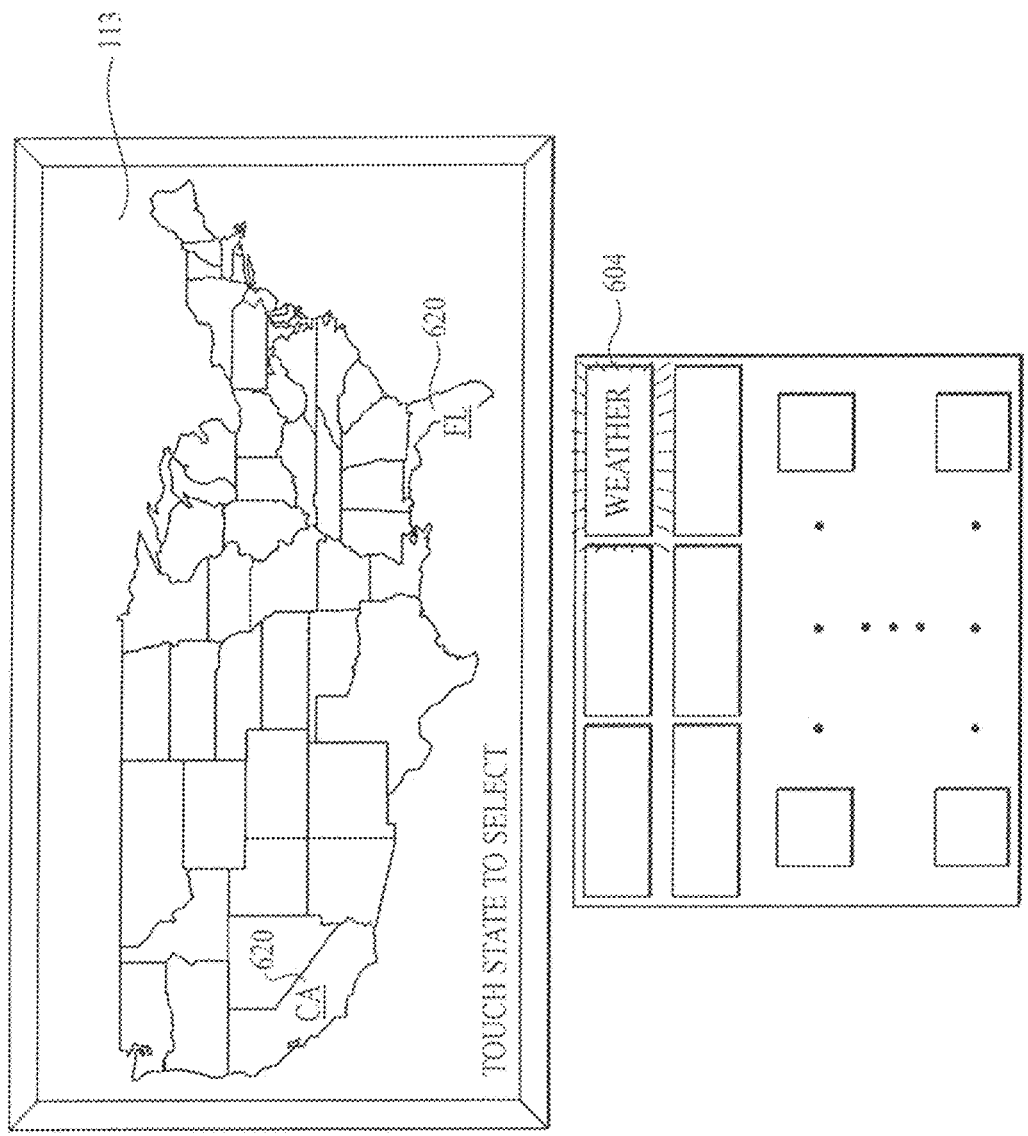

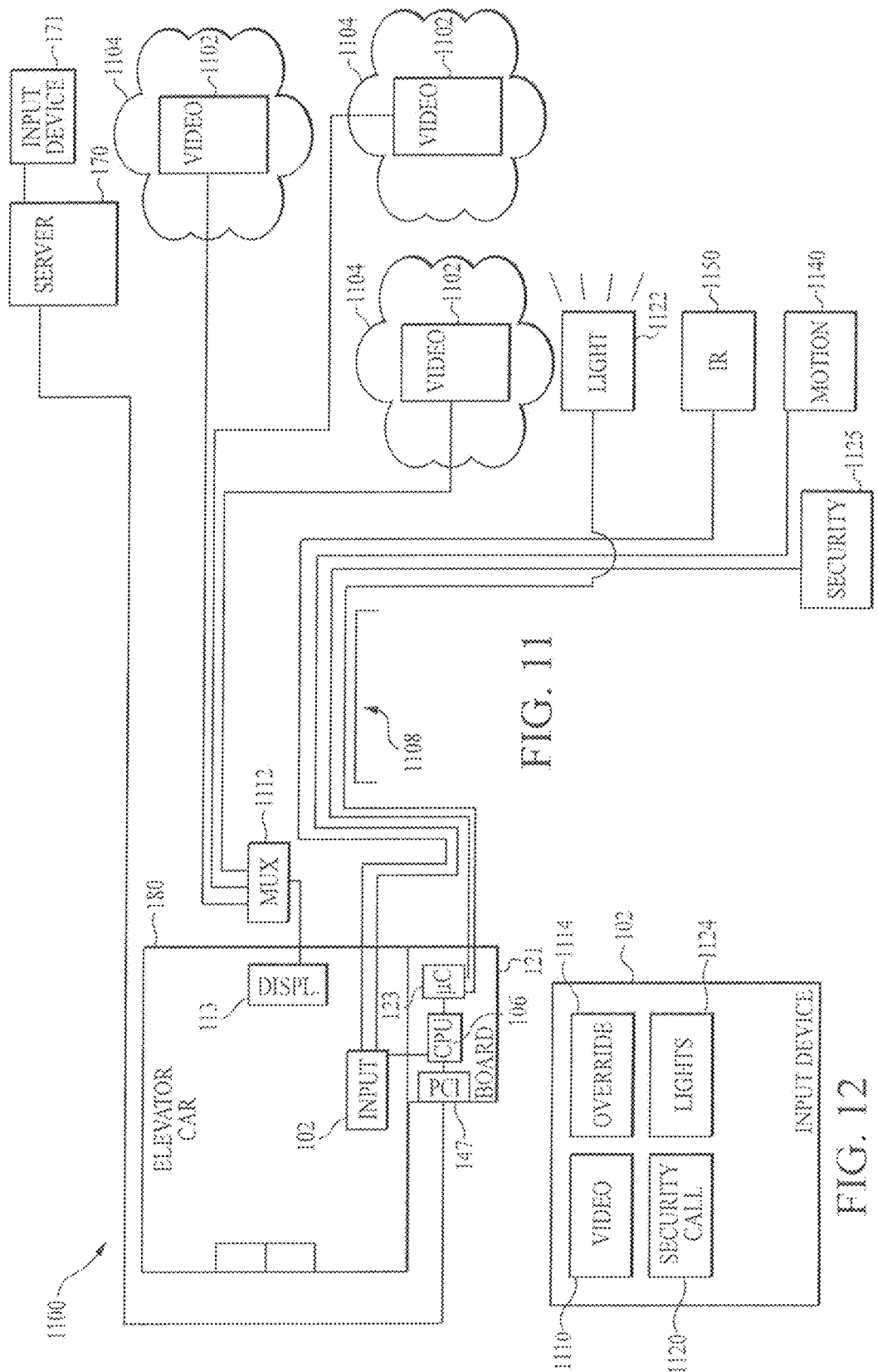

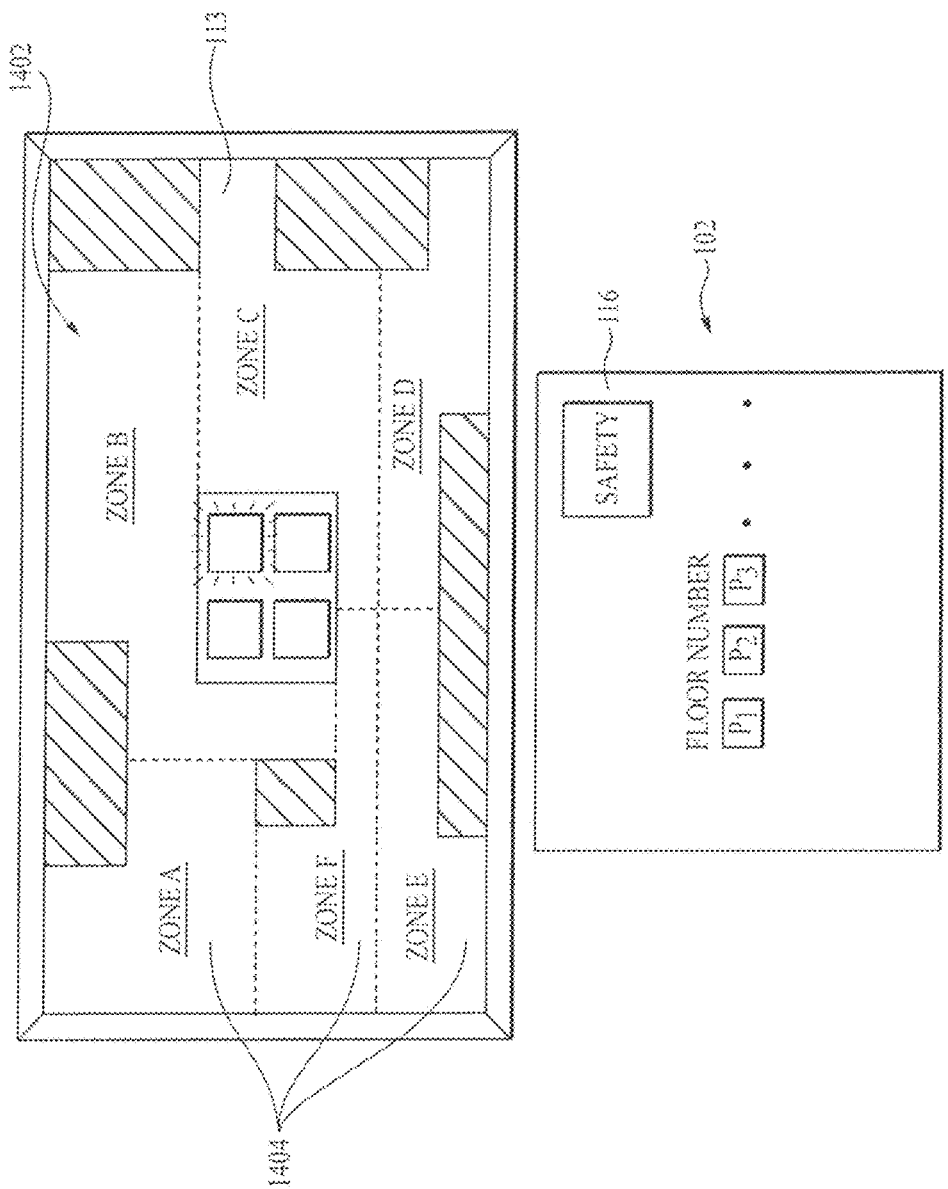

COMPUTERIZED INFORMATION AND DISPLAY APPARATUS WITH REMOTE ENVIRONMENT CONTROL

This application is a divisional of U.S. application Ser. No. 15/230,466 filed Aug. 7, 2016 of the same title, which is a continuation of U.S. patent application Ser. No. 13/733,098 filed Jan. 2, 2013 and entitled "COMPUTERIZED INFORMATION AND DISPLAY APPARATUS", now U.S. Pat. No. 9,412,367, which is a continuation of and claims priority to co-owned U.S. patent application Ser. No. 13/369,850 filed Feb. 9, 2012 and entitled "COMPUTERIZED INFORMATION PRESENTATION APPARATUS", now U.S. Pat. No. 8,447,612, which is a continuation of and claims priority to co-owned U.S. patent application Ser. No. 12/711,692 filed Feb. 24, 2010 and entitled "ADAPTIVE INFORMATION PRESENTATION APPARATUS AND METHODS", now U.S. Pat. No. 8,117,037, which is a continuation of and claims priority to co-owned U.S. patent application Ser. No. 11/506,975 filed Aug. 17, 2006 and entitled "SMART ELEVATOR SYSTEM AND METHOD", U.S. Pat. No. 7,711,565, which is a divisional of and claims priority to co-owned U.S. patent application Ser. No. 10/935,957 filed Sep. 7, 2004 and entitled "SMART ELEVATOR SYSTEM AND METHOD", now U.S. Pat. No. 7,093,693, which is a divisional of co-owned U.S. patent application Ser. No. 10/651,451 filed Aug. 29, 2003 and entitled "SMART ELEVATOR SYSTEM AND METHOD", now U.S. Pat. No. 6,988,071, which is a continuation of co-owned U.S. patent application Ser. No. 09/330,101 filed Jun. 10, 1999 and entitled "SMART ELEVATOR SYSTEM AND METHOD", now U.S. Pat. No. 6,615,175, each of the foregoing incorporated into the present application by reference in its entirety. This application is also related to U.S. patent application Ser. No. 12/703,666 filed Feb. 10, 2010 entitled "ADAPTIVE ADVERTISING APPARATUS AND METHODS", now U.S. Pat. No. 8,065,155, U.S. patent application Ser. No. 12/704,431 filed Feb. 11, 2010 entitled "ADAPTIVE ADVERTISING APPARATUS AND METHODS", now U.S. Pat. No. 8,078,473, Ser. No. 12/711,692 filed on Feb. 24, 2010 entitled "ADAPTIVE INFORMATION PRESENTATION APPARATUS AND METHODS", now U.S. Pat. No. 8,065,156, Ser. No. 13/364,194 filed Feb. 1, 2012 and entitled "COMPUTERIZED INFORMATION PRESENTATION APPARATUS", now U.S. Pat. No. 8,285,553, Ser. No. 13/362,902 filed Jan. 31, 2012 and entitled "ADAPTIVE INFORMATION PRESENTATION APPARATUS", and Ser. No. 13/357,487 filed Jan. 24, 2012 and entitled "ELECTRONIC INFORMATION ACCESS SYSTEM AND METHODS", now U.S. Pat. No. 8,301,456, Ser. No. 13/369,850 filed Feb. 9, 2012 and entitled "COMPUTERIZED INFORMATION PRESENTATION APPARATUS", Ser. No. 13/404,606 entitled "COMPUTERIZED INFORMATION PRESENTATION APPARATUS", now U.S. Pat. No. 8,290,781, Ser. No. 13/404,980 entitled "COMPUTERIZED INFORMATION PRESENTATION APPARATUS", now U.S. Pat. No. 8,296,146, Ser. No. 13/404,853 entitled "COMPUTERIZED INFORMATION PRESENTATION APPARATUS", now U.S. Pat. No. 8,290,778, and Ser. No. 13/405,046 entitled "COMPUTERIZED INFORMATION PRESENTATION METHODS" now U.S. Pat. No. 8,296,153, each filed on Feb. 24, 2012, Ser. No. 13/406,408 entitled "COMPUTERIZED INFORMATION SELECTION AND DOWNLOAD APPARATUS AND METHODS" filed on Feb. 27, 2012, now U.S. Pat. No. 8,311,834, and Ser. No. 13/410,080 entitled "NETWORK APPARATUS AND METHODS FOR USER INFORMATION DELIVERY" filed Mar. 1, 2012, now U.S. Pat. No. 8,285,551, each of which is incorporated herein by reference in its entirety. This application is also related to co-owned U.S. patent application Ser. No. 13/728,512 filed Dec. 27, 2012 and entitled "SMART INFORMATION AND DISPLAY APPARATUS", now abandoned, Ser. No. 13/728,715 filed Dec. 27, 2012 and entitled "COMPUTERIZED INFORMATION AND DISPLAY APPARATUS", now U.S. Pat. No. 8,682,673, Ser. No. 13/737,833 entitled "COMPUTERIZED INFORMATION AND DISPLAY APPARATUS", now U.S. Pat. No. 8,706,504, Ser. No. 13/737,853 entitled "TRANSPORT APPARATUS WITH COMPUTERIZED INFORMATION AND DISPLAY APPARATUS", now U.S. Pat. No. 8,719,037, Ser. No. 13/746,266 entitled "COMPUTERIZED INFORMATION AND DISPLAY APPARATUS", now U.S. Pat. No. 8,781,839, Ser. No. 13/750,583 entitled "COMPUTERIZED INFORMATION AND DISPLAY METHODS", now U.S. Pat. No. 8,712,777, Ser. No. 13/752,222 entitled "COMPUTERIZED INFORMATION AND DISPLAY APPARATUS", now U.S. Pat. No. 8,719,038, and Ser. No. 13/753,407 entitled "COMPUTERIZED INFORMATION AND DISPLAY APPARATUS", now U.S. Pat. No. 8,676,587, each incorporated herein by reference in its entirety. This application is also related to U.S. patent application Ser. Nos. 14/493,198, 14/507,712, 14/488,235, 14/488,239, 14/491,880, 14/493,209, 14/496,879, 14/500,837, 14/505,434, 14/510,067, 14/530,468, 13/755,682, and 13/758,898, filed on Sep. 22, 2014, Oct. 6, 2014, Sep. 16, 2014, Sep. 16, 2014, Sep. 19, 2014, Sep. 22, 2014, Sep. 25, 2014, Sep. 29, 2014, Oct. 2, 2014, Oct. 8, 2014, Oct. 31, 2014, Jan. 31, 2013, and Feb. 4, 2013, respectively, each now abandoned.

BACKGROUND OF THE INVENTION

1. Field of the Invention

The present invention relates to the field of personnel transport apparatus, and specifically to elevators and similar devices for transporting people from one location to another which incorporate various information technologies.

2. Description of Related Technology

Elevators and similar personnel transport devices (such as moving walkways or shuttles) are important aspects of modern urban life. Commonly used in office buildings, airports, shopping malls, and other large structures, these devices transport large numbers of people and equipment between two locations on a routine basis. Elevators in particular are widely used throughout the world.

Depending on loading, a person may spend up to several minutes on an elevator during travel between floors. Significant amounts of time may also be spent waiting for the elevator to arrive when called. This time is usually "dead" from the standpoint that very little can be accomplished or very few tasks undertaken during these few minutes. However, often times an individual may require information which will be of use after leaving the elevator. For example, the person may wish to obtain travel information such as directions to the nearest airport or public transportation node, or the location of a nearby restaurant. Weather-related information or traffic reports may also be useful. A plethora of different types of information, including financial data, breaking news headlines, sports scores and the like may also be of interest to one waiting for or riding on an elevator or other transport device.

An associated problem relates to determining the location of a person, firm, or store within a building when unfamiliar. Building directories are often posted in the lobby of the building, yet these require the user to manually or visually locate the name of the person, firm, or store which they are looking for, and remember the location information associated therewith. Additionally, such directories often do not provide precise location information, but rather merely a floor number and/or suite number. The user often times does not have a graphical representation of the desired location in relation to the elevators, thereby resulting in additional wasted time in finding the location once off of the elevator. Even if a graphical display is provided, it often requires the user to spatially orient themselves to determine relative location.

Security is also a concern when riding elevators late at night or to remote locations. Many elevator systems are used partly or entirely within parking garages, which often may be sparsely populated at off hours. People are all too frequently assaulted or robbed when departing from elevators under such conditions. Unfortunately, existing elevator systems do not have the facility to provide the occupant(s) with the ability to selectively observe the area immediately surrounding the elevator doors on one or more destination floors, or otherwise take precautions to enhance their security.

Another problem associated with existing elevator systems relates to their loading capacity. Often, especially at peak use hours such as during the noon hour, the call buttons for several different floors within a building will be activated, and elevator cars which are at or near their loading capacity will respond. With no additional room available in the elevator, the person depressing the call button on a given floor is left to wait for the elevator doors to close, depress the call button again, and wait for another (hopefully partially vacant) car to arrive. This process not only delays the person waiting for the car, but also those on the elevator car(s), and those waiting on other floors.

In addition to the foregoing, many elevators must have a means of restricting access to certain floors during certain time periods while not interfering with other operations. These elevators generally also include means by which certain users may gain access to the restricted floors, such as a magnetic striped card which is inserted into a card reader on the elevator. However, such card readers are prone to wear and having to re-swipe the card several times in order to obtain access. Furthermore, as the card wears due to repeated swiping or bending (such as when left in the pocket of the individual carrying the card), the card will be more prone to failure and will eventually require replacement. Also, such cards are prone to unauthorized use. Someone stealing or finding the lost card can simply insert it into the card reader of the elevator and gain access to the restricted floor(s). It is also noted that since access is restricted to certain floors typically during late-night or weekend hours, HVAC and lighting systems are typically turned off or dormant in order to conserve energy. Hence, when the user arrives at one of these restricted access floors, several minutes are typically spent turning on the HVAC, lights, and any other number of electrical devices. Some systems require the user to insert their magnetic strip card in a separate reader, such as in the control room for the HVAC (which is typically located on a different floor), in order to initiate equipment operation. This is obviously time consuming and cumbersome.

Lastly, there is often an element of discomfort associated with riding an elevator car, especially when several individuals are present in the car. Due in part to minimal space within the car and nothing to occupy the occupants attention visually, there is a natural tendency for one to stare up, down, or forward at the door of the elevator, or at the visual floor indicators so as to avoid prolonged eye contact with the other occupants.

Heretofore, many of the technologies necessary to address the aforementioned issues have not been available or, alternatively, have been cost or space prohibitive to implement. However, recent advances in data networking, thin or flat panel display technology, personal electronics, and speech recognition and compression algorithms and processing have enhanced the viability of such features from both technological and commercial perspectives.

Based on the foregoing, there is a need for an improved elevator system and method of operation which will reduce the time spent waiting for and travelling on the elevator car, reduce the frustration associated with repeated stops at different floors, and allow the occupants of the elevator (as well as those waiting for the car) to use their time more efficiently and obtain needed information. Additionally, such an elevator system would enhance the security of the occupants upon egress, and allow for automatic recognition of an individual in order to provide access to certain restricted locations and initiation of certain functions such as lighting and HVAC.

SUMMARY OF THE INVENTION

In one aspect, a computerized information apparatus is disclosed. In one embodiment, the apparatus comprises an integrated, environment control-enabled computerized information apparatus of a transport device capable of movement between locations, the computerized information apparatus configured to provide a user with remote control of environment functions associated with a premises, at least a portion of the premises being specifically associated with the user. In one variant thereof, the computerized information apparatus includes: data processing apparatus comprising at least a central processor and a digital signal processor (DSP) and a graphics co-processor; a first wireless interface in data communication with at least a portion of the data processing apparatus; a mass storage device in data communication with at least a portion of the data processing apparatus; a data interface in data communication with at least a portion of the data processing apparatus; a capacitive touch screen input and display device in data communication with at least a portion of the data processing apparatus and both viewable and accessible by the user; computerized logic operative to run on the data processing apparatus and configured to cause actuation of one or more environment control functions associated with the premises.

In one implementation, the computerized logic is configured to: display on the capacitive touch screen input and display device one or more display elements corresponding to the one or more environment control functions; receive via the capacitive touch screen input and display device at least one input corresponding to a user's tactile selection of at least one of the one or more display elements; and cause transmission via the first wireless interface of data relating to the at least one input to cause actuation at the premises of one or more electrically controlled apparatus corresponding to the selected at least one display element.

In a further implementation, the apparatus includes radio frequency apparatus in data communication with at least the computerized logic and at least a portion of the data processing apparatus, the radio frequency apparatus configured to receive data uniquely identifying a portable radio frequency device associated with the user and, based at least on the data uniquely identifying the portable radio frequency device, cause enablement of one or more functions within the transport device, the enablement of one or more functions including at least enablement of the actuation of the environment control functions via the capacitive touch screen input and display device.

In one sub-implementation, the one or more environment control functions comprise at least one of (i) a heating, ventilation, or air conditioning (HVAC) function, (ii) a lighting function; and/or (iii) an imagery monitoring function.

In another implementation, the computerized information apparatus is further configured to, based at least on the identifying the portable radio frequency device, enable selective actuation of only portions of the environment control functions corresponding specifically to the at least portion of the premises associated with the user, the selective actuation enabling a savings of energy as compared to non-selective actuation, the non-selective actuation comprising: (i) actuation of the environment control functions associated with the at least portion of the premises associated with the user, and (ii) actuation of environment control functions associated with one or more non-user-specific portions of the premises.

In a further implementation, the radio frequency apparatus is further configured to engage in an authentication process relating to the portable radio frequency device prior to the enablement of the one or more functions, the authentication process comprising: (i) receipt of electromagnetic radiation transmitted from the portable radio frequency device and encoded with the data uniquely identifying the portable radio frequency device; and (ii) comparison of the received data, and second data relating to one or more authenticated radio frequency devices. The transmission of the data uniquely identifying the portable radio frequency device may comprise e.g., transmission of at least a portion of the data in an encrypted form; and the radio frequency apparatus may be configured to decrypt the encrypted at least portion of the data.

In another implementation, the radio frequency device apparatus is configured to: detect an indication of a possible presence of the portable radio frequency device within a communications range of the radio frequency apparatus; and in response to the detection, transmit an interrogating radio frequency signal configured to cause the portable radio frequency device to respond. The detection comprises actuation of a function or sensor of the transport device, the function or sensor in signal communication with the computerized information system.

In a further implementation, the computerized information apparatus is further configured to establish a temporary data link with a portable electronic device via the data interface so as to enable data transfer between the portable electronic device and the computerized information apparatus, the data transfer between the portable electronic device and the computerized information apparatus comprising transfer of data from the computerized information apparatus to the portable electronic device that is configured so as to occur automatically when the portable electronic device establishes data communication with the computerized information apparatus via the data interface, the transferred data configured specifically for the user, the configuration specifically for the user based at least in part on data relating specifically to that user and previously stored on a network server apparatus, the previously stored data which relates specifically to that user and is based at least in part on one or more previously supplied user-selected configuration parameters, the transferred data only transferred after successfully performing at least authentication of the portable radio frequency device.

In yet another implementation, the computerized information apparatus further comprises second computerized logic in data communication with the data processing apparatus and configured to: receive a plurality of successive digitized representations of respective speech inputs of the user of the transport device, the speech inputs relating to a desired function to be performed by the computerized information system, the desired function relating to at least one of a plurality of topical areas.

In another implementation, the provision of the remote control of environment functions associated with a premises is performed automatically via at least the data uniquely identifying the portable radio frequency device, and the radio frequency apparatus is further configured to engage in an authentication process relating to the portable radio frequency device prior to the enablement of the one or more functions, the authentication process comprising: (i) receipt of electromagnetic radiation transmitted from radio frequency apparatus to the portable radio frequency device and encoded with first data which provides unique identification of the radio frequency apparatus; and (ii) comparison of the received first data, and second data relating to one or more authenticated radio frequency apparatus. The portable radio frequency device is in one sub-implementation configured such that the authentication process must be completed before the portable radio frequency device transmits the data uniquely identifying the portable radio frequency device. The transmission of the data uniquely identifying the portable radio frequency device may comprise transmission of at least a portion of the data in an encrypted form; and the radio frequency apparatus may be configured to decrypt the encrypted at least portion of the data.

Additionally, the radio frequency device apparatus can be configured to: detect an indication of a possible presence of the portable radio frequency device within a communications range of the radio frequency apparatus; and in response to the detection, transmit an interrogating radio frequency signal configured to cause the portable radio frequency device to respond. The detection may comprise e.g., actuation of a function or sensor of the transport apparatus, the function or sensor in signal communication with the computerized information system.

In still a further implementation, the computerized information apparatus further includes at least one computer program, the at least one computer program being configured to, when executed on the data processing apparatus: cause generation and display on the capacitive touch screen input and display device of at least a map graphic showing at least the at least portion of the premises; receive a user touch input via the capacitive touch screen input and display device relating a particular location on a screen of the capacitive touch screen input and display device, the particular location corresponding to a location within the displayed at least portion of the premises; and cause activation of the environment control function associated with at least the particular location.

The at least one computer program may further be configured to, when executed on the data processing apparatus: cause conversion of a coordinate of the user touch input to geographic or spatial location data; and transmit at least a portion of the geographic or spatial location data via the first wireless interface to the premises to enable the activation of the environment control function associated with at least the particular location; and/or cause selection of the map graphic based at least in part on the data uniquely identifying the portable radio frequency device received by the radio frequency apparatus of the computerized information system; at least a portion of the map graphic comprising graphical image data that has been transmitted to computerized information apparatus by a networked server apparatus via the first wireless interface.

In a further implementation, the computerized information apparatus of further includes at least one computer program, the at least one computer program being configured to, when executed on the data processing apparatus: obtain digitized speech generated based on speech received from a user, the digitized speech relating to an organization or entity which the user wishes to locate; and access a network entity via the first wireless interface in order to obtain data relating to the location of the organization or entity, the obtained data based at least in part on the digitized speech; receive at least a portion of the obtained data relating to the location via the first wireless interface; and cause display on the capacitive touch screen input and display device of the location, the display based at least in part on the received at least portion of data.

In one sub-implementation, the display further comprises provision of at least a map graphic showing the location including other organizations or entities proximate thereto, and the computerized information apparatus is further configured to: receive a user touch input via the capacitive touch screen input and display device relating a particular location on a screen of the capacitive touch screen input and display device; cause conversion of a coordinate of the user touch input to an actual geographic location; and cause display, on the capacitive touch screen input and display device, of an image relating to the actual geographic location. The image comprises e.g., image data generated by one or more cameras disposed at the actual geographic location.

In another implementation, at least a portion of the map graphic comprises graphical image data that has been transmitted to computerized information apparatus by a networked server apparatus via the first wireless interface, the at least portion of the map graphic selected by the network server apparatus based at least on the digitized speech; in one variant, the graphics co-processor is configured to render at least a portion of the map graphic on the capacitive touch screen input and display device.

The computerized information apparatus may also be configured to generate a plurality of interactive hyperlinks displayed on the touch screen input and display device, the plurality of hyperlinks configured to each, when selected by the user, access a universal resource locator (URL) associated with an internet web server, and obtain information from the web server via the first wireless interface for display on the touch screen input and display device, at least one of the plurality of hyperlinks enabling access of information particularly relating to the actual geographic location or its immediate surroundings. For instance, the actual geographic location can comprise a location within a building or structure, and the immediate surroundings are also within the building or structure; and the organization or entity, and other organizations or entities proximate thereto, are each also within the building or structure.

In another embodiment, the integrated, environment control-enabled computerized information apparatus of the transport device is configured to provide a user with remote control of environment functions associated with a premises, and includes: data processing apparatus comprising at least a central processor and a digital signal processor (DSP) and a graphics co-processor; a first wireless interface in data communication with at least a portion of the data processing apparatus; a mass storage device in data communication with at least a portion of the data processing apparatus; a data interface in data communication with at least a portion of the data processing apparatus; radio frequency apparatus in data communication with at least a portion of the data processing apparatus; a capacitive touch screen input and display device in data communication with at least a portion of the data processing apparatus and both viewable and accessible by the user while utilizing the transport device; and at least one computer program operative to run on the data processing apparatus and configured to cause actuation of one or more environment control functions associated with the premises.

In one variant, the at least one computer program is configured to, when executed, implement the method comprising: receiving, via at least the radio frequency apparatus, data uniquely identifying a portable radio frequency device associated with the user; based at least on the data uniquely identifying the portable radio frequency device, identifying an authorized user associated with the portable radio frequency device; based at least on the identification of the authorized user, causing enablement of one or more functions within the transport device, the enablement of one or more functions including at least enablement of the actuation of the one or more environment control functions; causing display on the capacitive touch screen input and display device one or more display elements corresponding to the one or more enabled environment control functions; receiving via the capacitive touch screen input and display device at least one input corresponding to a user's tactile selection of at least one of the one or more display elements; and causing transmission via the first wireless interface of data relating to the at least one input to cause actuation at the premises of one or more electrically controlled apparatus corresponding to the selected at least one display element. In one implementation, the one or more environment control functions comprise at least one of (i) a heating, ventilation, or air conditioning (HVAC) function; (ii) a lighting function; and/or (iii) an imagery monitoring function.

In another implementation, the at least one computer program is further configured to, when executed: prior to the receipt of data uniquely identifying a portable radio frequency device associated with the user, cause transmission of radio frequency energy from the radio frequency apparatus, the transmitted radio frequency energy encoding data useful in a wireless authentication process conducted between the radio frequency apparatus and the portable radio frequency device, the transmitted radio frequency energy further causing the portable radio frequency device to respond with at least the data uniquely identifying the portable radio frequency device; and based at least on the identification of the authorized user associated with the portable radio frequency device, enable access to a networked server via the first wireless interface, the access enabling access to information stored on the networked server that has been specifically configured for the authorized user according to a user-specific information profile, the information-specific profile established based at least in part on one or more parameters or user inputs previously provided by the user.

In one sub-implementation, the one or more environment control functions comprise the imagery monitoring function; the electrically controlled apparatus comprises one or more video cameras; and the at least one computer program is further configured to, when executed: receive via the first wireless interface data transmitted from the premises, the data transmitted from the premises generated by the one or more video cameras and digitally compressed using a digital data compression algorithm, so as to reduce wireless transmission bandwidth requirements; and cause display within a display window generated on the capacitive touch screen input and display device, at least a portion of the received data transmitted from the premises.

In a further embodiment, the computerized information apparatus includes: data processing apparatus comprising at least a central processor and a digital signal processor (DSP) and a graphics co-processor; a first wireless interface in data communication with at least a portion of the data processing apparatus; a mass storage device in data communication with at least a portion of the data processing apparatus; a data interface in data communication with at least a portion of the data processing apparatus; radio frequency apparatus in data communication with at least a portion of the data processing apparatus; a capacitive touch screen input and display device in data communication with at least a portion of the data processing apparatus and both viewable and accessible by the user; and at least one computer program operative to run on the data processing apparatus and configured to cause actuation of one or more environment control functions associated with the at least portion of the premises specific to at least the user.

In one implementation, the at least one computer program is configured to, when executed, implement the method comprising: receiving, via at least the radio frequency apparatus, data uniquely identifying a portable radio frequency device associated with the user, the portable radio frequency device being with a communications range of the radio frequency apparatus as determined at least in part based on actuation of a function or sensor of the transport device; based at least on the data uniquely identifying the portable radio frequency device, identifying an authorized user associated with the portable radio frequency device; based at least on the identification of the authorized user, causing enablement of one or more functions within the transport device, the enablement of one or more functions including at least enablement of the actuation of the one or more environment control functions; causing display on the capacitive touch screen input and display device, a map or floor plan graphic of at least the at least portion of the premises; receiving via the capacitive touch screen input and display device at least one input corresponding to a user's tactile selection of at least a portion of the map or floor plan graphic, the user's tactile selection to cause activation of one or more of the environment control functions within the at least portion of the premises; causing determination of a geographic or spatial reference associated with the user's selected at least a portion of the map or floor plan graphic; and causing transmission via the first wireless interface of data relating to (i) the one or more environment control functions for which activation is to be caused via the user's tactile selection; and (ii) the geographic or spatial reference, the transmitted data enabling actuation at the premises of one or more electrically controlled apparatus corresponding to the selected one or more environment control functions and associated with the geographic or spatial reference.

In another aspect, integrated computerized information apparatus of a transport device capable of movement between locations is disclosed. In one embodiment, the computerized information apparatus is configured to automatically provide an authorized user with a plurality of user-specific control functions, the automatic provision based at least on recognition of a portable radio frequency device carried by the user by the computerized information apparatus, and the computerized information apparatus includes: data processing apparatus comprising at least a central processor and a digital signal processor (DSP) and a graphics co-processor; a first wireless interface in data communication with at least a portion of the data processing apparatus; a mass storage device in data communication with at least a portion of the data processing apparatus; radio frequency apparatus in data communication with at least a portion of the data processing apparatus; a data interface in data communication with at least a portion of the data processing apparatus; a capacitive touch screen input and display device in data communication with at least a portion of the data processing apparatus and both viewable and accessible by the user; at least one computer program operative to run on the data processing apparatus.

In one implementation, the at least one computer program is configured to, when executed: conduct, via at least the radio frequency apparatus, an authentication process with the portable radio frequency device, the authentication process comprising transmission of radio frequency energy from the radio frequency apparatus, the transmitted radio frequency energy encoding data enabling the portable radio frequency device to identify at least one of the radio frequency apparatus and/or the computerized information apparatus, the transmitted radio frequency energy further configured to cause the portable radio frequency device to respond with at least the data uniquely identifying the portable radio frequency device, at least one of the encoded data enabling the portable radio frequency device to identify at least one of the radio frequency apparatus and the data uniquely identifying the portable radio frequency device comprising an encrypted protocol; receive, via at least the radio frequency apparatus, the data uniquely identifying the portable radio frequency device; based at least on the data uniquely identifying the portable radio frequency device, identify the authorized user of the transport device; based at least on the identification of the authorized user, cause enablement of one or more functions within the transport device.

In one variant, the enablement of one or more functions includes at least enablement of: (i) remote actuation of the one or more environment control functions associated with a premises associated with the authorized user, the one or more environment control functions comprising at least one of (i) a heating, ventilation, or air conditioning (HVAC) function; (ii) a lighting function; and/or (iii) an imagery monitoring function; and (ii) access data stored at least in part on the computerized information apparatus, the accessed data comprising a user-specific profile or user-specific parameters previously provided by the authorized user, the accessed data enabling the computerized information apparatus to automatically configure at least one information access function of the computerized information apparatus specifically for the authorized user.

In one variant, the enablement of the remote actuation of the one or more environment control functions associated with a premises associated with the authorized user includes causing display on the capacitive touch screen input and display device of one or more display elements corresponding to the one or more enabled environment control functions, the one or more display elements each responsive to a user's tactile selection thereof to cause transmission by the computerized information apparatus via the first wireless interface of data relating to the tactile selection to cause actuation at the premises of one or more electrically controlled apparatus corresponding to a respective one of the one or more display elements.

In another variant, the computerized information apparatus is further configured to establish a temporary data link with a portable electronic device via the data interface so as to enable data transfer between the portable electronic device and the computerized information apparatus, the data transfer between the portable electronic device and the computerized information apparatus comprising transfer of data from the computerized information apparatus to the portable electronic device that is configured so as to occur automatically when the portable electronic device establishes data communication with the computerized information apparatus via the data interface, the transferred data configured specifically for the user, the configuration specifically for the user based at least in part on data relating specifically to that user and previously stored on a remote network server apparatus, the previously stored data which relates specifically to that user and is based at least in part on one or more previously supplied user-selected configuration parameters, the transferred data only transferred after successfully performing at least authentication of the portable radio frequency device.

In another variant, the computerized apparatus further includes computerized logic in data communication with the data processing apparatus and configured to: receive a plurality of successive digitized representations of respective speech inputs of the user of the transport device, the speech inputs relating to a desired function to be performed by the computerized information system, the desired function relating to at least one of a plurality of topical areas for which the computerized information apparatus can provide information, the at least one of the topical areas comprising location of a business or entity, a first of the respective speech inputs comprising a name or part of a name, at least a portion of the respective speech inputs comprising responses to one or more prompts instigated by the computerized information apparatus to elicit a response enabling the computerized logic to converge on one of a plurality of possible matches to the first of the plurality of digitized representations; cause at least one wireless access of a network server apparatus via at least the first wireless interface to access information necessary to perform the desired function, the at least one wireless access comprising at least one of the successive digitized representations; receive accessed information obtained from the network server apparatus via the first wireless interface; and implement the desired function on the computerized information system using at least a portion of the received information and at least the capacitive touch-screen display and input device, the implementation of the desired function comprising: generation and display on the capacitive touch screen input and display device of at least a map graphic showing at least the at least portion of an area; receive a user touch input via the capacitive touch screen input and display device relating a particular coordinate on a screen of the capacitive touch screen input and display device, the particular coordinate corresponding to a location within the displayed at least portion of the area; cause conversion of the coordinate of the user touch input to spatial location data; and transmit at least a portion of the spatial location data via the first wireless interface to a networked server in order to enable access to imagery associated with an actual geographic location specified by the spatial location data.

The computerized information apparatus may further be configured to generate a plurality of interactive hyperlinks displayed on the touch screen input and display device, the plurality of hyperlinks configured to each, when selected by the user, access a universal resource locator (URL) associated with an internet web server, and obtain information from the web server via the first wireless interface for display on the touch screen input and display device, at least one of the plurality of hyperlinks enabling access of information particularly relating to the actual geographic location or its immediate surroundings.

BRIEF DESCRIPTION OF THE DRAWINGS

FIG. 6a is a plan view of one embodiment of a network input device having dedicated function keys thereon.

FIGS. 6b and 6c illustrate one embodiment of an exemplary coordinated graphic weather display according to the present invention.

FIG. 11 is a block diagram illustrating one embodiment of the monitoring and security sub-system of the present invention.

FIG. 12 illustrates one embodiment of the elevator car touch panel used in conjunction with the monitoring and security sub-system of FIG. 11.

FIGS. 14a and 14b are plan views of one embodiment of the parking and video monitoring displays, respectively, of the monitoring and security sub-system of FIG. 11.

DESCRIPTION OF THE INVENTION

Reference is now made to the drawings listed above, wherein like numerals refer to like parts throughout.

It is noted that while the system and methods of the invention disclosed herein are described primarily with respect to an elevator car, certain aspects of the invention may be useful in other applications, including, without limitation, other types of personnel transport devices such as trams or shuttles or moving walkways, or stationary devices such as kiosks within the lobby or elevator waiting areas of a building. As used herein, the term "building" is meant to encompass any structure, whether above ground or underground, permanent or temporary, used for any function.

General Description

Figure 1:
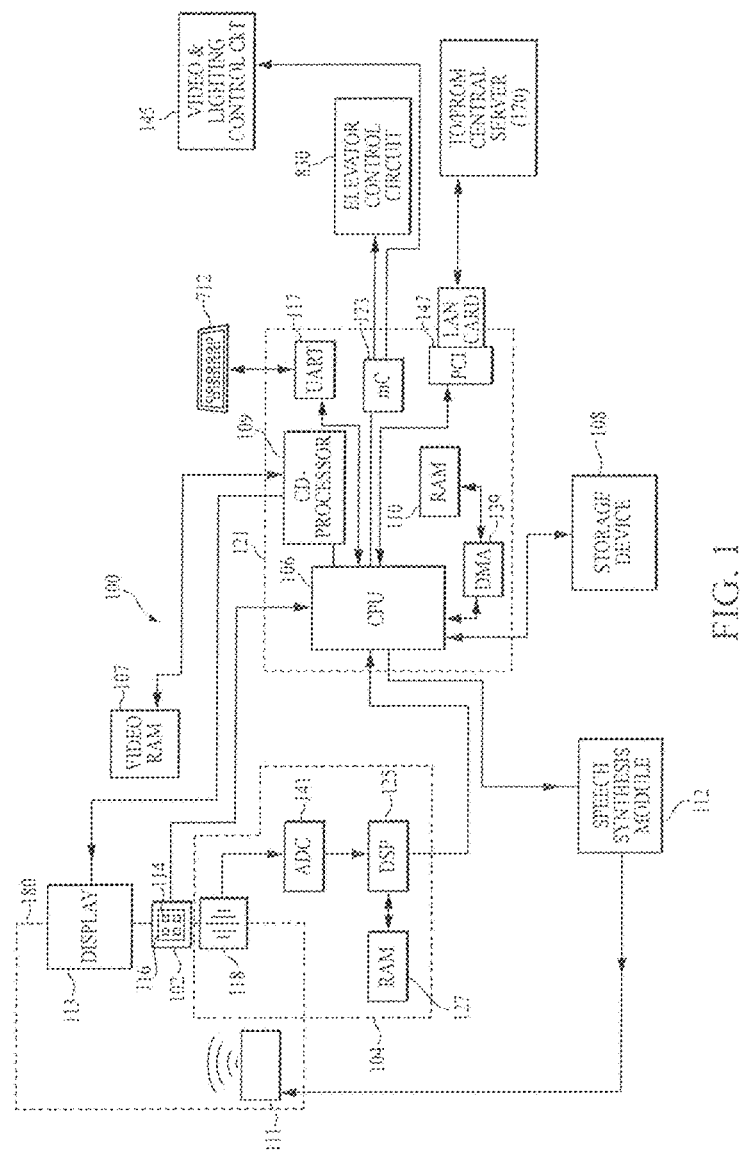
FIG. 1 is a block diagram of one embodiment of the information and control system of the invention, showing those components local to each elevator car.
Figure 2:
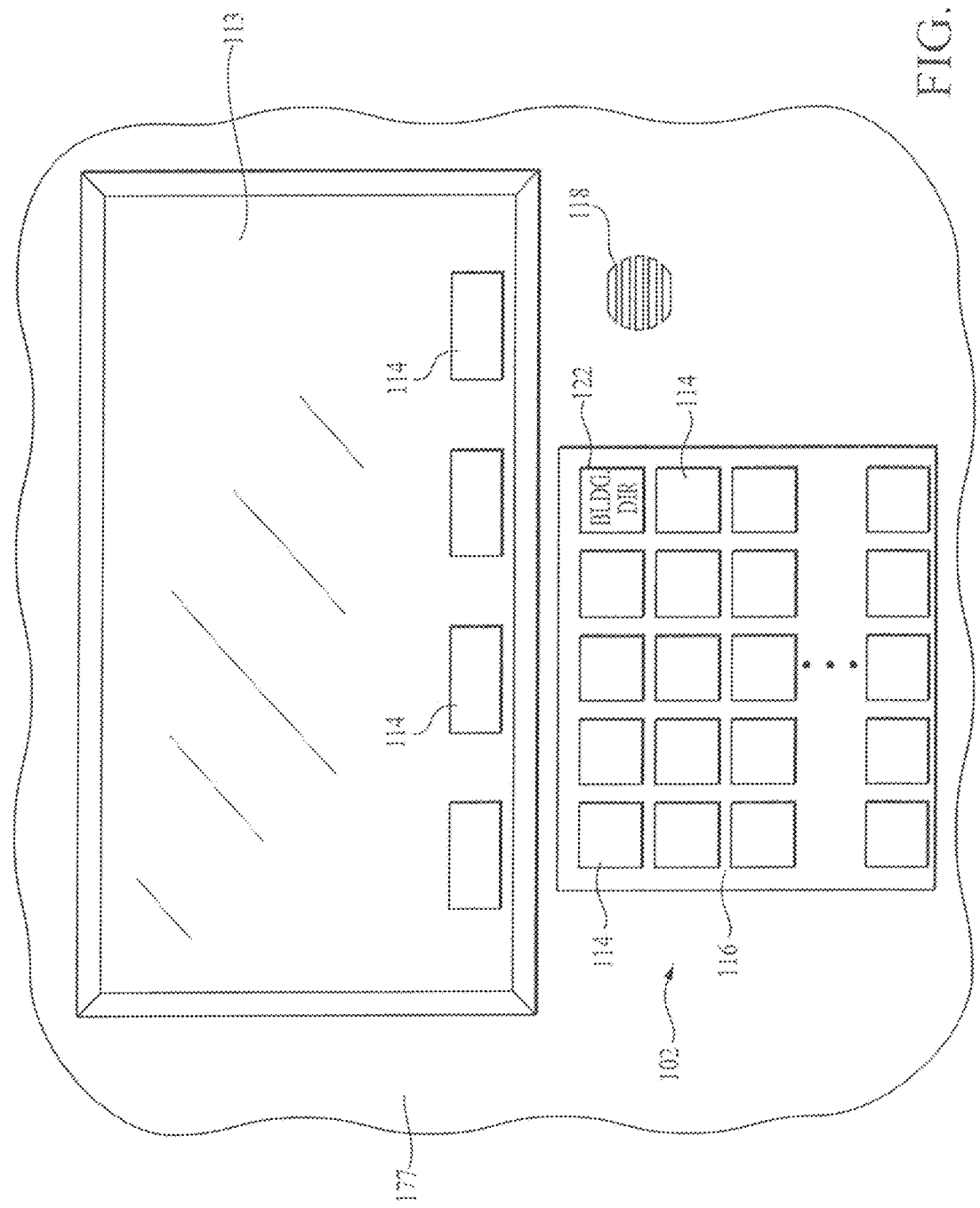
FIG. 2 is a plan view of a first embodiment of the interface panel of the information and control system of FIG. 1, including the touch keypad and the display device.

Referring now to FIGS. 1 and 2, one embodiment of an improved elevator information system is generally described. As shown in FIG. 1, the system 100 includes an input device 102, speech recognition (SR) module 104, central processor 106 with associated motherboard 121, video RAM 107, non-volatile storage device 108 containing a database (not shown), graphics co-processor 109, volatile or dynamic storage device 110 with associated DMA module 139, audio amplifier and speaker module 111, speech synthesis module 112, micro-controller 123, PCI slots 147, and display device 113. The system also includes a serial bus with universal asynchronous receiver transmitter (UART) 117 or alternatively universal serial bus (USB), as described in greater detail below with respect to FIG. 7. As shown in FIG. 2, the input device 102 of the present embodiment is a touch-sensitive keypad and/or display screen of the type well known in the electrical arts. The input device 102 includes a variety of different functional keys 114 on a keypad 116 (and/or on a touch-sensitive display screen 113, as described below) which allow the user to initiate a query of the database either manually via the keypad 116, display device 113, or audibly through the speech recognition module 104.

As shown in FIG. 1, the speech recognition module 104 of the present invention includes a high quality, high SNR audio microphone 118, analog-to-digital converter (ADC) 141, and linear predictive coding (LPC)-based spectral analysis algorithm run on a digital signal processor 125 having associated SR module RAM 127. It will be recognized that other forms of spectral analysis, such as MFCC (Mel Frequency Cepstral Coefficients) or cochlea modeling, may be used. Phoneme/word recognition in the present embodiment is based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

In the present embodiment, CELP-based voice data compression is also utilized for transmission and storage of voice data. CELP algorithms in general are useful for converting analog speech to a compressed digital format which is more rapidly and easily manipulated and stored within a digital system using less bandwidth and memory. CELP algorithms and low bit rate vocoder technology are well known in the signal processing art, and accordingly will not be described further herein. Note that as used herein, the term CELP is meant to include any and all variants of the CELP family such as, but not limited to, ACELP, VCELP, and QCELP. It is also noted that while CELP is used as the basis of compression within the system 100, other types of compression algorithms and techniques, whether based on compounding or otherwise, may be used. For example, PCM (pulse code modulation) or ADPCM (adaptive delta PCM) may be employed, as may other forms of linear predictive coding (LPC).

As illustrated in FIG. 1, signals generated by the microphone 118 are digitized by the ADC 141 and processed using the aforementioned speech recognition algorithm and the DSP 125 to produce digital representations of the user's speech. The speech library or dictionary stored within the SR module memory 127 is used by the DSP 125 to match phoneme strings resulting from the LPC analysis with known words. Once a "match" is identified, the central processor 106 and/or micro-controller 123 implement the desired functionality, such as retrieving one or more data files from the storage device 108 for display on the display device 113.

The DSP 125 of the present embodiment is a Texas Instruments TMS320C6x VLIW digital signal processor or equivalent, although it will be recognized that other types of processors may be used. The 'C6x DSP is chosen for its speed and capability, thereby allowing for real-time speech recognition. The central processor 106 and associated motherboard architecture (e.g., northbridge, southbridge, etc.) is optimally an Intel Pentium II®-based design, although others, such as the AMD K600-series processors, may be used in place of the Pentium II®. The aforementioned USB is also advantageously used with the Pentium architecture.

The information and control system keypads 116 and displays 113 (FIG. 2) are placed at waist and eye level, respectively, within the elevator car 180 to facilitate easy access and viewing by the user, and limit the amount of incidental contact by passengers in the elevator. A plurality of different input/display devices are optimally disposed within the smart elevator to allow multiple occupants to obtain information simultaneously. A capacitive "touch keypad" is used as the input device 102 in the present embodiment to increase input device longevity and thwart vandalism. Specifically, since the function keys 114 on the keypad 116 do not have a mechanical actuating device (such as a spring and set of electrical contacts) which will wear with time, they will as a general rule last longer. Additionally, since the keypad 116 has no openings in the vicinity of the individual keys, any incidental contact with deleterious substances such as cleaning fluids will not affect the operation of the system or degrade its longevity. Similarly, vandalism is discouraged, since there are no openings or other access points present within the interior of the elevator car. The keypad 116 may also be covered with a protective coating of the type well known in the art without affecting the operation of the panel, since, if properly chosen, such a coating merely acts as a dielectric for the capacitor formed between the underlying contacts and the user. It will be recognized, however, that any number of input devices, including "mechanical" keypads, trackballs, light pens, pressure sensitive "touch" keypads, or the like may be used in conjunction with the present invention if so desired. The touch keypads 116 are, in the present embodiment, mounted flush with the vertical wall surfaces 177 of the elevator car so as to make them as physically unobtrusive as possible.

The touch-screen display 113 generates a variety of different messages or display formats based on the user's input and query. These messages and formats are stored as digital data on the storage device 108 (and temporarily in video RAM 107) which is accessed by the processor 106. The display devices 113 of the present embodiment are low profile capacitive LCD touch screen devices of the type well known in the art, although other types of displays, including "flat" cathode ray tubes, plasma, or TFT displays may be used. Such displays optimally limit the amount of space required external to the interior volume of the elevator car to accommodate the system 100 of the present invention. Furthermore, it is noted that a non-touch sensitive display (not shown) may be used with the aforementioned input device 102 if desired, the latter acting as the sole input device (other than the speech recognition module 104 and associated microphone 118).

In the embodiment of FIGS. 1-2, the processor 106, video RAM 107, storage devices 108, 110, and other components (including necessary power supplies, not shown) are disposed within equipment storage housings (not shown) located on the exterior of the elevator car 180 so as to be invisible to the occupants thereof. This arrangement is used primarily to allow rapid access to and processing of data by the system 100, thereby facilitating the rapid delivery of information to the system user. Hence, the information and control system 100 of each elevator car is to a degree "self contained", with the exception of several common functions performed by a central server 170.

Figure 3:
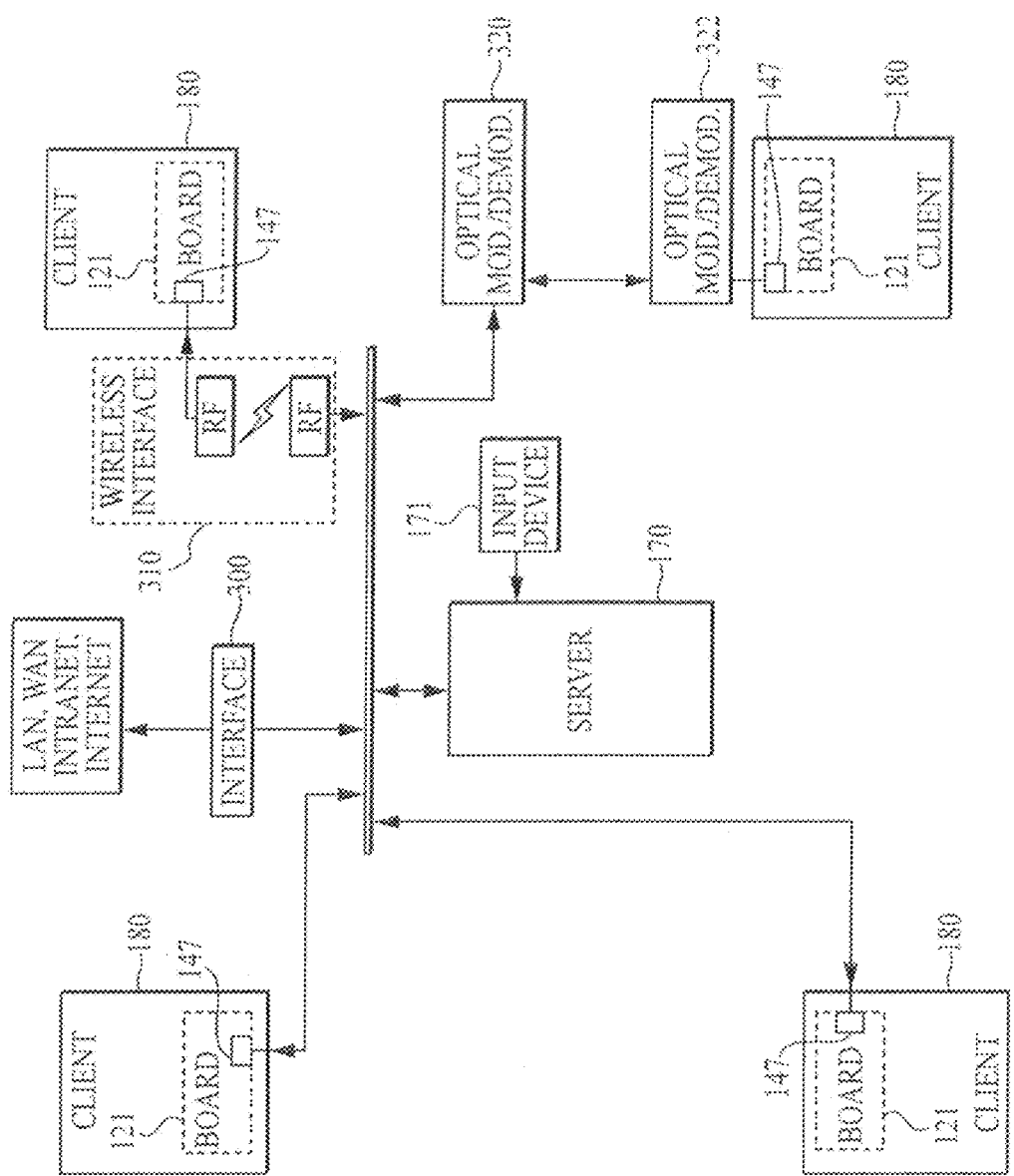
FIG. 3 is a block diagram of one embodiment of the information and control system network architecture.

As shown in FIG. 3, the central server 170 is located remotely from the elevator cars and connected to the elevator car "clients" 180 via a local area network architecture such as a bus, star, ring, star/bus, or other similar topology. A bus topology is shown in FIG. 3. The network may operate according to any number of networking protocols including, for example, ATM, Ethernet, Gigabit Ethernet, IP, IP over ATM, or X.25. Connection cabling from the peripheral component interconnect (PCI) slots 147 on each motherboard 121 carrying the network interface devices (such as a LAN card) is run alongside the existing elevator power and control cables within the cable bundle servicing each car.

In an alternative embodiment, data may be transferred between the elevator cars 180 and the remote server 170 via a wireless interface 310 (FIG. 3) such as a direct sequence spread spectrum (DSSS) or frequency hopping spread spectrum (FHSS) system as specified by IEEE Standard 802.11. It will be recognized, however, that any wireless interface capable of accommodating the bandwidth requirements of the system 100 may be used. Optical networking architectures and protocols (such as SONET) may also be used if desired; optical modulators and demodulators 320, 322 of the type well known in the data networking arts are employed for transferring data between the server 170 and the client(s) 180 in such architectures.

It will be appreciated that many different arrangements for the disposition of various components within the system, including, inter alia, the processor/motherboard, storage devices, server, and memory (and the transfer of data and signals there between) are possible, all of which are encompassed within the scope of the present invention.

Building Directory Sub-System

Figure 4:
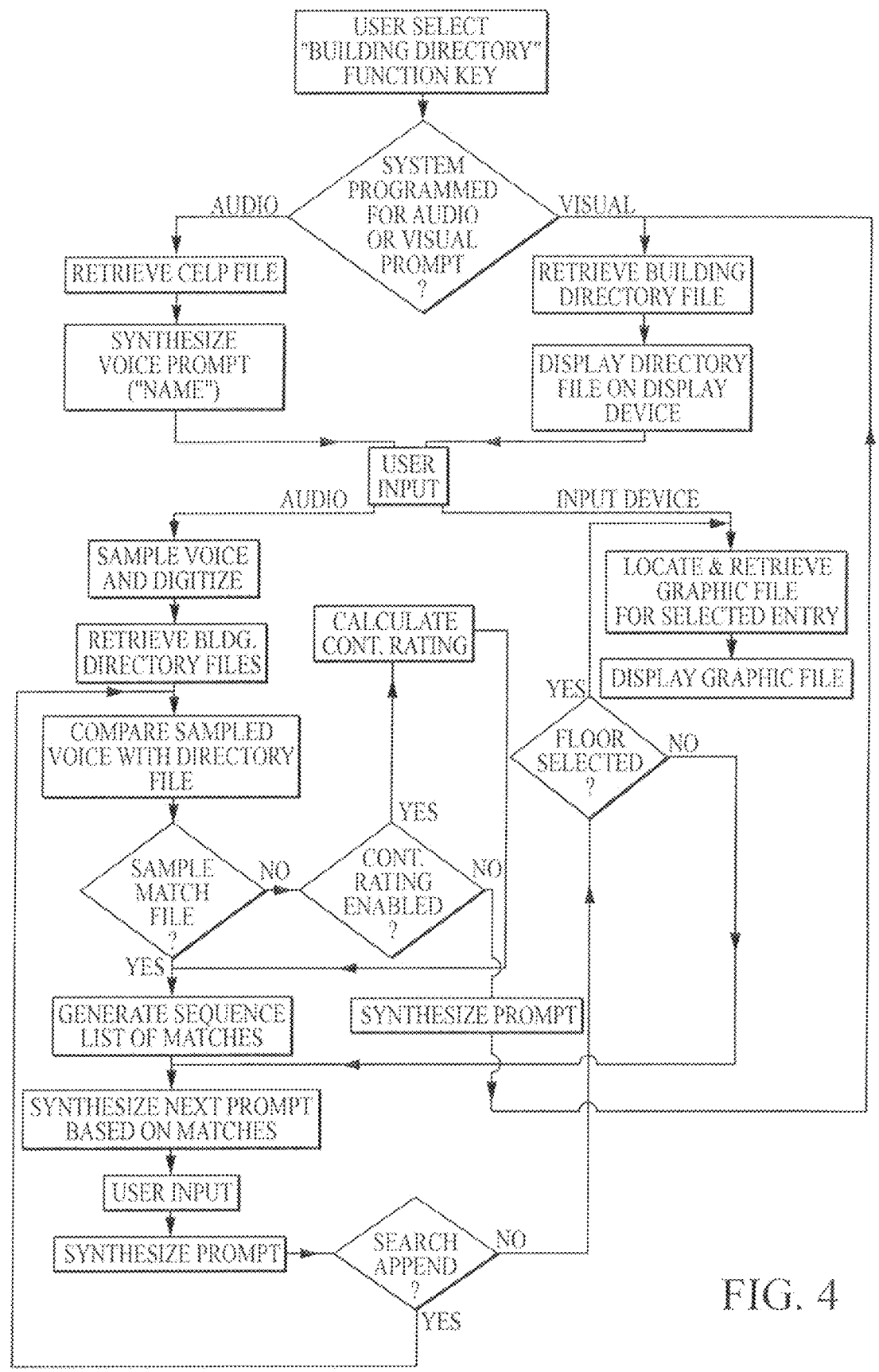
FIG. 4 is a logic diagram illustrating the operation of one embodiment of the building directory sub-system of the invention.

The operation of the building directory sub-system is now described in greater detail with reference to the logic diagram of FIG. 4, and the components of FIGS. 1-3. As used herein, the term "building directory sub-system" refers to that collection of components, firmware, and software within the information and control system 100 of FIG. 1 which perform the building directory functions as described in the following paragraphs.

Upon entering the elevator, the user initiates the "Building Directory" function of the system by pressing a function key 122 on the keypad 116 or touch display 113. The keypad 116 and/or key 122 may be labeled with an appropriate label such as "Building Directory" or the like. Upon depressing the function key 122, a signal is generated which prompts the system to respond with an audible and/or visual query to the user, depending on how the system is pre-configured. For an audible query, the sub-system of the present embodiment retrieves a pre-stored CELP (or other compressed format) data file from one of the storage devices 108, 110 and converts that file to an analog audio representation of voice via the speech synthesis module 112 and processor 106. Speech synthesis technology is well known in the signal processing arts, and accordingly will not be discussed further herein. The audio signal from the synthesis module 112 is applied to the amplifier and audio speaker 111 to generate a voice prompt, such as "Name?". Alternatively, or simultaneously if desired, the system 100 retrieves a separate data file from the storage device 108, 110 which represents the current building directory. The building directory data file contains a plurality of entries relating to tenants in the building where the system 100 is located. Each entry is parsed into data fields which contain, inter alia, the firm or entity name, its location (such as floor and suite number), and a list of the first and last names of all persons employed there. The processor 106 (and associated graphics co-processor 109 with video RAM 107) initiate the display of all retrieved data entries in the directory file on the display device 113 in a convenient format, such as an alphabetical list from which the user can select their desired option. The user may then speak the specific name of the party they wish to find, or select the name using the touch display 113 or other input device (such as a track ball; not shown). When the user speaks the name of the party desired, the speech recognition module 104 takes the analog signal from the microphone 118 and converts it to a digital format by way of the DSP 125 and compression algorithm, as previously described. The directory file is retrieved (if not already done), and the digitized and coded speech compared to the contents of the directory file to find any matches. Any matching fields within the entries of the data file are provided to the user, either audibly via the speech synthesis module 112 and speaker 111 using prompts, or visually via the display 113. In the present embodiment, audible prompts for a single matching entry are of the form: "[Name], [Company], located at Suite X on Floor Y". For multiple matching entries, the audible prompts are produced in a sequential, predetermined order (such as the numerical sequence number of the entries within the directory file). For example, the first matching entry (alphabetically) would be synthesized in the foregoing form, followed by the second entry, etc. Upon hearing the desired match in this voice activated embodiment, the user simply states "Stop", to choose the entry desired. At this point, a separate audio prompt is generated (such as "Select (floor number) Floor?") which prompts the user to either select the floor number associated with the matched directory item and terminate their session (such as by stating "yes"), or continue on with the next entry (such as by stating "no") until all entries are exhausted. The directory sub-system is programmed to store in memory 110 and "remember" previous files retrieved within a given user's session so as to not repeat the same selections during that same session. For example, if there are five "Smith" entries in the directory file, and the user enters the query "Smith", the sub-system will select a different "Smith" entry on each subsequent user query during the same session until the correct Smith is located or all matching entries have been exhausted. In the present embodiment, a session is defined as the time period between two successive selections of the "Building Directory" function key 122, or the expiration of a predetermined period of time without a user input after selection of that function. The sub-system is also optionally programmed to allow the user to append defining information to the initial query statement to form a Boolean search statement. For example, if the first "Smith" selected by the sub-system is not the desired one, the user may then append the query by saying "ABC Corporation" or "John" in response to the next "Select (floor number) Floor?" query by the sub-system. The sub-system will then recognize the new entry, and search all fields in all "Smith" entries to locate those listings having both the name "Smith" and "ABC Corporation" (or "John"), using Boolean "AND" logic. The user will then be prompted again to "Select (floor number) Floor?". If no matching entries are found, the sub-system will either notify the user to this effect, such as using an audio message such as "No matches found", or will display or announce the nearest approximation of the query based on a confidence rating. The confidence rating is calculated, for example, by the processor 106 running an algorithm; such confidence rating calculation algorithms are well understood, and indicate the quality of the match using a numeric value or index.

As used herein, the term "match" includes any predetermined criteria for correlating one piece of data to another. For example, the building directory sub-system may be programmed to consider two pieces of data a "match" when all bits with the exception of the least significant bit (LSB) are identical. Many such criteria are possible, and all are considered to be within the scope of the invention disclosed herein. Furthermore, partial matches, such as when the user enters one word which is matched within several different entries of the directory file, may be used as the basis for an appended search, as described below.

Figure 5:
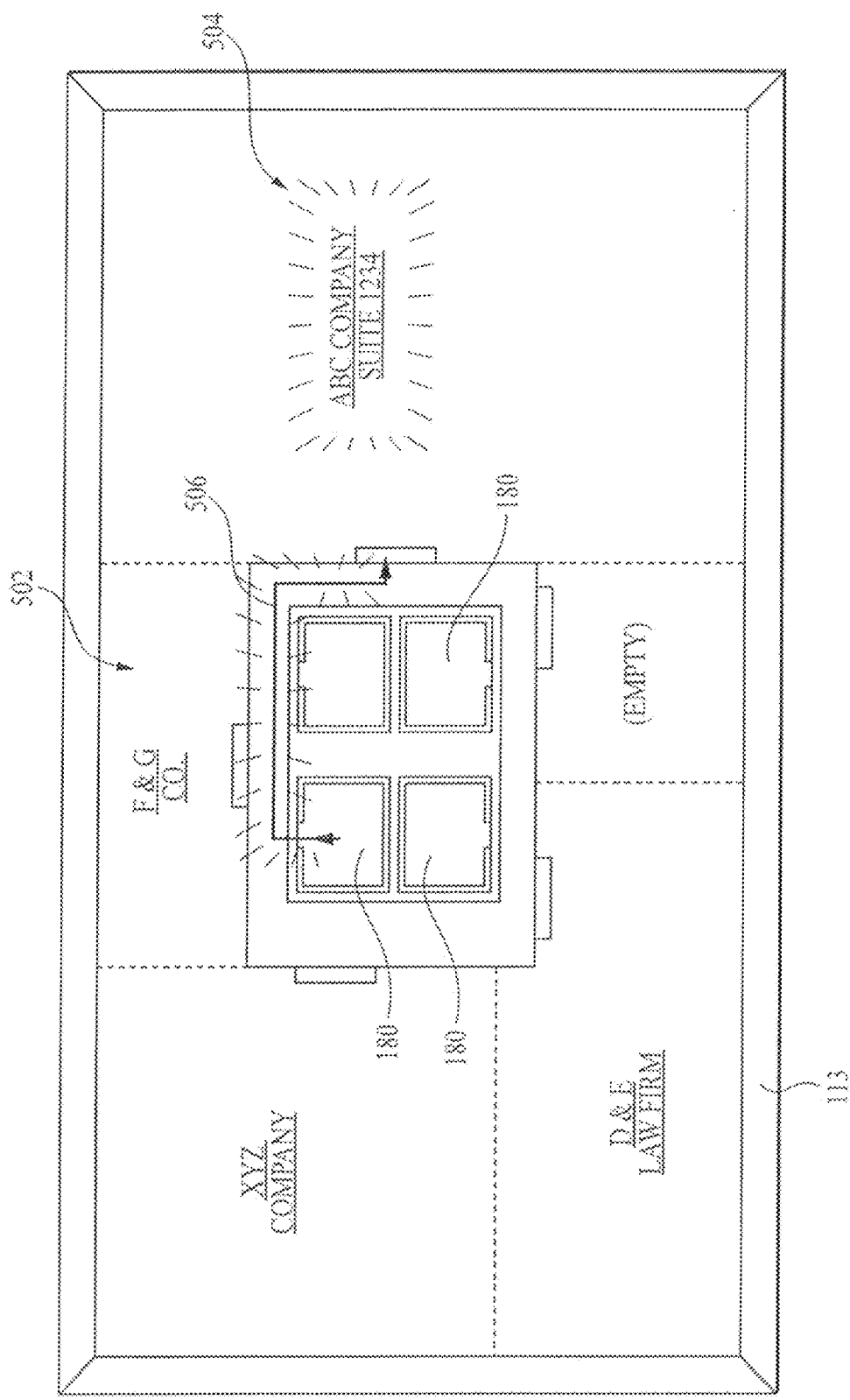
FIG. 5 is a plan view of one embodiment of a building directory sub-system graphic location file, as shown on the display device of the information and control system.

The directory file described above also optionally has a location graphic data file appended or linked thereto, which is retrieved from the storage device 108, 110 or the server 170. The location graphic file is displayed on the display device 113 as a floor map graphic 502 illustrating the location of the selected person or firm 504 on that floor in relation to the elevator cars 180, as illustrated in FIG. 5. For example, the location of the individual or firm being sought is illuminated or colored, made to flash, and/or an illuminated arrow 506 is made to point to the desired location from the elevator. Numerous different and well understood visual and audible formats for providing the user with the desired information may be used with equal success, all of which are considered within the scope of the present invention.

The directory system 200 of the present embodiment also optionally includes directory files for nearby office buildings or establishments, thereby alerting the user through visual or audible prompt that they are in the wrong location once a match is confirmed by the user.

Figure 6C:
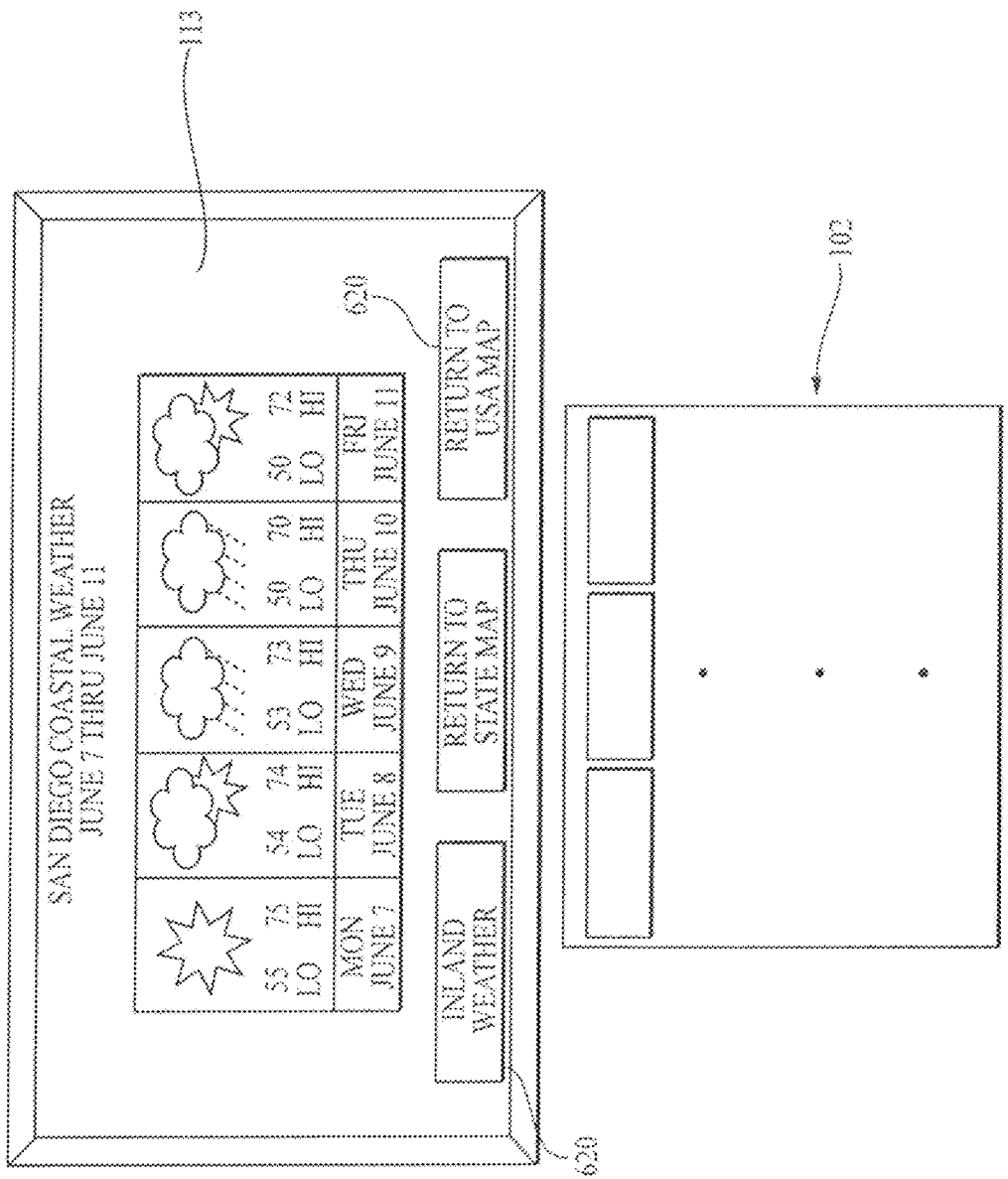

The user's session is terminated, or a new query initiated, when the "Building Directory" function key 122 is again depressed, after a predetermined time period without a user input, or upon the occurrence of some other event as desired.
Network Interface The information system 100 described above may also include other functional aspects. As illustrated in FIG. 3, one embodiment of the system includes a network interface 300 (such an internet or intranet data link) which permits the user to rapidly access updated information on a variety of predetermined topics of interest. For example, the input device 102 and/or display 113 of FIG. 2 is configured to include dedicated function keys 602 correlating to Internet hypertext markup language (HTML)-based hyperlinks, the hyperlinks corresponding to URLs (universal resource locators) for news headlines, weather, sports scores, financial data, directions to local airports or public transportation, etc, as shown in FIG. 6a. Alternatively, the function keys 602 provide the user access to addresses within a local or remote server 170 via a LAN or intranet, which has the desired information stored thereon. The function keys may also be integrated with the touch display 113 (and the components previously described with reference to FIGS. 1 and 2 above) to allow the user to interact with the system 100 via both the input device 102 and "soft" function keys on the touch display 113. For example, if the "Weather" function key 604 is selected, the display would retrieve and generate an HTML page with representation of a map of the United States with hyperlinks for each state (FIG. 6b). Once a state or geographical area was selected by the user via the hyperlinked "soft" keys 620 on the touch display 113, the user would be presented with the desired weather information on the display, such as the current weather conditions and five-day forecast in a mixed textual/graphic format such as that of FIG. 6c. Preset function keys and graphic representations with icons are used in the present embodiment to facilitate rapid access and display to a more narrowly tailored collection of data, since most users will have only seconds to locate, interpret, and remember the desired information. The generation of textual, graphic or mixed media displays based on HTML or other languages or formats is well known in the computer arts, and accordingly will not be described further herein.

The information and control system 100 may also be programmed to provide information via the display unit(s) 113 on a rotating basis without the need for user intervention. For example, a given display unit 113 may be programmed to display a summary of local weather for the next five days (such as that shown in FIG. 6c) for a first period of time, followed by a brief summary of breaking headlines for a second period, followed by financial highlights for a third period, and so forth. The update rate (i.e., the time between changing of the displays) should be adjusted so as to permit for adequate recognition and use by the occupants. An update rate of approximately 10-15 sec. should be sufficient for most topics and applications, although this period may be varied as needed.

Referring again to FIG. 3, connection of the information and control system 100 to external LANs, WANs, intranets, or internets (e.g., the Internet) is accomplished via the network interface 300. In one embodiment, this interface 300 comprises a so-called "cable modem" of the type well known in the networking arts. Such cable modems effectively overlay IP data on a coaxial cable which is also used to supply analog video data to the end user. In the case of an elevator system, cabling between the system server 170 and each car 180 may be run in parallel with the existing electrical services cable bundle, or alternatively a wireless interface (such as the aforementioned DSSS or FHSS transceiver 310) employed to transmit data between the cars and the server 170. Many configurations for transmitting data between the cars and the system server 170 may be used. Alternatively, a dedicated integrated services data network (ISDN) line may be used to by the server 170 to access external networks such as the Internet. Furthermore, it is feasible to utilize a wireless link as the network interface 300 between the server 170 and the LAN, intranet, or internet 307.

Information Download to PED

Figure 7:
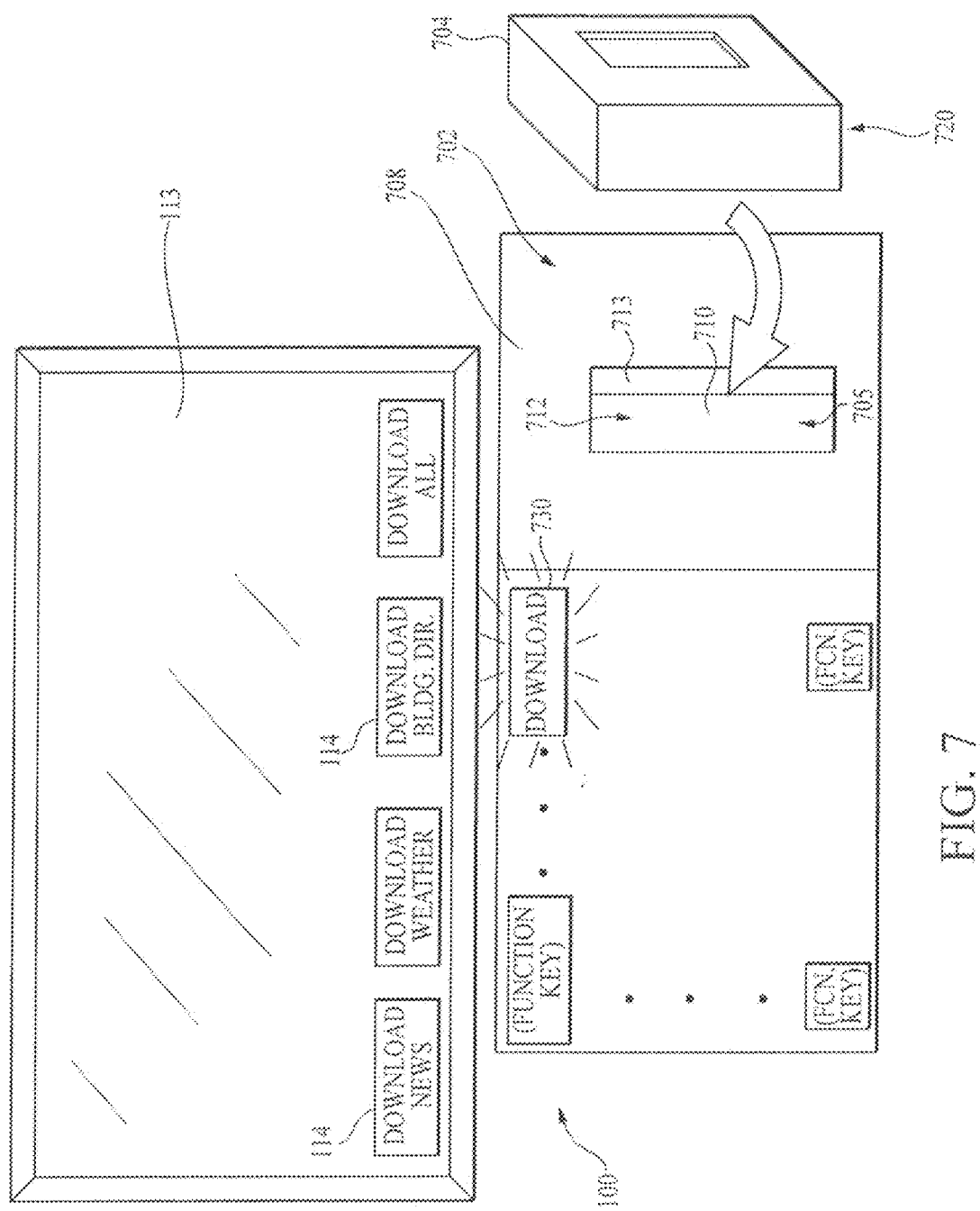
FIG. 7 is a plan view of one embodiment of the PED data download terminal of the invention.

Referring now to FIG. 7, another embodiment of the information and control system 100 of the present invention is described. In this embodiment, the system 100 is additionally provided with one or more data terminals 702 which allow the user to plug a personal electronic device (PED) 704 having a standardized interface into the system to obtain a "download" of information. As used herein, the term "PED" includes, but is not limited to, personal digital assistants (PDAs) such as the Apple Newton®, US Robotics/3COM PalmPilot®, or Palm III®, laptop computer, notebook computer, or the like. The data terminal includes a connector 712 which is a 9-pin RS-232 serial connection of the type well known in the electronic arts, although other types of connectors and protocols may be used. The download between the system 100 and the PED 704 may be automatically initiated by plugging the PED 704 into the data terminal 702 and thereby mating the connector 720 of the PED 704 with the connector 712 of the data terminal 702, or manually initiated by the user via the input device 102, touch display 113, or the PED 704 software. The data terminal 702 is connected to the serial bus and processor 106 of the system 100 as shown in FIG. 1, whereby the processor 106 retrieves data stored on the storage device 108, 110, or alternatively downloads data from an external source via the network interface 300. A universal asynchronous receiver/transmitter (UART) 117 or universal serial bus (USB; not shown) of the type well known in the computer arts is used to electrically interface the processor 106 of the system 100 and the PED 704.

As shown in FIG. 7, the PED 704 is received within a conformal slot 706 formed in the display panel 708, thereby automatically aligning the data connector 720 of the PED 704 to that of the system 100. The slot 706 includes a spring-loaded cover 713, and is sealed against any introduction of deleterious fluids or other material, and the terminal pins 710 of the connector 712 are recessed so as to avoid incidental damage. Once the download is complete, the user simply removes the PED from the slot. Based on the volume of data downloaded, the entire transaction takes only a few seconds. Application software resident on the PED 704 is adapted to receive the downloaded data, store it within the storage device of the PED (not shown), and display it at a later time. In one embodiment, the downloaded information comprises an electronic "newspaper" having information relevant and useful to the user, such as national/local news, weather, sports, and the like. Other types of information, such as the building directory, firm resumes, local telephone directory, maps of the local area, and such may be downloaded as well. In another embodiment, the user may select the type of information downloaded using a menu of function keys 114 on the panel keypad 116 or touch screen display 113. For example, the user first selects the "Download" function key, which then activates a menu on the touch display 113 which allows him/her to select from a number of pre-determined types of information using either dedicated function keys or alternatively functions shown on the touch screen display 113. In yet another embodiment, the configuration of the data downloaded via the terminal 702 is determined based on data received from the RFID tag of the user, as described in greater detail below with respect to FIG. 15. In this fashion, the user may automatically receive information "tailored" to his/her needs.

Capacity Sensing Sub-System

Figure 8:
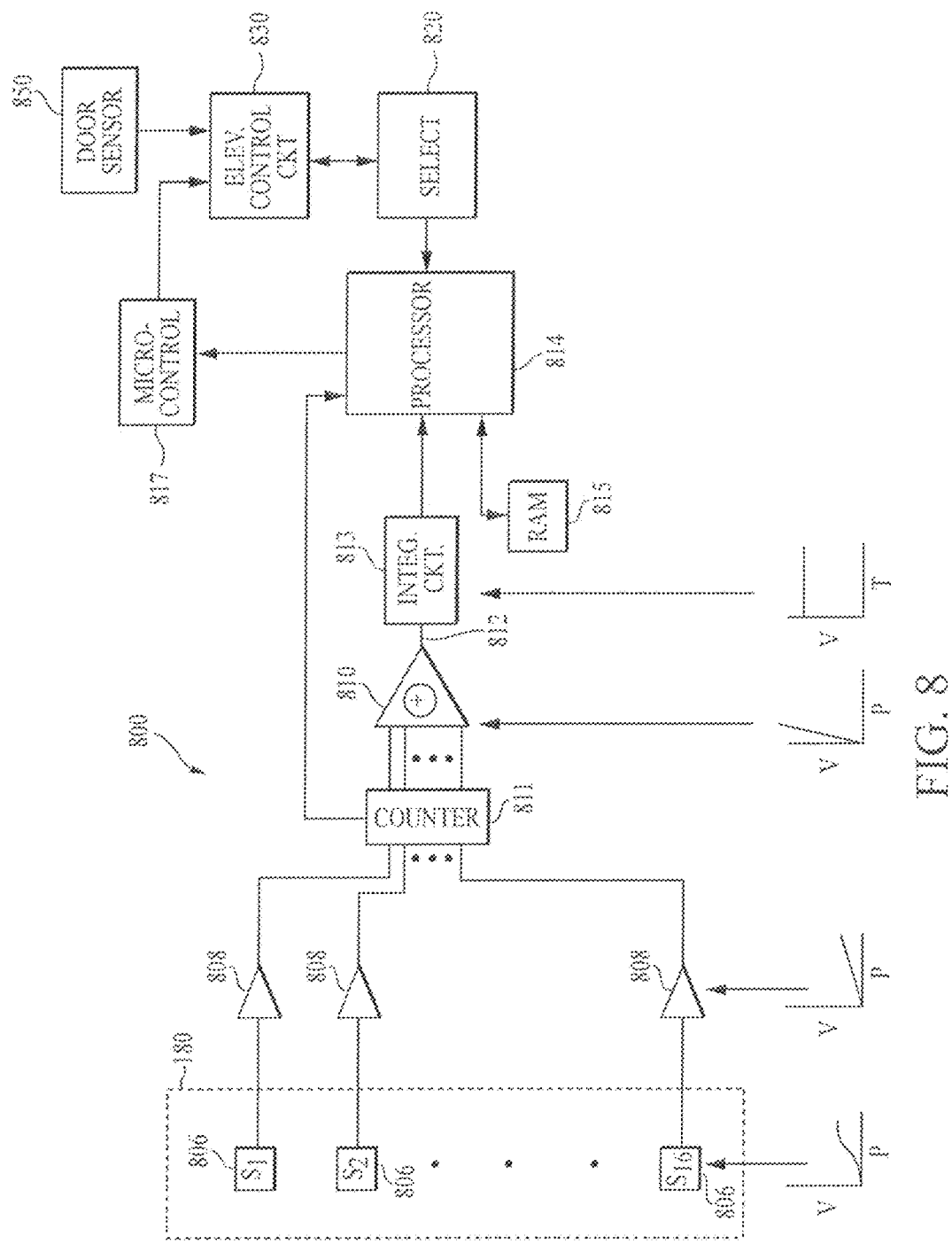
FIG. 8 is a block diagram of one embodiment of the capacity sensing sub-system according to the present invention.

Referring now to FIG. 8, the elevator system of the present invention further optionally includes a capacity sensing sub-system 800 which detects the loading of the elevator car and selectively bypasses floors when the capacity is met, unless the floor is selected by one of the occupants of the car. In the embodiment of FIG. 8, the flooring 804 of the elevator car 180 is equipped with a plurality of piezo-electric sensors 806 which generate electrical signals based on the pressure (and force) applied to them. Such sensors are well known in the electrical arts, and it will be recognized that other types of sensors and sensing arrangements may be used. The sensors 806 are calibrated or nulled for the weight of the elevator flooring 804 and any pre-load resulting therefrom. The electrical signal produced by each of the sensors 806 is amplified and made linear by a first stage amplifier 808 and fed to a summing amplifier 810 which sums the values for all of the sensors 806 to produce a composite signal 812 proportional to the summed signals of all the sensors. The composite signal 812 is integrated or averaged over the entire time travelling between floors by an integrator circuit 813 (or alternatively, an algorithm running on the processor 814), thereby accounting for any apparent increase in weight due to acceleration in the upward direction or deceleration in the downward direction, or apparent decrease in weight due to deceleration in the upward direction or acceleration in the downward direction. Linearization of the output of each sensor 806 is required when the voltage output of the sensor is not linear with respect to pressure; this allows the linear signals to be summed directly within the summing amplifier 810, the output of which 812 is linear in voltage with respect to pressure.

The composite signal 812 from the integrator 813 is correlated using the processor 814 to a known weight using a proportionality or scaling constant stored in memory 815, and ultimately to a first estimate of the number of occupants within the car by way of another scaling constant also stored in memory 815. For example, if a total pressure reading equating to 1500 lbs. (after null calibration) was obtained from the summing amplifier 810, it could be correlated to an occupancy of ten persons, assuming that the average person weighs 150 lbs. and that their distribution within the car was uniform.

Figure 9:
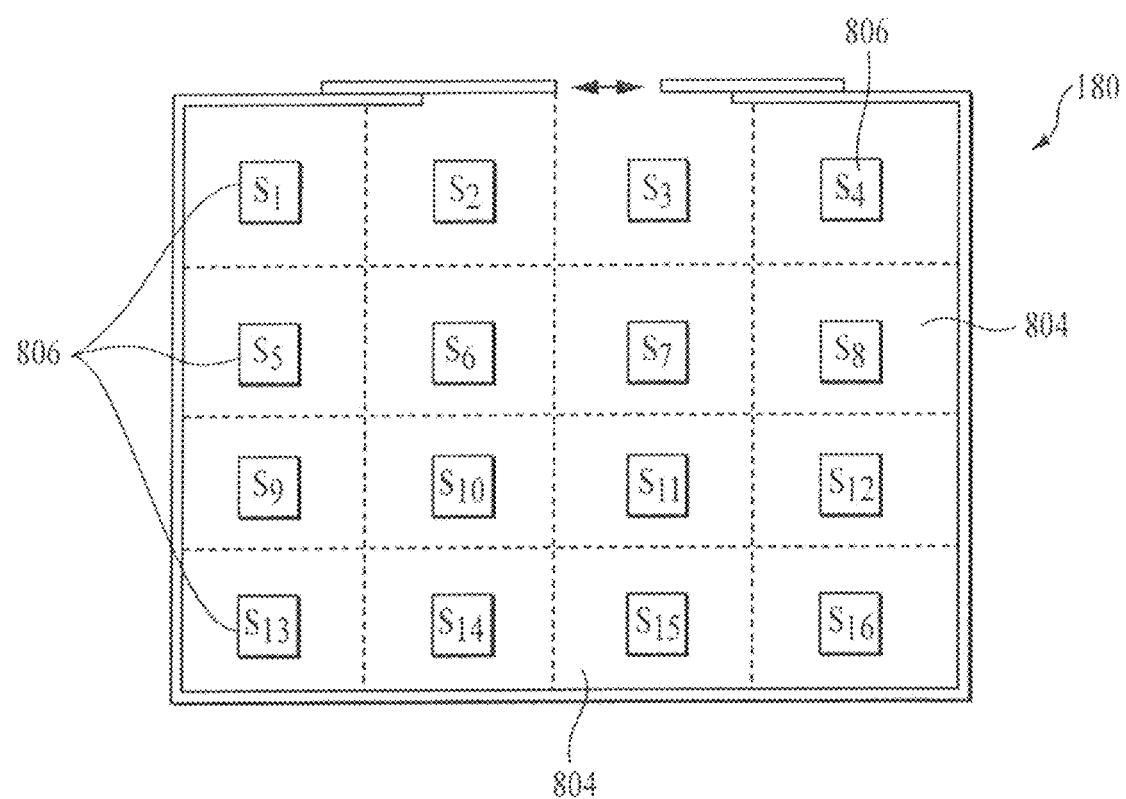
FIG. 9 is a plan view of one embodiment of the elevator floor sensor array used in conjunction with the capacity sensing sub-system of FIG. 8.

However, such "average" cases of weight and distribution thereof within the car 180 do not always occur, since often times people riding in the car may have significant disparities in size and weight, or may be transporting heavy objects. Furthermore, weights which are not an integer multiple of the scaling constant present the system with an ambiguity that must be resolved; i.e., how to round fractional amounts of a person. Accordingly, to address these situations, the first embodiment of the sub-system 800 of the present invention compares the foregoing first occupancy estimate to the number of different sensors 806 supplying a non-zero signal to the summing amplifier 810 as measured by a counter circuit 811. The number of sensors 806 supplying a non-zero signal is used as a lower limit on the occupancy estimate. Additionally, the number and disposition of sensors 806 within the car 180 are chosen to provide the sub-system 800 with information regarding the distribution of weight therein. For example, the elevator car 180 of the present embodiment is equipped with sixteen sensors positioned in a 4×4 array of four rows and four columns, each sensor 806 being centered within its fractional ($1/16^{th}$) area of the flooring, as shown in FIG. 9. Assume that the weight of 1500 lbs. is distributed within this car of FIG. 9 such that sensors "1" and "2" produce signals proportional to 100 lbs. each, sensors "10" and "11" produce signals proportional to 110 and 40 lbs. respectively, and sensors "13" and "14" produce signals proportional to 150 lbs. each. Hence, the total weight present in the car is 650 lbs. Assuming a scaling constant of 150 lbs. per person, a first occupancy estimate ($O_E$) of 4.33 persons is produced. Since six different sensors 806 are producing non-zero signals, with four of the six (i.e., "1", "2", "13", and "14") producing signals equal to those of at least one adjacent sensor. As used herein, two sensors are adjacent when they are within one row and one column of each other. The remaining two of the six sensors in this example (i.e., "10" and "11") are producing signals different from those of adjacent sensors. Looking purely at the number of sensors producing non-zero signals (six), there could theoretically be as many as six different entities within the car, assuming that no entity can take up less than $\frac{1}{16}^{th}$ of the available floor space within the car. Specifically, two 100 lb. people could be standing next to one another atop sensors "1" and "2", a 110 lb. and 40 lb. person atop sensors "10" and "11", respectively, and two 150 lb. people atop sensors "13" and "14". This number is the uncorrected occupancy maximum value, $O_{maxu}$. Alternatively, however, it may be concluded that as few as three people could be in the car, based on the assumption that a person may occupy up to and including two adjacent sensors (i.e., no more than $\frac{2}{16}$ths or $\frac{1}{8}$th of the floor space in the car). For example, a 200 lb. person could be standing atop sensors "1" and "2", with their weight equally distributed. Similarly, a 150 lb. person could be standing atop sensors "10" and "11", with weight shifted mostly onto sensor "10". The third (300 lb.) person could be atop sensors "13" and "14", with weight equally distributed. This latter value is the occupancy minimum based sensor data, $O_{mins}$. Note that for purposes of calculating $O_{mins}$, each sensor is only counted once.

Hence based on the foregoing, the sub-system 800 would need to resolve the ambiguity between (i) the first estimate calculated based purely on weight and a predetermined scalar quantity; (ii) the maximum theoretical number of occupants based on weight sensor data; and (iii) the minimum theoretical number of occupants based on weight sensor data. To resolve this ambiguity, the sub-system 800 of the present embodiment imposes the restriction that any entity atop a sensor producing a signal proportional to less than an arbitrary lower threshold (say, 50 lbs. in the present example) which is adjacent to another sensor producing a non-zero signal is part of the same entity atop that adjacent sensor. In the foregoing example, sensor "11" registers only 40 lbs. of weight, and is adjacent to both sensors "10" and "14", which have non-zero output. Hence, the signal output from sensor "11" is assumed to be part of the same entity which is atop sensors "10" or "14". Since no other sensors in the foregoing example registered less than the assumed threshold of 50 lbs., all other sensors are presumed to have a distinct entity atop them. Hence, the corrected maximum number of entities calculated by the system ($O_{maxc}$) is reduced from 6 to 5. Note that once a sensor having a weight value less than the threshold is "paired" with another adjacent sensor, that adjacent sensor can not be paired with any others, thereby preventing double-counting. This restriction also addresses the instance where the measured weight on a given sensor of interest is above the lower threshold value, yet is due to two entities each located on adjacent sensors as well as the sensor of interest.

To further assist in resolving occupancy estimate ambiguity, the foregoing information is also correlated with the number of different floors selected within the elevator on the selection panel 820. Specifically, the number of different floors selected on the elevator car selection panel are used as a second lower limit or occupancy minimum, $O_{minp}$. Using the preceding example, if the sub-system 800 detects that five different floors were selected, the system would recognize the presence of five persons, one corresponding to each different floor selected. It is assumed that the instance wherein one person selects multiple floors (such as through inadvertent or mistaken floor selection) would occur infrequently, and would also not be of any significance since the number of people actually on the elevator in such instances would always be less than the estimate derived by the system, thereby affording more space within the car than estimated. In the converse situation, for example when the first occupancy estimate or maximum estimate indicate the presence of several different persons, yet the number of different floors selected is fewer, the system does not set the fewer number of floors equal to the number of occupants, since the additional weight is likely represented by additional passengers getting off at the same floor(s), or few passengers having cargo or other weighty objects with them in the elevator.

Figure 10:
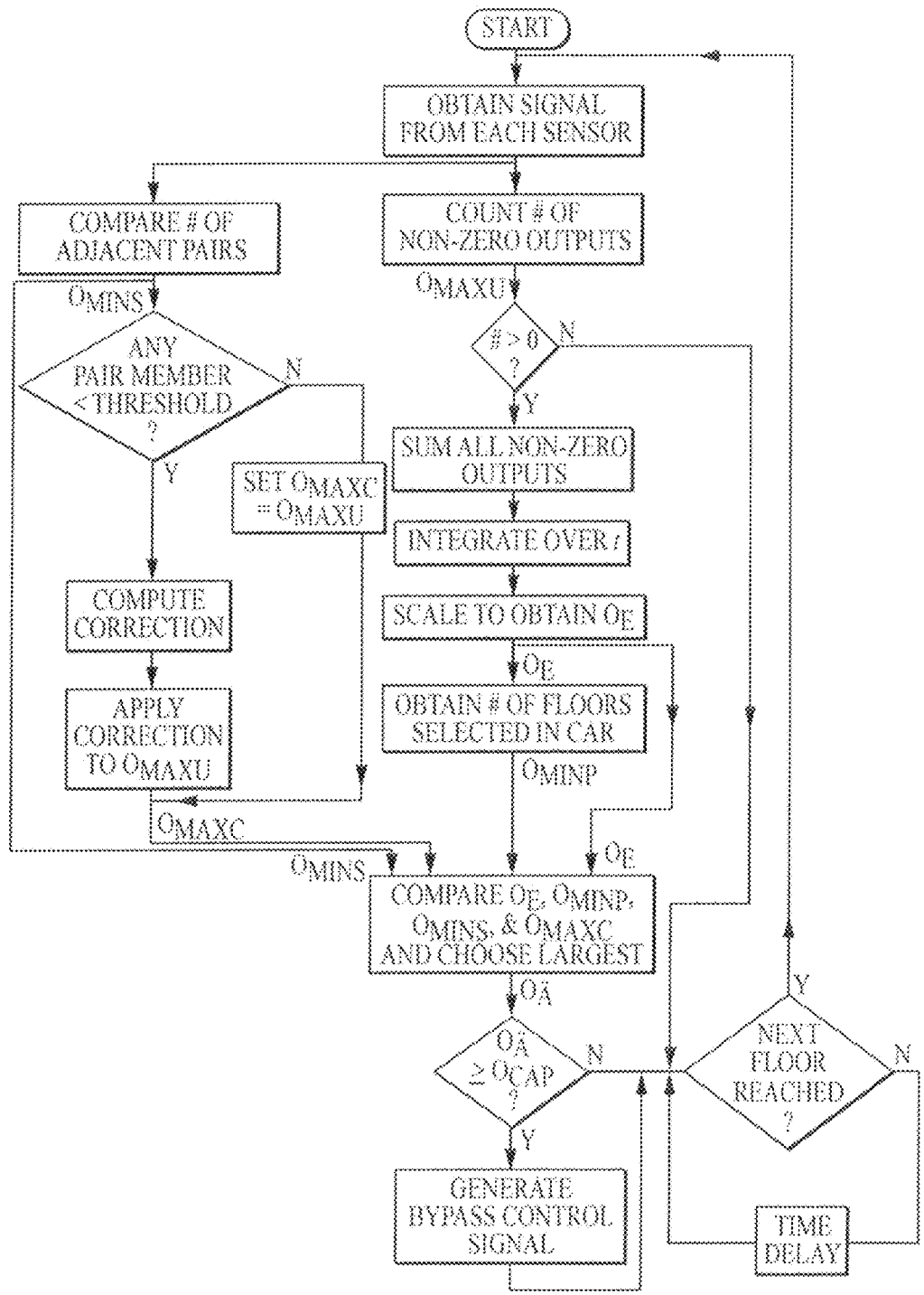
FIG. 10 is a logic diagram illustrating the method of operation of the capacity sensing sub-system of FIG. 8.

Lastly, the sub-system 800 utilizes (i) the first occupancy estimate $O_E$, (ii) the corrected occupancy upper limit $O_{maxc}$ determined by the number of sensors 806 with non-zero output that exceed the predetermined threshold value, (iii) first occupancy minimum $O_{mins}$ as determined by the number of adjacent sensor pairs, and (iv) second occupancy minimum $O_{minp}$ as determined by the number of floors selected within the car 180, to produce a final occupancy estimate. Specifically, this final occupancy estimate $O_f$ is the greater of the first occupancy estimate, corrected occupancy upper limit, the first occupancy minimum, and the second occupancy minimum. In the foregoing example, these quantities are 4.33 persons, 5 persons, 3 persons, and 5 persons; hence, $O_f$ equals 5 persons. Note that the highest value is chosen for conservatism; this all but eliminates instances of the elevator car stopping at a floor with an active call signal when no additional room exists, yet does not so under-utilize the car's capacity so as to be grossly inefficient. FIG. 10 illustrates the logical flow of the foregoing embodiment of the method.

As a second example of the operation of the capacity sensing sub-system 800, consider if 16 children each having a weight of 75±20 lbs. (and an average weight of 75 lbs.) were present in the previously described elevator car. The total combined weight would equal 1200 lbs., and therefore $O_E$ would equal 1200/150 or 8. If $O_E$ alone were used in this instance, it would severely overestimate the remaining capacity of the elevator car. Next, assume each child to take up the space associated with one sensor, whether individually or in combination; hence, $O_{maxu}$ would equal 16, and $O_{mins}$ would equal 8. Since no sensors 806 would register less than the assumed threshold value of 50 lbs. (i.e., each sensor would be associated with one whole child or one-half of two children), $O_{maxc}$ would equal $O_{maxu}$. If 2 different floors were selected by the 16 children, then $O_{minp}$ would equal 2. Hence, in this example, $O_f$ would equal $O_{maxu}$ or 16 persons, which matches the actual occupancy exactly.

Note that due to the reduced size of children as compared to the average adult, it may be possible to have somewhat more children than adults within a given floor space of the elevator car; however, this effect is considered minimal since a child is generally much shorter than the average adult, and hence grows disproportionately in height as opposed to width (the latter relating to floor space required to accommodate them). Stated differently, there is a minimum of floor space that any free-standing human requires;

this value can be estimated and built into the sensor array design of the present invention.

When the capacity of the elevator car 180 is reached, either by total sensed weight or by the maximum number of occupants allowed (a predetermined value) as estimated by the sub-system 800, any subsequent call signals received by the elevator control circuit 830 are routed to another available car based on inputs received from a micro-controller 817. In this fashion, the fully loaded car bypasses those floors with people desiring to get on the elevator, unless those floors are selected by one or more of the occupants of the car 180.

Similarly, as each successive floor selected by occupants of the elevator car 180 is reached (as based on an door open sensor 850 within the elevator control logic, or other indicia), the sub-system 800 recalculates the first occupancy estimate $O_E$, the corrected occupancy upper limit $O_{maxc}$, the first occupancy minimum $O_{mins}$, and the second occupancy minimum $O_{minp}$ and produces a new final occupancy estimate $O_f$ based thereon. Hence, occupancy estimation according to this embodiment is an ongoing and dynamic process.

Monitoring and Security Sub-System

Referring now to FIGS. 11 and 12, the information system 100 of the present invention optionally also includes an external monitoring and security sub-system 1100 to enhance the safety of the occupants and provide "early warning" of possible threats. Specifically, the aforementioned display device(s) 113 within the car 180 may be configured using one or more preset function keys to provide a display of the area immediately surrounding access to the elevator on certain selected floors, such as parking garages. Video cameras 1102 of the type well known in the electronic arts are positioned at certain advantageous locations 1104 surrounding the elevator car doors on certain floors of interest generate a video signal which is passed to the information system displays 113 through the aforementioned coaxial cable in the elevator wiring harness 1108. These video signals are selectively input to the display unit 113 for viewing by the car occupants. As shown in FIG. 12. the display unit is controlled using "Video" function keys 1110 on the keypad 116 or touch screen 113 to permit the user to select one or more floors to view. "PIP", or "picture-in-picture" technology of the type well known in the electronic arts, along with a video multiplexer 1112 allows users to cascade two or more images on the display 113 if required. The user can over-ride the car stopping at any selected floor if desired, simply by depressing the "Override" function key 1114 followed by the numeric key corresponding to the floor number. This override function can be instituted any time up until the signal is generated by the elevator control circuit 830 and associated logic to open the elevator car doors 1106 at that floor. The user can also contact a remote security station 1125 if desired using a "Security Call" function key 1120 present on the keypad 116 or the touch screen 113, and/or initiate temporary additional lighting 1122 in the area by depressing a "Lights" function key 1124.

The features described above can also be "locked out" during certain periods of the day (such as during busy morning or afternoon hours) when many people ride the elevators and the viewing, override, security, and lighting functions are generally not needed. For example, programming of the processors 106 within each elevator car in an office building could institute the monitoring/override function from the hours of 6 pm until 8 am and during weekends. Such programming can be reconfigured using the remote system server 170 and associated input device 171, as shown in FIG. 11.

Figure 13:
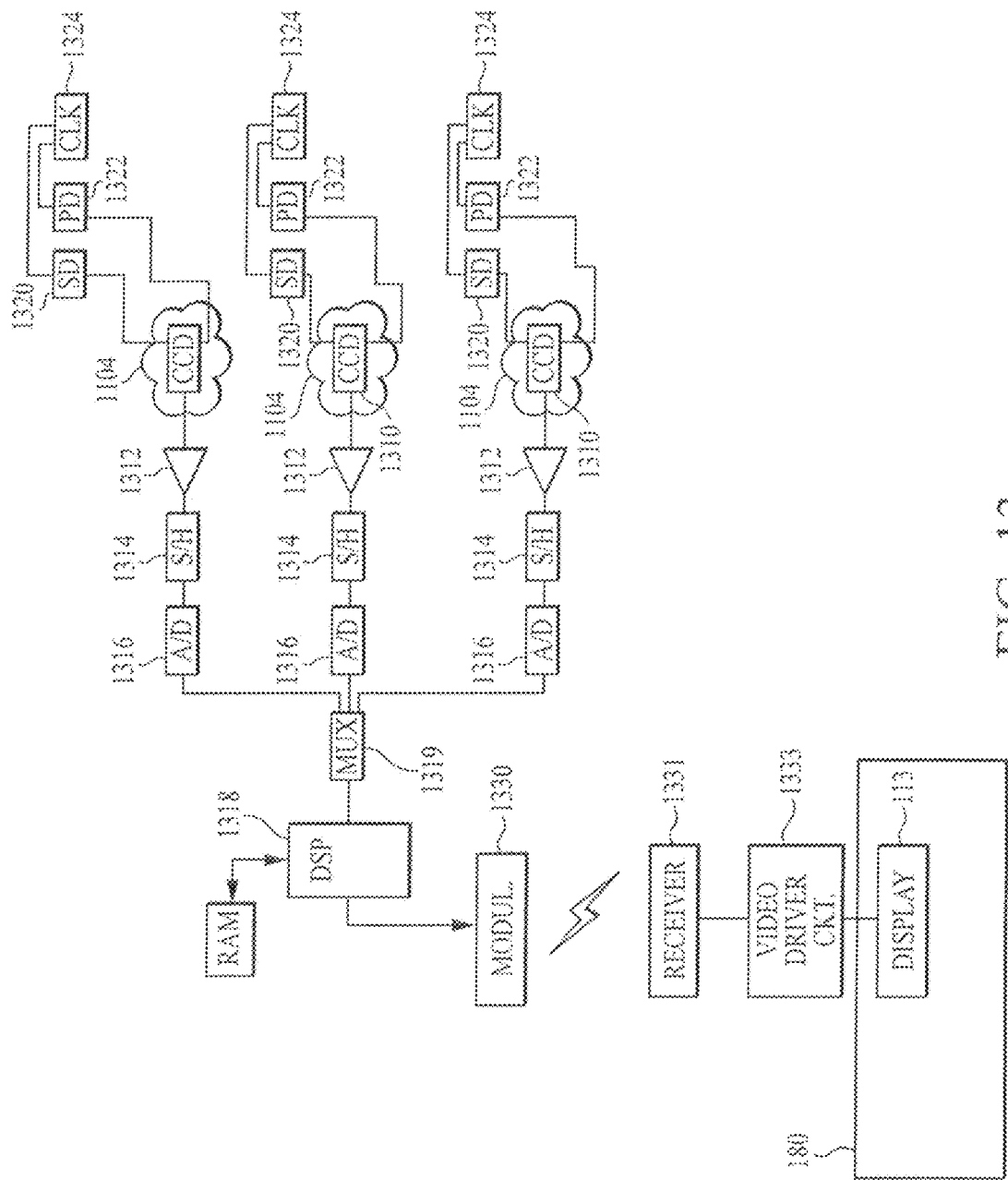
FIG. 13 is a block diagram of a second embodiment of the monitoring and security sub-system of the present invention.

In an alternate embodiment (FIG. 13), one or more miniature CCD cameras 1310 are positioned at various locations 1104 around the elevator doors 1106, so as to be effectively invisible to any person standing in those locations. In this fashion, criminals waiting to assault the occupants of the elevator car upon their egress would likely not be alerted to the presence of the monitoring system or cameras, thereby removing incentive for them to wait in unmonitored areas so as to avoid being seen by the cameras. The CCD cameras 1310 of the embodiment of FIG. 13 output analog signals to amplifiers 1312, a sample and hold circuit 1314, and A/D converters 1316, and then to a digital signal processor 1318 running a video compression algorithm via a multiplexer 1319. Serial and parallel drivers 1320, 1322 and a clock driver 1324 are also used to support operation of the CCD 1310, as is well understood in the electronic arts. The compressed data is then modulated onto an RF carrier by the modulator 1330, or alternatively a direct sequence or frequency hopping spread spectrum waveform for transmission to the display unit 113, which incorporates a spread spectrum receiver 1331 and video driver circuit 1333. Using the foregoing architecture, video images generated by the CCD cameras 1310 are digitized and compressed so as to reduce the bandwidth required to transfer images to the display unit(s) 113. It will be recognized that other architectures for generating and transmitting video data between a remote location of the cameras 1310 and the display unit 113 of the present invention are possible; the foregoing embodiments are merely illustrative of two of such architectures.

Referring again to FIG. 11, the monitoring and security sub-system 1100 described above also optionally provides for the display of data from motion detectors 1140 mounted in the vicinity of the elevator doors 1106, yet out of the field of view of the video cameras 1102, 1310. A well known tactic of criminals is to wait in poorly lighted areas adjacent to elevators in order to ambush unsuspecting victims emerging from the elevator once the doors are closed. In lieu of multiple video cameras 1102, motion detectors 1140 (such as those of the ultrasonic type) or alternatively, infrared radiation detectors 1150 may be mounted in such areas to apprise the occupants of the elevator that a person is likely present in an area adjacent to the elevator doors on a given floor. This information is displayed to the user within the elevator using any number of display formats, such as a light emitting diode, or flashing portions of an electronically generated display of the floor of interest corresponding to the locations of the detector(s), as shown in FIG. 12.

Figure 14B:
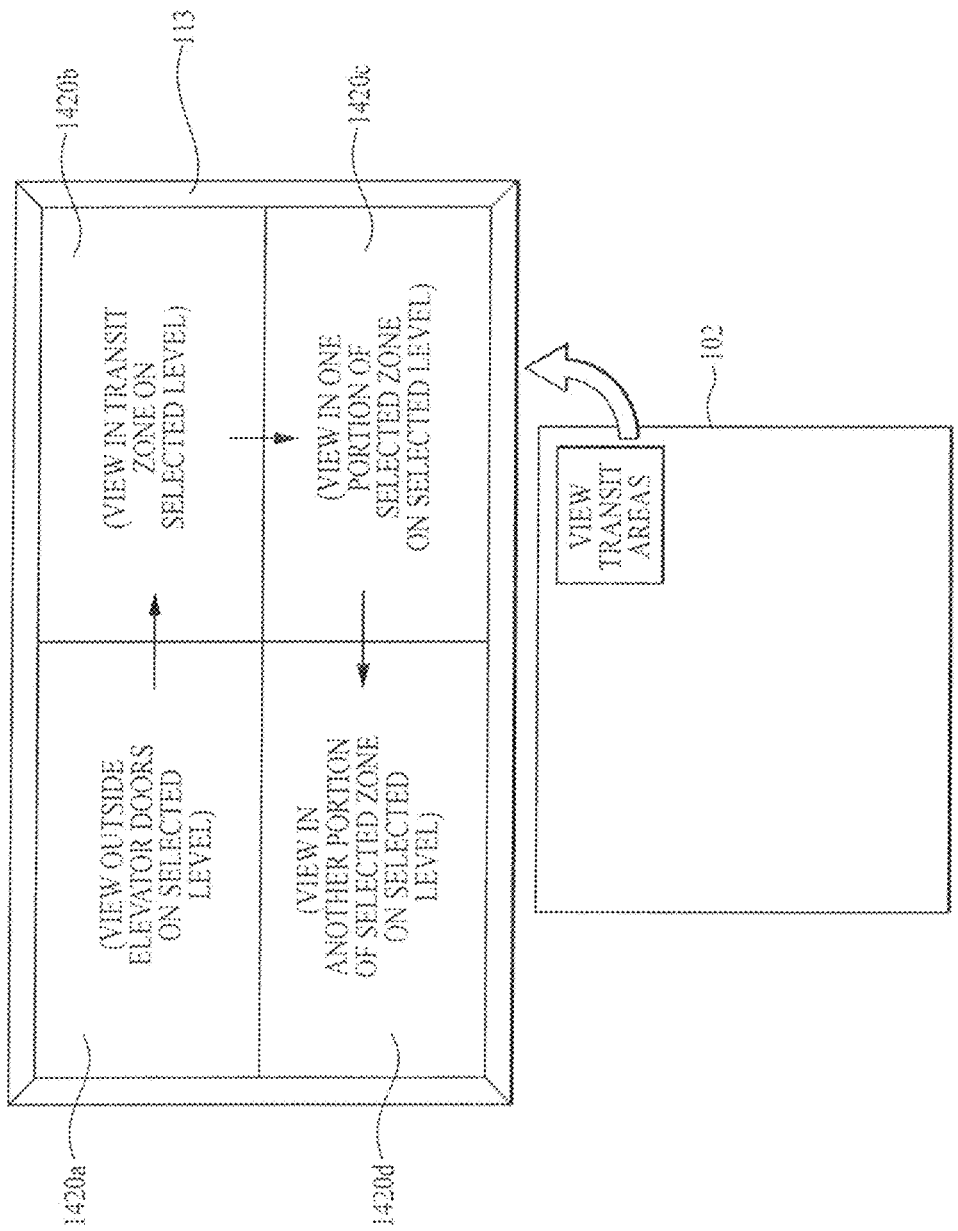

In addition to the aforementioned "early warning" features, the present invention also optionally includes the capability by which the user can select the specific location on the floor of interest to which they will be traveling from inside the elevator car, thereby enabling additional lighting, video surveillance, or other features. In one embodiment, shown in FIG. 14*a*, a video or graphic representation 1402 of the floor selected by the user is generated and displayed on the display unit 113 of the information system 100. Specifically, the floor display 1402 is initiated after the user depresses a dedicated function key (for example, a "Safety" function key on the keypad 116, or "soft" key on the touch screen 113; not shown) followed by the floor number or designation. The user then inputs the destination to which they will be travelling on that floor by touching a corresponding area of the touch screen 113. This input is converted to coordinates within the floor by an algorithm running on the processor 106 (FIG. 1), which are then correlated by the processor 106 to one or more of several zones 1404 within the floor lighting system and/or security video monitoring systems present within the building. This lighting and video monitoring equipment is then selectively activated for the zone(s) between the elevator doors and the destination, thereby providing enhanced visibility for the user during their travel, and also video monitoring by the building's centralized security facility 1125. Lighting and video monitoring is activated through a micro-controller 123 and associated control circuitry 1412 connected to the keypad 116 as shown in FIG. 1, although other configurations may be used. An audio or visual alarm 1414 is actuated in the security facility 1125 to alert security personnel of the activation of the video monitoring function for that floor/zone, thereby drawing their attention thereto. Alternatively, in another embodiment, the signal from the remote video equipment is routed to the system 100 and display 113 within the elevator car 180, thereby allowing the occupant to monitor the areas which they will be traversing. In such embodiment, the video presented on the display panel screen is segmented into multiple parallel "windows", such as into four segments 1420a-d corresponding to four video cameras located between the elevator car and the selected destination on the floor of interest as shown in FIG. 14b.

The operation of the foregoing functions is best illustrated by the example of a parking garage in the basement of an office building, in which a user has parked during late night hours. Such garages typically are located on the ground level or basement of the building and are open to pedestrian access, thereby making them more accessible to criminals. During late night or weekend hours, these garages are also often deserted. When the user enters the elevator car 180 on a higher floor within the building, they first select the floor number to which they desire to travel, in this case the garage ("G") level. The user may then depress the "Video" function key 1110 followed by the "G" key on the keypad 116 (or touch screen 113) to monitor the video camera output at the door of the elevator 1106 on the garage level, as well as any motion or IR sensors 1140, 1150 located thereabouts. Assuming no indications of danger are present, the user then depresses the "Safety" function key 1111, which displays a map or plan view 1402 of the floor selected in relation to the elevator doors 1106. The user then touches the map 1402 in the general area where their car is parked, which activates the lighting in the zones between the elevator doors and the selected location if not already activated, and initiates a direct video feed to the building security office 1125 (or other desired location) from the video cameras 1102, 1310 covering those zones. These functions may be put on a timer or controlled by another input (such as the timeout of a motion sensor 1140 in the area) such that the monitoring functions are ceased at an appropriate time or upon the occurrence of a desired event. The system may also be programmed to handle multiple zones on the same floor (such as when multiple passengers on the elevator car 180 are parked on the same level), or multiple zones on different floors.

Identification and Access Sub-System

Figure 15:
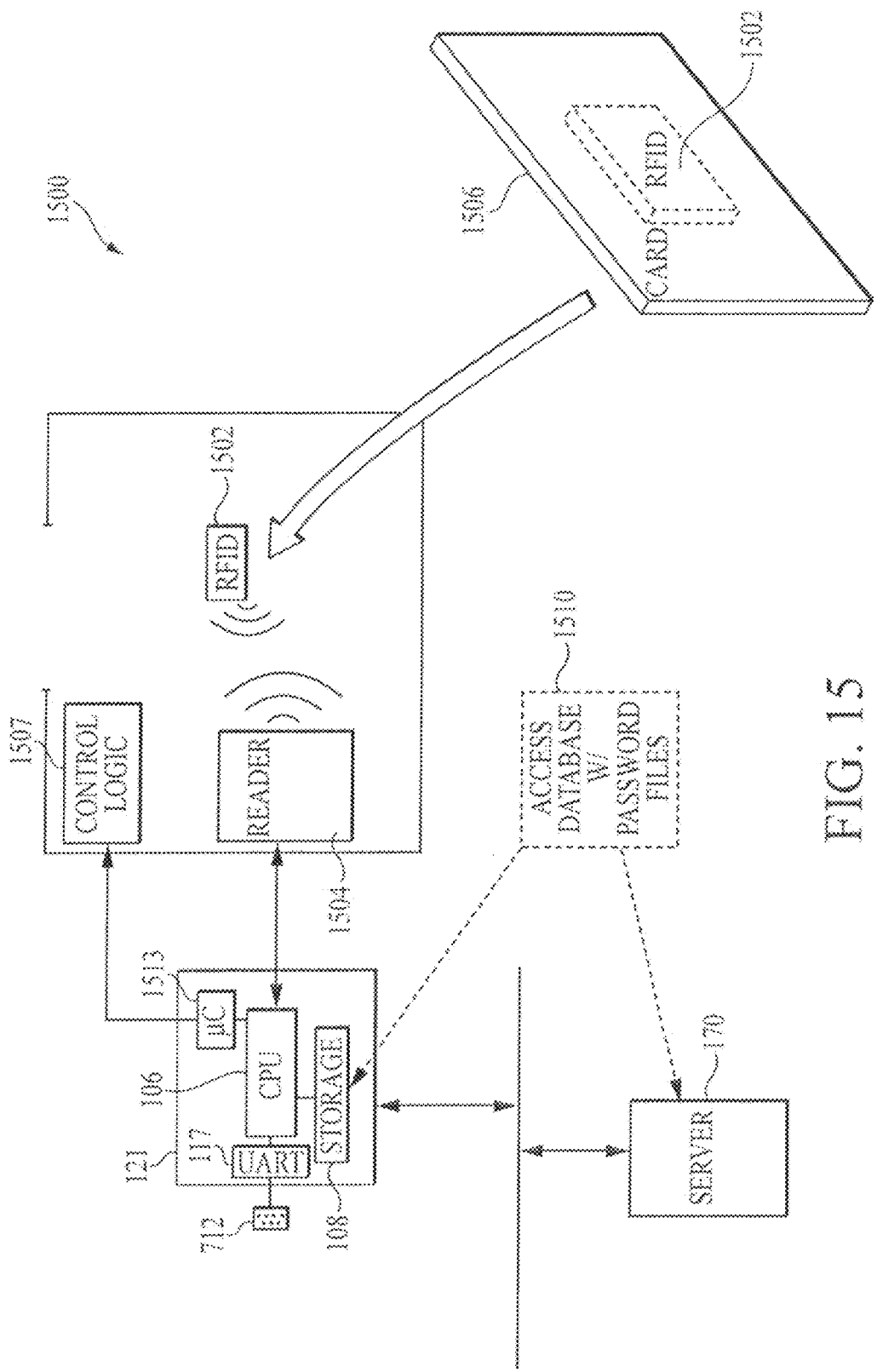
FIG. 15 is a block diagram illustrating one embodiment of the identification and access sub-system of the present invention.
Figure 16:
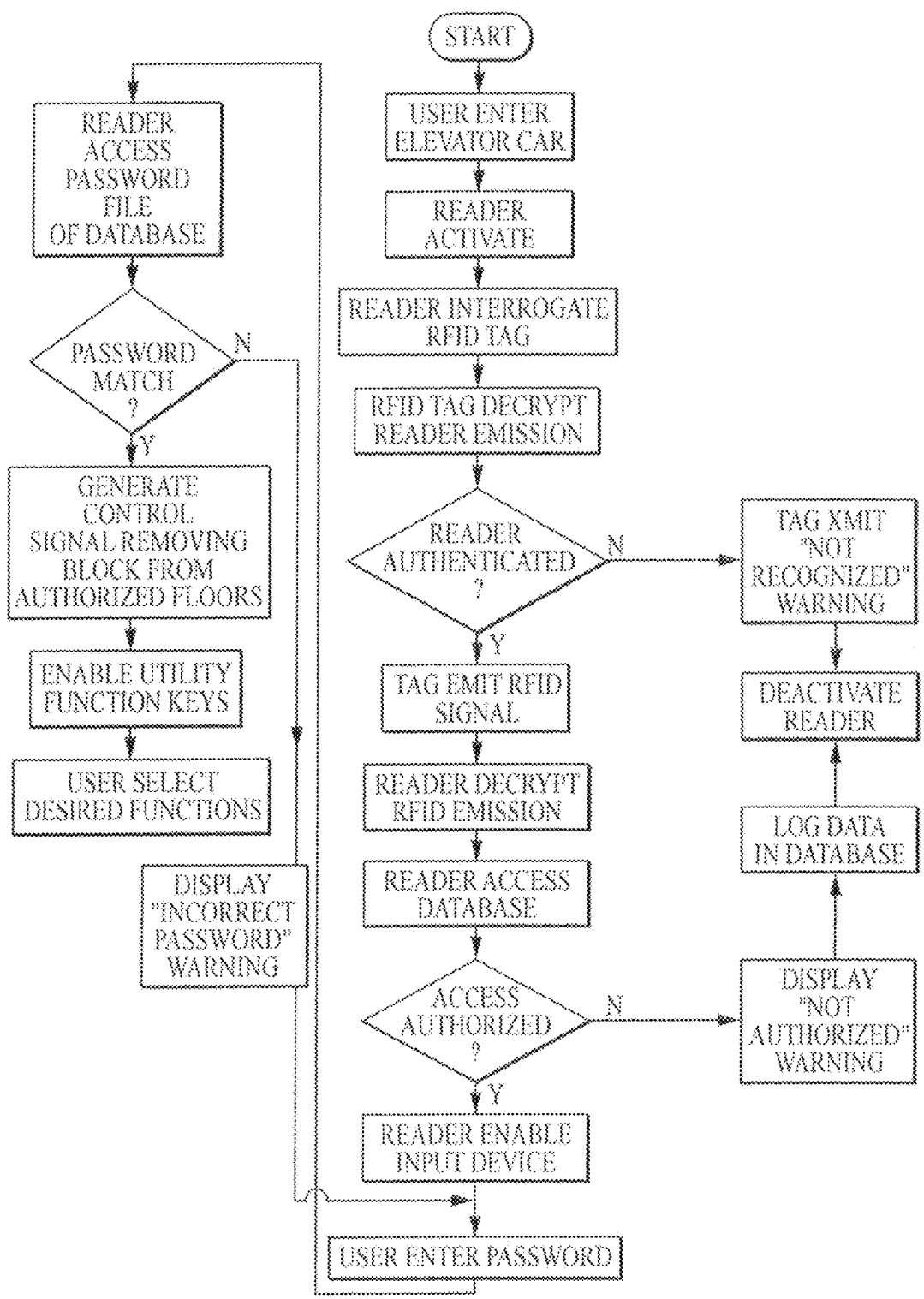
FIG. 16 is a logic diagram illustrating the operation of the identification and access sub-system of FIG. 15.

Referring now to FIGS. 15 and 16, the occupant identification and access sub-system 1500 of the present invention is described. As shown in FIG. 15, the identification and access sub-system 1500 generally comprises an RFID tag 1502, reader 1504, and access database 1510 of the type well known in the art, which uniquely and automatically identifies occupants of the elevator, and provides them access to certain restricted floors. In one embodiment, the RFID tag 1502 of the present invention authenticates the tag reader 1504 of the access sub-system 1500 such that when the tag 1502 is interrogated by the reader 1504 (such as when the user steps into the elevator car 180), an appropriate code or password must be provided within the RF signal from the reader for the tag 1502 to radiate its RF identification signal. See FIG. 16. In this fashion, unauthorized access to the RF signature or emissions of the tag 1502 through use of an unauthorized reader are frustrated. However, this technique can potentially be defeated through the coincident monitoring of the tag's emissions at close range when interrogated by an authorized reader 1504, and subsequent replication of the monitored emissions from the tag 1502 to the authorized reader 1504. Accordingly, in conjunction with the aforementioned reader authentication process, the RFID tag 1502 and reader 1504 of the present invention also optionally utilize an encrypted data protocol, such that any transmissions from the tag 1502 are encrypted, and accordingly must be decrypted by the authorized reader 1504 before the access database 1510 is searched. In one embodiment, the RFID tag 1502 and reader 1504 comprise a direct sequence spread spectrum (DSSS) communication system incorporating a PN (pseudo-noise) spreading code of the type well known in the communications art. In another embodiment, a frequency hopping spread spectrum (FHSS) having a hopping sequence is used to enhance security. The use of passwords, encrypted data protocols, and spread spectrum techniques for security is well known in the art, and accordingly will not be described further herein. See U.S. Pat. No. 5,539,775 entitled "Modulated spread spectrum in RF identification systems method" issued Jul. 23, 1996, and U.S. Pat. No. 5,629,981 entitled "Information management and security system" issued May 13, 1997, both incorporated herein by reference in their entirety.

In the embodiment of FIG. 15, an RFID interrogator/reader 1504 is placed within the walls of the elevator car 180. The reader 1504 has limited range and is directional in nature such that it will not interfere with the readers of other elevator cars nearby or other RF devices. The reader 1504 interrogates the passengers of the car based on sensing their presence, such as by (i) the user depressing the elevator call button and the doors being provided an "open" signal by the control system; or alternatively (ii) by sensing pressure on the one or more piezoelectric sensors 806 present within the flooring of the car as shown in FIGS. 8-9 above. As will be recognized by those of ordinary skill in the art, myriad different schemes for activation of the reader 1504 are possible, all being contemplated for use with the invention disclosed herein. As shown in FIGS. 15 and 16, the reader interrogates any RFID tags 1502 in the possession of the car occupants, which in turn respond by emitting RF energy at a particular frequency when proper authentication of the reader occurs. The RFID tags 1502 of the present invention are advantageously embedded within a thin profile access card 1506 for ease of carrying by the user, although other configurations may be used. The RF signal(s) received by the reader 1504 are then compared by the processor 106 to a list of known or authorized entrants and their accessible locations residing within a database 1510 stored on the file server 170 or locally on the storage device 108, 110 in order to find the entry or entries corresponding thereto. At this point, any matching entries found cause the processor 106 to signal a micro-controller 1513 to initiate a call signal to the control logic 1507 for a specific floor or floors authorized for access during after-hours operation per the data file 1510, subject to proper password entry by the user. The user is then required to authenticate using a password input via the input device 102 or touch screen 113 located inside elevator 180. Alternatively, one or more recessed or view-obstructed alpha-numeric keypads (not shown) are disposed within the elevator car to permit the user to enter their password without it being seen by other occupants.

In the event that multiple RFID tags 1502 are present on the car 180, yet multiple occupants carrying such tags wish to go to a single location (such as if one person with authorization for access to floor "A" is accompanying persons with authorization for other floors only), the other tag holders need only not authenticate the non-desired floors, at which point the system will refuse access to those floors, and not generate a call signal via the micro-controller 1513. Hence, people may only egress the elevator on the authenticated floor(s), or the lobby.

Additionally, the access sub-system 1500 can optionally notify security (and/or the destination floor) of the user's destination and identity, and maintain a record of access. Such notification may be useful for monitoring the location of individuals within the building, and/or advance warning of the arrival of a particular person. Furthermore, such security records can be used to archive the history of access to particular areas during certain periods of time. The records may be maintained on a remote central server 170, or locally within the access system 1500 itself.

Figure 17:
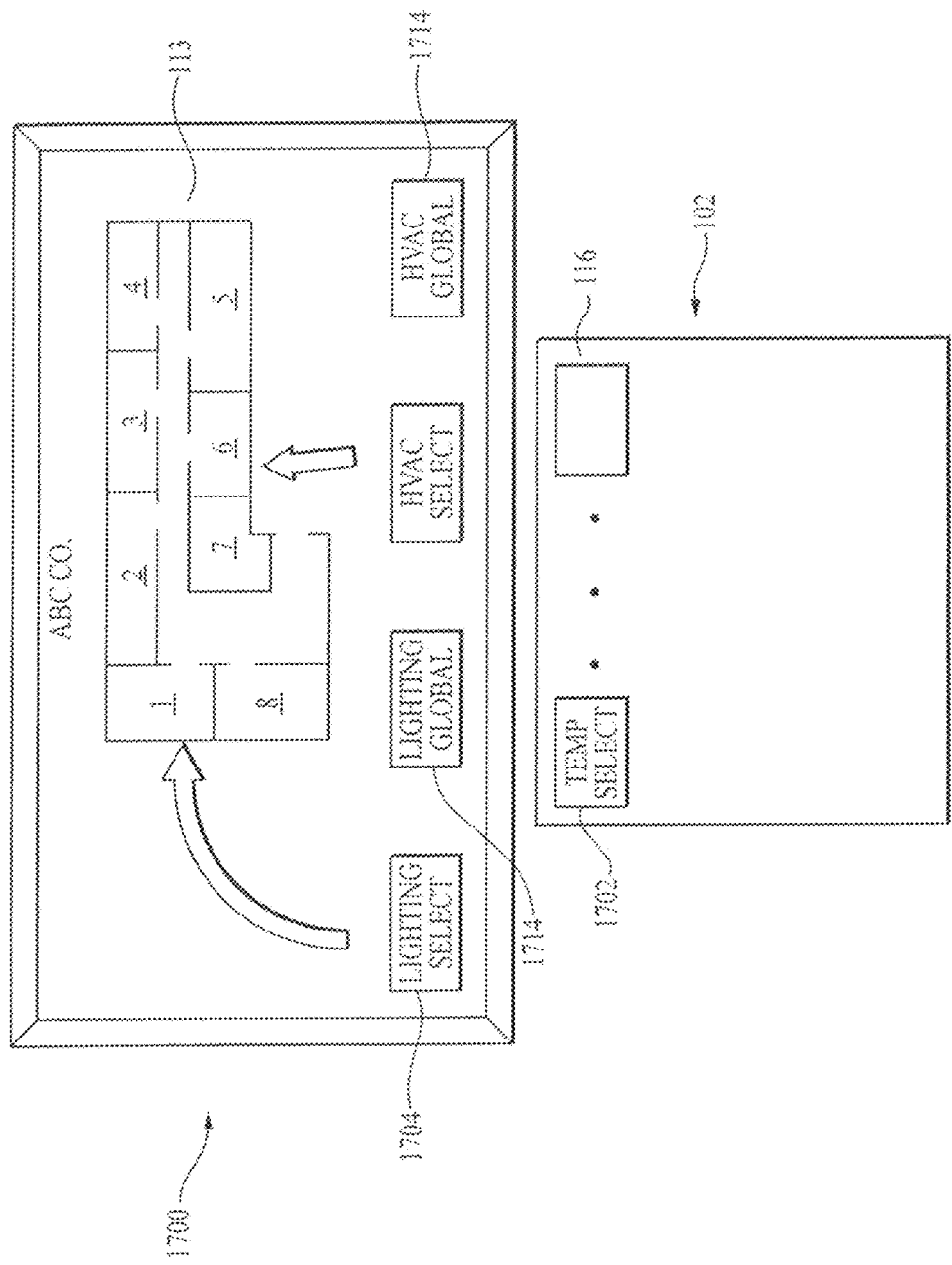
FIG. 17 is a plan view of one embodiment of a utility services selection display associated with the identification and access sub-system of FIG. 15.

The user may also optionally perform other functions such as lighting and environmental control from the elevator car 180 using the access sub-system 1500. Specifically, in one embodiment, the authenticated user is provided a display 1700 with several predetermined function keys 1702, 1704 disposed thereon, as shown in FIG. 17. The functions associated with the keys include, for example, initiation or termination of lighting or HVAC in various areas of the destination floor. The display may comprise a set of function keys 1702, 1704 on a keypad 116 as described above, or alternatively comprise a graphic display on the touch screen 113. Many other display formats and techniques, such as "soft" function keys on the keypad 116, which allow multiple functions per key depending on operating mode, are possible. Using the access sub-system 1500, the user may selectively start remote equipment such as lighting and/or HVAC on the authenticated floor in advance of their arrival, and all from a single convenient location. Additionally, the RFID tag 1502 for a given user may be encoded with information indicating the location of the user's individual office or work area. Hence, when the user is authenticated and selects either the HVAC or lighting initiation functions, these services are only activated in a limited portion or certain zones of the floor, thereby saving on energy costs. If the user desires, he/she may initiate the foregoing services for their entire suite or floor (subject to authorization) by depressing the "Global" function keys 1714 on the keypad before selecting the service.

Lastly, the user may also use their RFID tag 1502 to permit the information and control system 100 of the present invention to pre-configure the PED download function described above upon receipt of an authenticated RFID signal. Specifically, the access sub-system 1500 "remembers" each individual user's selected download configuration by storing a data file at an address on the storage device 108, 110 or server 170 referenced within the aforementioned security access database 1510. As described above, each time the tag 1502 authenticates the reader 1504 and the tag emits it's RFID signal (which is subsequently decrypted by the reader 1504), the access control sub-system 1500 attempts to match the user's ID to one located within the access database 1510. Upon a successful match, the access sub-system 1500 also retrieves the download configuration file from the address referenced in the database 1510 associated with that user ID, and stores it in local memory or storage 110, 108. Upon user authentication with the appropriate password via the input device 102, the information and control system 100 transfers the download configuration file from memory 110, 108, whereby the user may receive the pre-configured download simply by inserting their PED 704 into the data terminal 702 associated with the authenticating input device 102. Note that when multiple users with distinct RFID tags 1502 are present in the elevator car, the sub-system 1500 only transfers the download configuration file to the control system 100 for those users completing password authentication, and then only to the data download terminal 702 associated with the authenticating input device 102. Hence, multiple people within the elevator car 180 may authenticate and download data simultaneously, if desired (assuming that the elevator car is equipped with multiple data download terminal/input device pairs).

Adaptive Advertising Sub-System

Referring now to FIGS. 1 and 18*a-d*, the adaptive advertising sub-system of the information and control system 100 is described. Using this advertising sub-system, the aforementioned elevator display devices 113 and information and control system 100 may be programmed to provide adaptive advertising or information. As shown in FIG. 1, the advertising sub-system 1800 is comprised of components resident within the information and control system 100, as well as data files and an adaptive algorithm (not shown) running on the processor 106. Specifically, the speech recognition module 104, DSP 125, processor 106, and other related components previously described recognize speech and convert this speech into a digital representation. These digital representations are analyzed by the adaptive algorithm in one of two adaptive modes: 1) prompt mode, and 2) statistical mode, as described below.

Figure 18A:
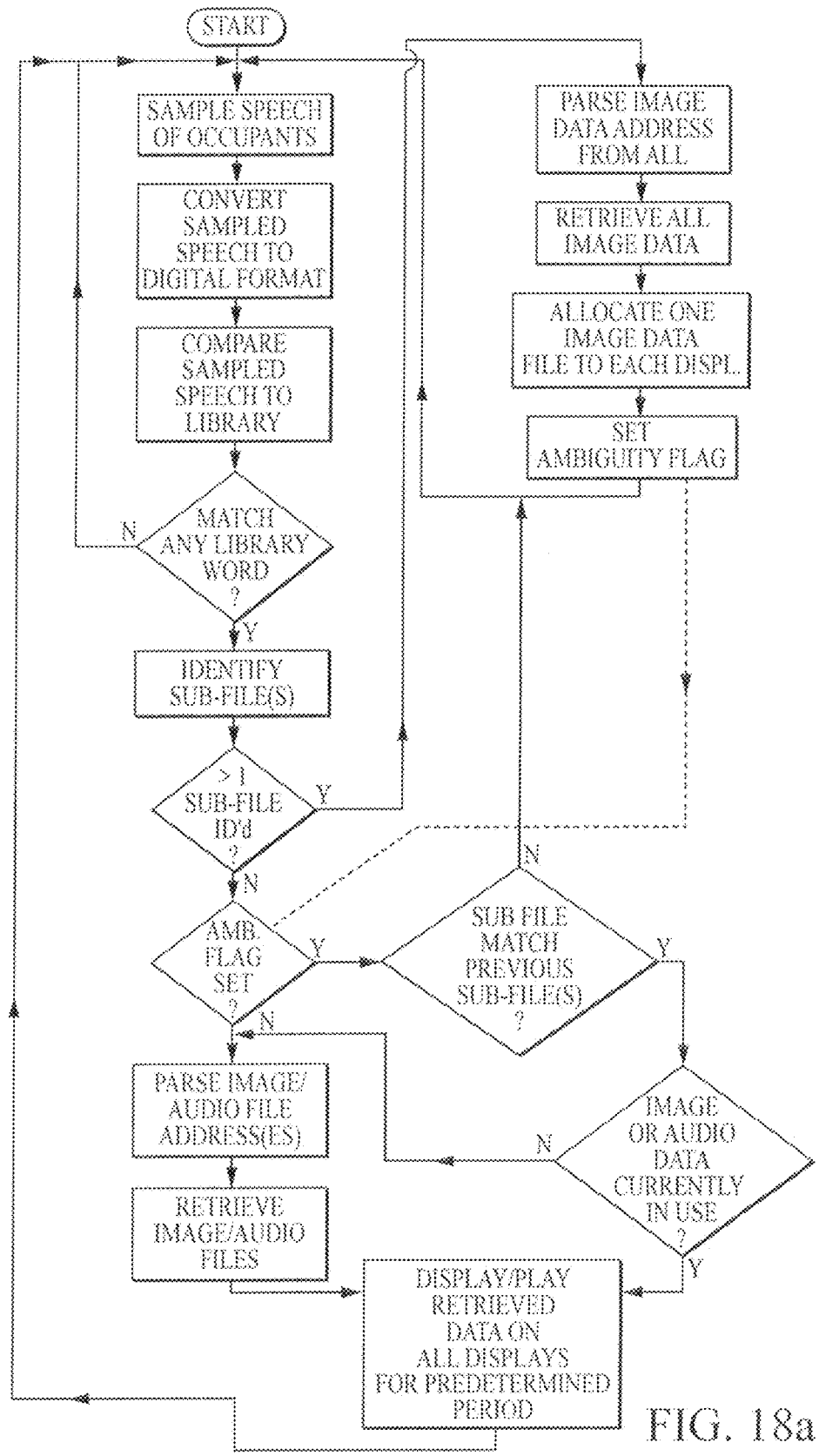
FIG. 18a is a logic diagram illustrating the operation of a first embodiment of the prompt mode of the adaptive advertising sub-system of the invention.
Figure 18B:
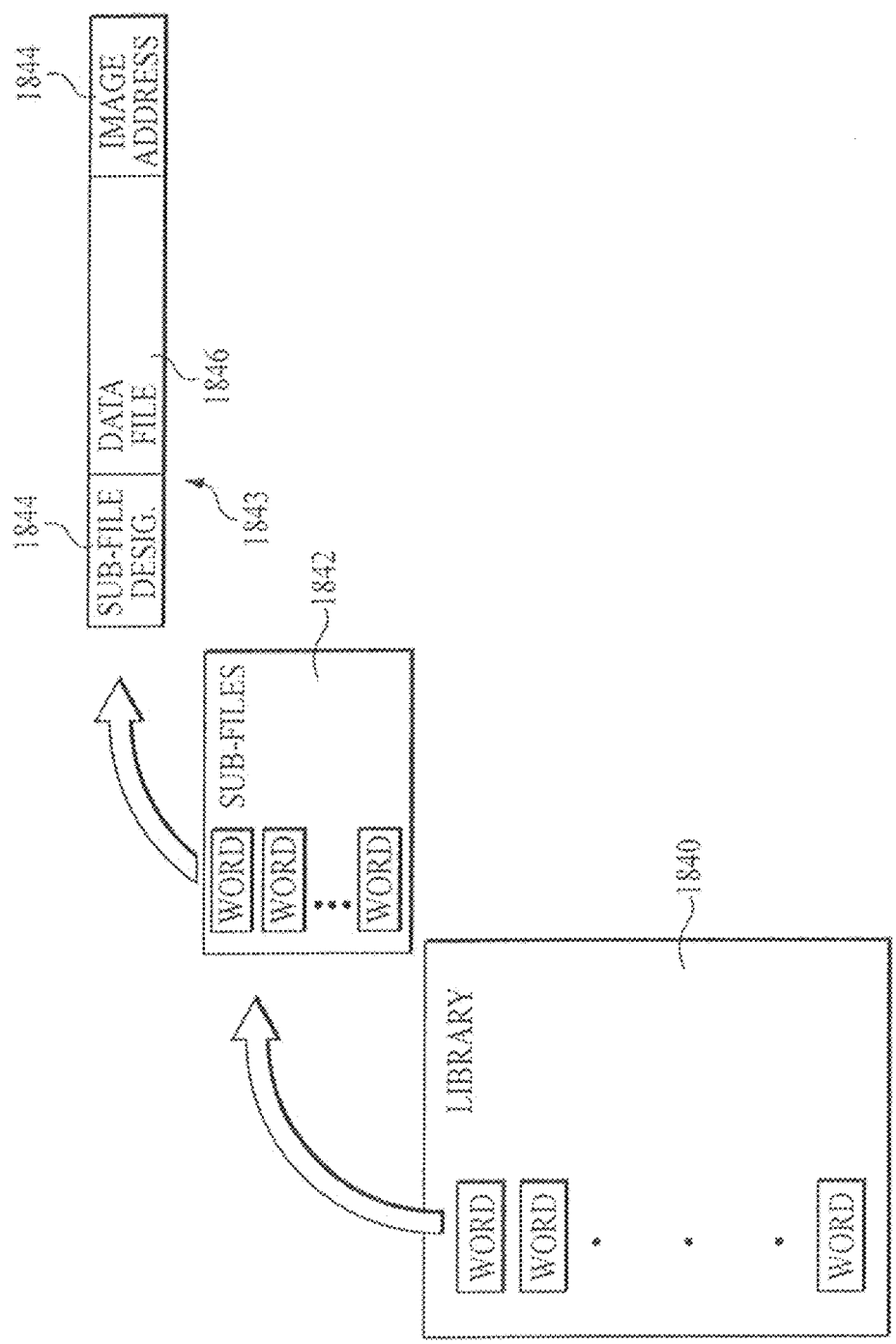
FIG. 18b illustrates the library data file structure used in conjunction with the advertising sub-system of the invention.

In prompt mode, the speech of one or more passengers on the elevator car 180 is sampled and analyzed in real time to determine the general topic of conversation between the passengers. FIG. 18*a* illustrates the logical flow of the prompt mode process. Specifically, the processor 106 (FIG. 1) accesses a stored data file or library of sub-files of keywords stored on the remote server 170 or local storage device 108 which relate to certain topics of interest. The library 1840 (FIG. 18*b*) ideally does not contain common words such as conjunctions, prepositions, or the like, but rather unique and preferably multi-syllabic words which are not generic to many different topics. For example, the words "deposition" or "litigation" may be used as keywords indicating the presence of a member of the legal profession. The predefined library 1840 of keywords arranged into sub-files 1842 is present on the server 170 or storage device 108; this library 1840 may be based on knowledge of the building's tenants, on some demographic factor common to people who most often use the elevator, or other factors. As illustration, the foregoing library sub-file 1842 consisting of, inter alia, the terms "deposition" and "litigation" would be appropriate for an application which is frequented by attorneys or paralegals. When the speech recognition module 104 compares and matches these library terms with the actual speech of the occupants of the car, a binary value indicative of the matched library sub-file 1842 is generated. Note that these sub-files 1842 are not physically separate files in the present embodiment, but rather "virtual" files that relate to their organizational commonality. Specifically, each library word 1843 or entry includes several consecutive bits (such as an 8-bit data word 1844 in the present embodiment) appended on the beginning or end of the digital file data 1846 which indicate the sub-file(s) with which the word is associated. When a digital representation of a word within the library 1840 is matched, the data word 1844 appended thereto is used as an address for advertising image data (and/or CELP audio data) held in the storage device 108 or server 170. As a simple example, when the advertising sub-system matches the digitized form of the spoken word "litigation" to an entry within the library file, the 8-bit word appended to that entry of the library file is used to address the image and/or audio data file(s) relating to legal topics stored on the local storage device 108 (or server 170). This "legal" image data may contain, for example, a representation of an advertisement for legal document services, or a talking advertisement for a law firm. The image data file is then retrieved and displayed on the display screen 113 using any number of well known graphic display techniques. The CELP or other format audio file is decompressed and converted to an analog representation using the speech synthesis module 112 (FIG. 1) and amplified over the speakers 111 in the elevator car 180 if desired.

The system is further configured such that if multiple image data files are requested by the processor 106, such as may occur when two different sets of people within the elevator car 180 are discussing two unrelated topics, each different image data file is allocated to a different available display 113 within the elevator car. For audio, only one data file is converted and played at any given time to avoid confusion. Furthermore, the sampling rate of the system may be set at a low frequency, such as once every 60 seconds, or only when the given elevator car 180 is in operation, so that a given image is maintained for an appropriate period of time on the displays 113.

In the event that a word is recognized by the advertising sub-system which includes two or more sub-file address references (such as for the word "trademark", which may have connotations relating to both intellectual property law and business), the sub-system allocates each of the ambiguous references to a separate display (up to the existing number of unused displays 113 at that time), and then attempts to resolve the ambiguity by waiting for the next word which is matched within one of the sub-files 1842 (FIG. 18b) whose designation is appended on the library entry 1843 for the first word. If that next matched word does not resolve the ambiguity, the process is repeated until the ambiguity is resolved. During ambiguity resolution, the existing file displayed on each display screen 113 is maintained for the duration of the process, thereby providing an apparently seamless display to the occupants of the car.

In an alternate embodiment of the "prompt" mode (FIG. 18c), the system accesses the building directory file discussed previously with respect to FIGS. 1-4 using the floors selected by the user to obtain pertinent advertising information. Specifically, when a passenger riding on the car 180 selects a floor via the floor selection panel (not shown), or alternatively calls the elevator from a given floor, the system accesses the building directory file to obtain information regarding the tenants on that floor. The building directory file for each tenant includes an appended data word which uniquely identifies the business area or other descriptive information about the tenant. For example, an intellectual property law firm residing on the fourteenth floor of a building would have an appropriate code, as represented by a multi-bit data word, indicating that they were engaged in the in (i) legal practice, and (ii) intellectual property as a sub-specialization. Whenever the fourteenth floor was selected within the elevator car 180, or alternatively whenever an elevator call was made from the fourteenth floor and answered, the system would display advertising images, video, or text messages relating to the field of intellectual property law within the calling/answering car until or beginning when the fourteenth floor was reached, respectively. If multiple floors were selected within the car, as is commonly the case, the sub-system would prioritize the messages displayed based on the direction of travel of the car and it's proximity to a given floor. The system also optionally estimates the remaining time until the floor is reached as part of its analysis.

Figure 18C:
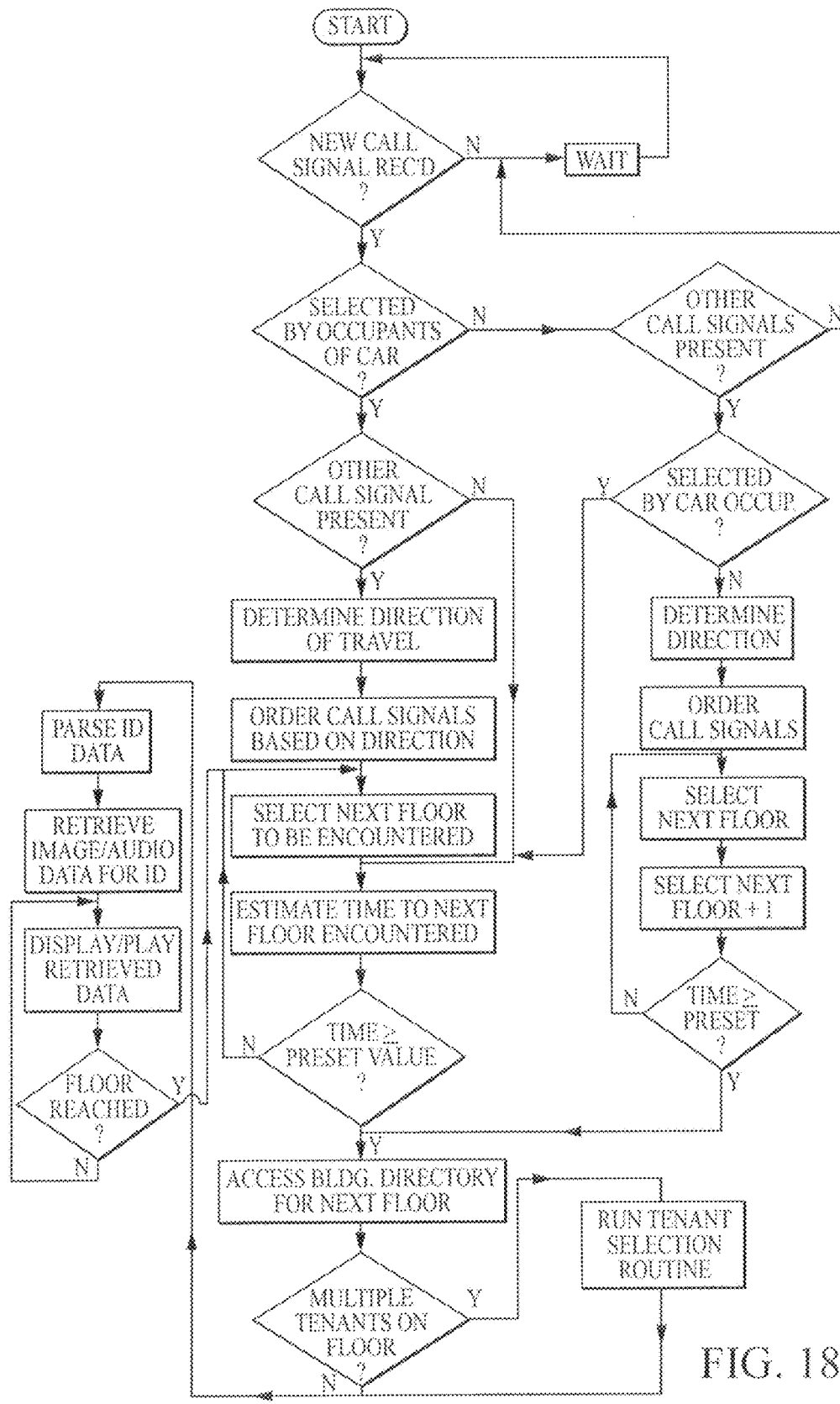
FIG. 18c is a logic diagram illustrating the operation of a second embodiment of the advertising sub-system of the invention.

As an example of the alternative embodiment of FIG. 18c, if four people enter the same elevator car at the lobby level, and each depress a different floor number (say the third, seventh, eighth, and eleventh floors), the sub-system 1800 would prioritize the first floor to be encountered (i.e., the third floor) in its direction of travel and display advertising pertinent to the tenant on that floor. Since the travel time between the lobby (first floor) and third floor would be only perhaps 10 seconds, the sub-system 1800 would choose advertising appropriate to that time slot, such as a fixed image. Once the car reached the third floor and the doors opened, the sub-system 1800 then prioritizes the next floor to be encountered (here, the seventh floor). Accessing the building directory file for the seventh floor, the sub-system 1800 would then choose advertising appropriate that floor and the remaining time available (perhaps 15 seconds). After the seventh floor was reached, the sub-system 1800 would then prioritize the eighth floor. If the time interval to the next floor was too short as determined by a predetermined parameter, such as a minimum time interval in seconds, the sub-system would prioritize the next floor whose time interval exceeded the minimum (in this case, the eleventh floor). When all passengers were unloaded, the car 180 would remain at the last selected floor (eleventh) until another call was initiated. When this new call was received, the sub-system 1800 would retrieve advertising relevant to the floor from which the new call was initiated, and display that information once the floor was reached by the car 180 (as determined by a position sensor, the opening of the doors, or any other well known means). It is apparent that under very crowded conditions where many often closely situated floors are selected by the occupants of the car, the sub-system 1800 may encounter few instances where the estimated time of travel of the car exceeds the aforementioned minimum parameter value. In such cases, the sub-system 1800 may be made to revert to "prompt" mode audio sampling as described above (FIG. 18a), or some other alternative scheme for selecting pertinent advertising. Many different variations of the basic approach described herein are possible, all of which are considered to be within the scope of the invention.

In the case of multiple tenants residing on one floor, the sub-system 1800 can be programmed to display images pertinent to each tenant on the floor based on a selection routine. In one embodiment, if multiple unrelated tenants occupy a given floor, and that floor is selected by a person entering the elevator at the lobby, the sub-system 1800 will pick image data relating to the different tenants on a rotating basis such that each subsequent time that same floor is selected, an image appropriate to a different tenant will be retrieved and displayed. Alternatively, the selection may be made random, or even be coupled to the speech recognition module 104 to weight one choice over the other(s). Many other arrangements are possible, all of which are considered to be within the scope of the invention disclosed herein.

Figure 18D:
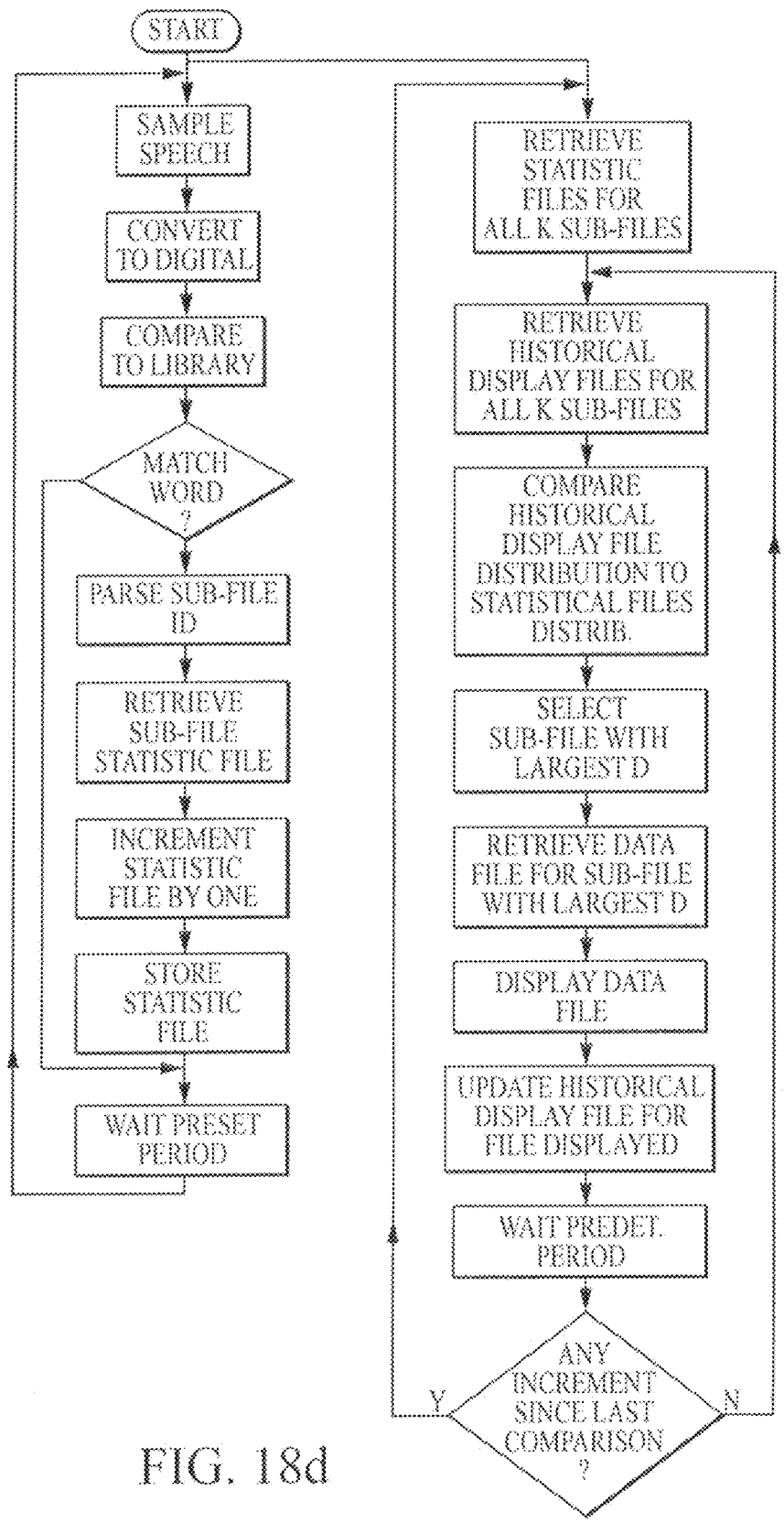
FIG. 18d is a logic diagram illustrating the operation of a third embodiment of the adaptive advertising sub-system of the invention.

Referring now to FIG. 18d, the so-called "statistical" mode of the adaptive advertising sub-system 1800 is now described. During operation in statistical mode, the sub-system 1800 gathers statistics on the speech patterns of its occupants over a predetermined (or open ended) period of time, in order to derive statistics on the most frequently encountered words within its library. Using prior examples, if a given building has a substantial population of law firms, the speech recognition system 104 may encounter legally-related words or sub-files present in its library 1840 (such as "deposition" or "litigation") most often. The system of the present invention effectively builds histograms for each of the words in its library 1840 over the sampling period, and structures its advertising accordingly. Specifically, as shown in FIG. 18d, the statistical mode algorithm running on the processor 106 of FIG. 1 increments a statistical data file on the storage device 108, 110, server 170, or other location. The sub-system 1800 samples this data file at a predetermined periodicity (such as every hour, every 24 hours, or every update cycle of the advertising display) to determine the distribution of occurrences of each word. This distribution is then compared to a historical data file which represents the number of instances advertising associated with each sub-file has been displayed. Advertising data files are then selected and displayed by the processor 106 and algorithm such that the desired proportionality between the sampled statistic and the display sequence is maintained. Returning again to the foregoing example, if words relating to the "legal" sub-file constituted 20% of the matches in the sampled data over a given period, then legally-related advertising would be displayed by the advertising sub-system approximately 20% of the time.

It is noted that the aforementioned speech-related adaptive advertising modes (FIGS. 18a, 18c, and 18d) may be automatically disabled when the speech recognition module 104 is in use or required by another function within the information and control system 100. For example, when the previously described "Building Directory" function key 122 is depressed, the prompt and statistical advertising modes are interrupted or frozen by the processor 106 until the selected function is terminated either manually by the user or via the expiration of a system clock (i.e., the function "times out"). This interrupt allows the building directory function to operate unimpeded without having to share resources within the information and control system 100 with the adaptive advertising sub-system 1800. It will be recognized, however, that the information and control system 100 may so configured to allow such parallel operation if desired.

Figure 19:
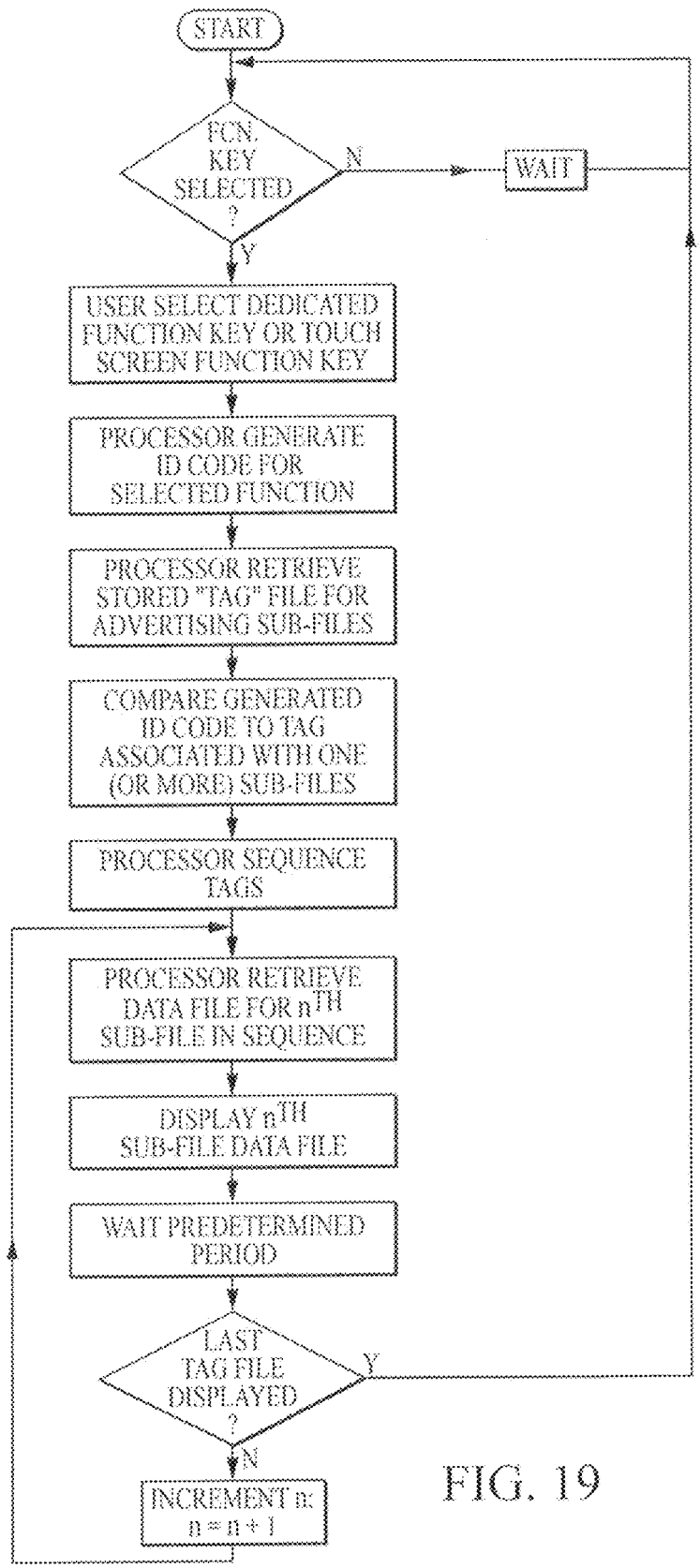
FIG. 19 is a logic diagram illustrating the operation of a fourth embodiment of the adaptive advertising sub-system of the invention.

Alternatively, the aforementioned network interface 300 of FIG. 3 may be used as an input to the adaptive advertising sub-system 1800. As is commonly used with prior art Internet browsers, adaptive "banners" display advertising related to a user's query on a search engine. In the present invention, the advertising graphics presented on the display 113 may either be anecdotally or statistically adaptive to the user's information queries. Specifically, in one embodiment of the anecdotal system (FIG. 19), user inputs received via the input devices 102 or touch screens 113 are provided to an adaptive algorithm which identifies each query type as falling within one or more predetermined categories. As the user selects a given function key 114, a code unique to that function key is also generated. The advertising data files, each having a "tag" (such as a code or data bits embedded or appended to the address in memory) are then searched by the algorithm to match those files having the same category tag. These files are then retrieved from the storage device 108, 110, or server 170 in a predetermined order (such as sequence based on ascending address locations, or some other parameter), and displayed on the display device 113. The display of these files may be in sequential fashion, each for a predetermined interval, or alternatively one file may be displayed until another function key 114 is selected. Many other display schemes are possible, consistent with the invention.

As an example of anecdotal adaptation, consider the case where the user selects the 'Weather" function key on the keypad 116 (or touch screen 113). The sub-system 1800 retrieves and displays the desired weather information on the display device, while also retrieving and displaying advertising graphics relating to weather (such as for a local television station's weather reports) on an advertising placard or banner on the same or another display. If the user then selects another function key 114, the sub-system 1800 retrieves another advertising graphic file relating to the newly chosen function.

In a statistical adaptation, the choice of function keys 114 by each successive user adds to a data file which is generated by a statistical algorithm running on the processor 106. The algorithm calculates and stores a running total of the number of times each function key 114 (or each functional category) is selected over a predetermined period. Advertising graphics are displayed on the display unit(s) 113 in proportion to this statistic. For example, if the "Weather" function key were actuated five times as often as the "Stock Quotes" key over a given interval, the sub-system 1800 could be programmed to retrieve and display weather-related advertising on average five times as often as financial advertising Note that the foregoing anecdotal and statistical adaptation embodiments may also be used together. For example, the sub-system 1800 could be programmed to display advertising on a statistical basis during periods of non-use, while displaying advertising anecdotally during use. Many other variants are also possible.

It is noted that while various aspects of the invention disclosed herein are described in terms of specific embodiments (and logic diagrams) of methods and processes, other embodiments of these methods and processes are possible consistent with the invention. For example, certain steps in the disclosed methods may be deleted, and/or additional steps added. Furthermore, the order of performance of steps may in many cases be permuted, or multiple steps disclosed as being performed in series may be performed in parallel, and vice versa. The embodiments disclosed herein are therefore considered merely illustrative of the broader methods claimed herein.

While the above detailed description has shown, described, and pointed out the fundamental novel features of the invention as applied to various embodiments, it will be understood that various omissions, substitutions, and changes in the form and details of the device or process illustrated may be made by those skilled in the art without departing from the spirit of the invention.

What is claimed is:

1. Integrated, environment control-enabled computerized information apparatus of a transport device capable of movement between locations, the computerized information apparatus configured to provide a user with remote control of environment functions associated with a premises, at least a portion of the premises being specifically associated with the user, the computerized information apparatus comprising:

data processing apparatus comprising at least a central processor and a digital signal processor (DSP) and a graphics co-processor;
a first wireless interface in data communication with at least a portion of the data processing apparatus;
a mass storage device in data communication with at least a portion of the data processing apparatus;
a data interface in data communication with at least a portion of the data processing apparatus;
an input and display device in data communication with at least a portion of the data processing apparatus and both viewable and accessible by the user;
computerized logic operative to run on the data processing apparatus and configured to cause actuation of one or more environment control functions associated with the premises, the computerized logic configured to:
display on the input and display device one or more display elements corresponding to the one or more environment control functions;
receive via the input and display device at least one input corresponding to a user's selection of at least one of the one or more display elements; and
cause transmission via the first wireless interface of data relating to the at least one input to cause actuation at the premises of one or more apparatus corresponding to the selected at least one display element; and
radio frequency apparatus in data communication with at least the computerized logic and at least a portion of the data processing apparatus, the radio frequency apparatus configured to receive data uniquely identifying a portable radio frequency device associated with the user and, based at least on the data uniquely identifying the portable radio frequency device, cause enablement of one or more functions within the transport device, the enablement of one or more functions including at least enablement of the actuation of the environment control functions via the input and display device;
wherein the one or more environment control functions comprise at least one of (i) a premises heating, ventilation, or air conditioning (HVAC) function, and/or (ii) a premises lighting function.

2. The computerized information apparatus of claim 1, wherein the computerized information apparatus is further configured to, based at least on the identifying the portable radio frequency device, enable selective actuation of only portions of the environment control functions corresponding specifically to the at least portion of the premises associated with the user, the selective actuation enabling a savings of energy as compared to non-selective actuation, the non-selective actuation comprising: (i) actuation of the environment control functions associated with the at least portion of the premises associated with the user, and (ii) actuation of environment control functions associated with one or more non-user-specific portions of the premises.

3. The computerized information apparatus of claim 1, wherein the radio frequency apparatus is further configured to engage in an authentication process relating to the portable radio frequency device prior to the enablement of the one or more functions, the authentication process comprising: (i) receipt of electromagnetic radiation transmitted from the portable radio frequency device and encoded with the data uniquely identifying the portable radio frequency device; and (ii) comparison of the received data, and second data relating to one or more authenticated radio frequency devices.

4. The computerized information apparatus of claim 3, wherein the transmission of the data uniquely identifying the portable radio frequency device comprises transmission of at least a portion of the data in an encrypted form; and
wherein the radio frequency apparatus is configured to decrypt the encrypted at least portion of the data.

5. The computerized information apparatus of claim 1, wherein the radio frequency device apparatus is configured to:
detect an indication of a possible presence of the portable radio frequency device within a communications range of the radio frequency apparatus; and
in response to the detection, transmit an interrogating radio frequency signal configured to cause the portable radio frequency device to respond;
wherein the detection comprises actuation of a function or sensor of the transport device, the function or sensor in signal communication with the computerized information system.

6. The computerized information apparatus of claim 1, wherein the computerized information apparatus is further configured to establish a temporary data link with a portable electronic device via the data interface so as to enable data transfer between the portable electronic device and the computerized information apparatus, the data transfer between the portable electronic device and the computerized information apparatus comprising transfer of data from the computerized information apparatus to the portable electronic device that is configured so as to occur automatically when the portable electronic device establishes data communication with the computerized information apparatus via the data interface, the transferred data configured specifically for the user, the configuration specifically for the user based at least in part on data relating specifically to that user and previously stored on a remote network server apparatus, the previously stored data which relates specifically to that user and is based at least in part on one or more previously supplied user-selected configuration parameters, the transferred data only transferred after successfully performing at least authentication of the portable radio frequency device.

7. The computerized information apparatus of claim 1, further comprising second computerized logic in data communication with the data processing apparatus and configured to:
receive a plurality of successive digitized representations of respective speech inputs of the user of the transport device, the speech inputs relating to a desired function to be performed by the computerized information system, the desired function relating to at least one of a plurality of topical areas for which the computerized information apparatus can provide information, the at least one of the topical areas comprising location of a business or entity, a first of the respective speech inputs comprising a name or part of a name, at least a portion of respective speech inputs comprising responses to one or more prompts instigated by the computerized information apparatus to elicit one or more responses enabling the second computerized logic to ultimately converge on one of a plurality of possible matches to a first of the speech inputs;
cause at least one wireless access of a remote network server apparatus via at least the first wireless interface to access information necessary to perform the desired function, the at least one wireless access comprising at least one of the successive digitized representations;

receive accessed information obtained from the remote network server apparatus via the first wireless interface; and implement the desired function on the computerized information system using at least a portion of the received information and at least the input and display device.

8. The computerized information apparatus of claim 1, wherein:

the provision of the remote control of environment functions associated with a premises is performed automatically via at least the data uniquely identifying the portable radio frequency device;

the radio frequency apparatus is further configured to engage in an authentication process relating to the portable radio frequency device prior to the enablement of the one or more functions, the authentication process comprising: (i) receipt of electromagnetic radiation transmitted from radio frequency apparatus to the portable radio frequency device and encoded with first data which provides unique identification of the radio frequency apparatus; and (ii) comparison of the received first data, and second data relating to one or more authenticated radio frequency apparatus; and wherein the portable radio frequency device is configured such that the authentication process must be completed before the portable radio frequency device transmits the data uniquely identifying the portable radio frequency device.

9. The computerized information apparatus of claim 8, wherein:

the transmission of the data uniquely identifying the portable radio frequency device comprises transmission of at least a portion of the data in an encrypted form; and the radio frequency apparatus is configured to decrypt the encrypted at least portion of the data.

10. The computerized information apparatus of claim 9, wherein the radio frequency device apparatus is configured to:

detect an indication of a possible presence of the portable radio frequency device within a communications range of the radio frequency apparatus; and in response to the detection, transmit an interrogating radio frequency signal configured to cause the portable radio frequency device to respond;

wherein the detection comprises actuation of a function or sensor of the transport apparatus, the function or sensor in signal communication with the computerized information system.

11. The computerized information apparatus of claim 1, further comprising second computerized logic in data communication with the data processing apparatus and configured to:

receive a plurality of successive digitized representations of respective speech inputs of the user of the transport device, the speech inputs relating to a desired function to be performed by the computerized information system, the desired function relating to at least one of a plurality of topical areas for which the computerized information apparatus can provide information, the at least one of the topical areas comprising location of a business or entity, a first of the respective speech inputs comprising a name or part of a name, at least a portion of respective speech inputs comprising responses to one or more prompts instigated by the computerized information apparatus to elicit one or more responses enabling the second computerized logic to converge on one of a plurality of possible matches to a first of the speech inputs;

cause at least one wireless access of a remote network server apparatus via at least the first wireless interface to access information necessary to perform the desired function, the at least one wireless access comprising at least one of the successive digitized representations;

receive accessed information obtained from the remote network server apparatus via the first wireless interface; and implement the desired function on the computerized information system using at least a portion of the received information and at least the input and display device.

12. The computerized information apparatus of claim 1, further comprising second computerized logic in data communication with the data processing apparatus and comprising:

means for receiving a plurality of successive digitized representations of respective speech inputs of the user of the transport device, the speech inputs relating to a desired function to be performed by the computerized information system, the desired function relating to at least one of a plurality of topical areas for which the computerized information apparatus can provide information, the at least one of the topical areas comprising location of a business or entity, a first of the respective speech inputs comprising a name or part of a name, at least a portion of respective speech inputs comprising responses to one or more prompts instigated by the computerized information apparatus to elicit one or more response enabling the second computerized logic to converge on one of a plurality of possible matches to a first of the plurality of speech inputs;

means for causing at least one wireless access of a remote network server apparatus via at least the first wireless interface to access information necessary to perform the desired function, the at least one wireless access comprising at least one of the successive digitized representations;

means for receiving accessed information obtained from the remote network server apparatus via the first wireless interface; and means for implementing the desired function on the computerized information system using at least a portion of the received information and at least the input and display device.

13. The computerized information apparatus of claim 1, wherein the input and display device comprises a capacitive touch screen input and display device, and the computerized information apparatus further comprises at least one computer program, the at least one computer program being configured to, when executed on the data processing apparatus:

cause generation and display on the touch screen input and display device of at least a map graphic showing at least the at least portion of the premises;

receive a user touch input via the touch screen input and display device relating a particular location on a screen of the touch screen input and display device, the particular location corresponding to a location within the displayed at least portion of the premises; and cause activation of the environment control function associated with at least the particular location.

14. The computerized information apparatus of claim 13, wherein the at least one computer program is further configured to, when executed on the data processing apparatus:
cause conversion of a coordinate of the user touch input to geographic or spatial location data; and
transmit at least a portion of the geographic or spatial location data via the first wireless interface to the premises to enable the activation of the environment control function associated with at least the particular location.

15. The computerized information apparatus of claim 13, wherein the at least one computer program is further configured to, when executed on the data processing apparatus, cause selection of the map graphic based at least in part on the data uniquely identifying the portable radio frequency device received by the radio frequency apparatus of the computerized information system;
wherein at least a portion of the map graphic comprises graphical image data that has been transmitted to computerized information apparatus by a networked server apparatus via the first wireless interface.

16. The computerized information apparatus of claim 1, wherein the input and display device comprises a capacitive touch screen input and display device, and the computerized information apparatus further comprises at least one computer program, the at least one computer program being configured to, when executed on the data processing apparatus:
obtain digitized speech generated based on speech received from a user, the digitized speech relating to an organization or entity which the user wishes to locate; and
access a network entity via the first wireless interface in order to obtain data relating to the location of the organization or entity, the obtained data based at least in part on the digitized speech;
receive at least a portion of the obtained data relating to the location via the first wireless interface; and
cause display on the touch screen input and display device of the location, the display based at least in part on the received at least portion of data;
wherein the display further comprises provision of at least a map graphic showing the location including other organizations or entities proximate thereto, and the computerized information apparatus is further configured to:
receive a user touch input via the touch screen input and display device relating a particular location on a screen of the touch screen input and display device;
cause conversion of a coordinate of the user touch input to an actual geographic location; and
cause display, on the touch screen input and display device, of an image relating to the actual geographic location, the image comprising image data generated by one or more cameras disposed at the actual geographic location.

17. The computerized information apparatus of claim 16, wherein at least a portion of the map graphic comprises graphical image data that has been transmitted to computerized information apparatus by a networked server apparatus via the first wireless interface, the at least portion of the map graphic selected by the network server apparatus based at least on the digitized speech.

18. The computerized information apparatus of claim 17, wherein the graphics co-processor is configured to render at least a portion of the map graphic on the touch screen input and display device.

19. The computerized information apparatus of claim 17, wherein the computerized information apparatus is further configured to generate a plurality of interactive hyperlinks displayed on the touch screen input and display device, the plurality of hyperlinks configured to each, when selected by the user, access a universal resource locator (URL) associated with an internet web server, and obtain information from the web server via the first wireless interface for display on the touch screen input and display device, at least one of the plurality of hyperlinks enabling access of information particularly relating to the actual geographic location or its immediate surroundings.

20. An integrated, environment control-enabled computerized information apparatus of a transport device, the transport device capable of movement between locations, the computerized information apparatus configured to provide a user with remote control of environment functions associated with a premises, the computerized information apparatus comprising:
data processing apparatus comprising at least a central processor and a digital signal processor (DSP) and a graphics co-processor;
a first wireless interface in data communication with at least a portion of the data processing apparatus;
a mass storage device in data communication with at least a portion of the data processing apparatus;
a data interface in data communication with at least a portion of the data processing apparatus;
radio frequency apparatus in data communication with at least a portion of the data processing apparatus;
a capacitive touch screen input and display device in data communication with at least a portion of the data processing apparatus and both viewable and accessible by the user while utilizing the transport device; and
at least one computer program operative to run on the data processing apparatus and configured to cause actuation of one or more environment control functions associated with the premises, the at least one computer program configured to, when executed, implement the method comprising:
receiving, via at least the radio frequency apparatus, data uniquely identifying a portable radio frequency device associated with the user;
based at least on the data uniquely identifying the portable radio frequency device, identifying an authorized user associated with the portable radio frequency device;
based at least on the identification of the authorized user, causing enablement of one or more functions within the transport device, the enablement of one or more functions including at least enablement of the actuation of the one or more environment control functions;
causing display on the capacitive touch screen input and display device one or more display elements corresponding to the one or more enabled environment control functions;
receiving via the capacitive touch screen input and display device at least one input corresponding to a user's tactile selection of at least one of the one or more display elements; and
causing transmission via the first wireless interface of data relating to the at least one input to cause actuation at the premises of one or more electrically controlled apparatus corresponding to the selected at least one display element; and wherein the one or more environment control functions comprise at least one of (i) a heating, ventilation, or air conditioning (HVAC) function; (ii) a lighting function; and/or (iii) an imagery monitoring function.

21. The computerized information apparatus of claim 20, wherein the at least one computer program is further configured to, when executed:
  prior to the receipt of data uniquely identifying a portable radio frequency device associated with the user, cause transmission of radio frequency energy from the radio frequency apparatus, the transmitted radio frequency energy encoding data useful in a wireless authentication process conducted between the radio frequency apparatus and the portable radio frequency device, the transmitted radio frequency energy further causing the portable radio frequency device to respond with at least the data uniquely identifying the portable radio frequency device; and
  based at least on the identification of the authorized user associated with the portable radio frequency device, enable access to a networked server via the first wireless interface, the access enabling access to information stored on the networked server that has been specifically configured for the authorized user according to a user-specific information profile, the information-specific profile established based at least in part on one or more parameters or user inputs previously provided by the user.

22. The computerized information apparatus of claim 21, wherein the at least one computer program is further configured to, when executed:
  receive at least a portion of the accessed information stored on the networked server via the first wireless interface; and
  enable a data transfer between a portable electronic device of the user via the data interface, the data transfer comprising at least a portion of the received at least portion of the accessed information, the data transfer configured to occur via data communication between an application computer program resident and operable on the portable electronic device and the computerized information apparatus, the application computer program configured to save at least a portion of the transferred data to a storage device on the portable electronic device, and enable subsequent access the stored at least portion of data for display on a display device of the portable electronic device, the display of the at least portion of the transferred data on the display device of the portable electronic device configured to occur after the user and the portable electronic device have egressed from the transport device.

23. The computerized information apparatus of claim 21, wherein:
  the one or more environment control functions comprise the imagery monitoring function;
  the electrically controlled apparatus comprises one or more video cameras; and
  the at least one computer program is further configured to, when executed:
    receive via the first wireless interface data transmitted from the premises, the data transmitted from the premises generated by the one or more video cameras and digitally compressed using a digital data compression algorithm, so as to reduce wireless transmission bandwidth requirements; and
    cause display within a display window generated on the capacitive touch screen input and display device, at least a portion of the received data transmitted from the premises.

24. An integrated, environment control-enabled computerized information apparatus of a transport device, the transport device capable of movement between locations, the computerized information apparatus configured to provide a user with remote control of one or more environment functions associated with a premises, the premises comprising at least a portion specifically associated with at least the user, the computerized information apparatus comprising:
  data processing apparatus comprising at least a central processor and a digital signal processor (DSP) and a graphics co-processor;
  a first wireless interface in data communication with at least a portion of the data processing apparatus;
  a mass storage device in data communication with at least a portion of the data processing apparatus;
  a data interface in data communication with at least a portion of the data processing apparatus;
  radio frequency apparatus in data communication with at least a portion of the data processing apparatus;
  a capacitive touch screen input and display device in data communication with at least a portion of the data processing apparatus and both viewable and accessible by the user; and
  at least one computer program operative to run on the data processing apparatus and configured to cause actuation of one or more environment control functions associated with the at least portion of the premises specific to at least the user, the at least one computer program configured to, when executed, implement the method comprising:
    receiving, via at least the radio frequency apparatus, data uniquely identifying a portable radio frequency device associated with the user, the portable radio frequency device being with a communications range of the radio frequency apparatus as determined at least in part based on actuation of a function or sensor of the transport device;
    based at least on the data uniquely identifying the portable radio frequency device, identifying an authorized user associated with the portable radio frequency device;
    based at least on the identification of the authorized user, causing enablement of one or more functions within the transport device, the enablement of one or more functions including at least enablement of the actuation of the one or more environment control functions;
    causing display on the capacitive touch screen input and display device, a map or floor plan graphic of at least the at least portion of the premises;
    receiving via the capacitive touch screen input and display device at least one input corresponding to a user's tactile selection of at least a portion of the map or floor plan graphic, the user's tactile selection to cause activation of one or more of the environment control functions within the at least portion of the premises;
    causing determination of a geographic or spatial reference associated with the user's selected at least a portion of the map or floor plan graphic; and
    causing transmission via the first wireless interface of data relating to (i) the one or more environment control functions for which activation is to be caused via the user's tactile selection; and (ii) the geographic or spatial reference, the transmitted data enabling actuation at the premises of one or more electrically controlled apparatus corresponding to the selected one or more environment control functions and associated with the geographic or spatial reference; and wherein the one or more environment control functions comprise at least one of (i) a heating, ventilation, or air conditioning (HVAC) function; (ii) a lighting function; and/or (iii) an imagery monitoring function.

25. Integrated computerized information apparatus of a transport device capable of movement between locations, the computerized information apparatus configured to automatically provide an authorized user with a plurality of user-specific control functions, the automatic provision based at least on recognition of a portable radio frequency device carried by the user by the computerized information apparatus, the computerized information apparatus comprising:

data processing apparatus comprising at least a central processor and a digital signal processor (DSP) and a graphics co-processor;

a first wireless interface in data communication with at least a portion of the data processing apparatus;

a mass storage device in data communication with at least a portion of the data processing apparatus;

radio frequency apparatus in data communication with at least a portion of the data processing apparatus;

a data interface in data communication with at least a portion of the data processing apparatus;

a capacitive touch screen input and display device in data communication with at least a portion of the data processing apparatus and both viewable and accessible by the user; and memory apparatus in data communication with at least a portion of the data processing apparatus and comprising at least one computer program operative to run on the data processing apparatus, the at least one computer program configured to, when executed:

conduct, via at least the radio frequency apparatus, an authentication process with the portable radio frequency device, the authentication process comprising transmission of radio frequency energy from the radio frequency apparatus, the transmitted radio frequency energy encoding data enabling the portable radio frequency device to identify at least one of the radio frequency apparatus and the computerized information apparatus, the transmitted radio frequency energy further configured to cause the portable radio frequency device to respond with at least the data uniquely identifying the portable radio frequency device, at least one of the encoded data enabling the portable radio frequency device to identify at least one of the radio frequency apparatus and the data uniquely identifying the portable radio frequency device comprising an encrypted protocol;

receive, via at least the radio frequency apparatus, the data uniquely identifying the portable radio frequency device;

based at least on the data uniquely identifying the portable radio frequency device, identify the authorized user of the transport device;

based at least on the identification of the authorized user, cause automated enablement of one or more functions within the transport device, the enablement of one or more functions including at least enablement of:

(i) remote actuation of the one or more environment control functions associated with a premises associated with the authorized user, the one or more environment control functions comprising at least one of (i) a heating, ventilation, or air conditioning (HVAC) function; (ii) a lighting function; and/or (iii) an imagery monitoring function; and (ii) access data stored at least in part on the computerized information apparatus, the accessed data comprising a user-specific profile or user-specific parameters previously provided by the authorized user, the accessed data enabling the computerized information apparatus to automatically configure at least one information access function of the computerized information apparatus specifically for the authorized user;

wherein the enablement of the remote actuation of the one or more environment control functions associated with a premises associated with the authorized user includes causing display on the capacitive touch screen input and display device of one or more display elements corresponding to the one or more enabled environment control functions, the one or more display elements each responsive to a user's tactile selection thereof to cause transmission by the computerized information apparatus via the first wireless interface of data relating to the tactile selection to cause actuation at the premises of one or more electrically controlled apparatus corresponding to a respective one of the one or more display elements.

26. The computerized information apparatus of claim 25, wherein the computerized information apparatus is further configured to establish a temporary data link with a portable electronic device via the data interface so as to enable data transfer between the portable electronic device and the computerized information apparatus, the data transfer between the portable electronic device and the computerized information apparatus comprising transfer of data from the computerized information apparatus to the portable electronic device that is configured so as to occur automatically when the portable electronic device establishes data communication with the computerized information apparatus via the data interface, the transferred data configured specifically for the user, the configuration specifically for the user based at least in part on data relating specifically to that user and previously stored on a remote network server apparatus, the previously stored data which relates specifically to that user and is based at least in part on one or more previously supplied user-selected configuration parameters, the transferred data only transferred after successfully performing at least authentication of the portable radio frequency device.

27. The computerized information apparatus of claim 25, further comprising computerized logic in data communication with the data processing apparatus and configured to, when executed:

receive a digitized representation of speech of the user of the transport device;

cause a first access of a network server apparatus via at least the first wireless interface to access a database comprising a plurality of words, at least a portion of the plurality of words having one or more topical contexts associated therewith, the first access comprising at least the digitized representation, the digitized representation being useful to the network server apparatus for determination of a topical context associated with the speech;

receive via at least the first wireless interface content selected by at least the network server apparatus, the content contextually related at least in part to the determined topical context associated with the speech; and cause display of at least a portion of the received content on at least the capacitive touch screen input and display device.

28. The computerized information apparatus of claim 27, wherein the speech comprises an input or query to obtain particular information which the user desires, the particular information associated with a category of information, and the determined topical context is logically independent of the category.

29. The computerized information apparatus of claim 25, further comprising computerized logic in data communication with the data processing apparatus and configured to, when executed:

receive an input from the user of the transport device via at least one of: (i) a speech input and digitization apparatus, and (ii) the capacitive touch screen input and display device, the input to obtain first information;

cause transmission of a request to a network server apparatus via at least the first wireless interface, the request comprising at least: (i) data relating to the input, and (ii) data relating to the identity of, or identifying, the authorized user;

receive via at least the first wireless interface digitally rendered content selected by at least the network server apparatus, the digitally rendered content selected based at least in part on: (i) the data relating to the authorized user, and (ii) second data accessible to the network server apparatus, the second data comprising data indicative of one or more stored information configuration parameters specific to and previously selected by the authorized user; and cause display of at least a portion of the received content on at least the capacitive touch screen input and display device.

30. The computerized information apparatus of claim 29, wherein the computerized information apparatus is further configured to generate a plurality of interactive hyperlinks displayed on the touch screen input and display device, the plurality of hyperlinks configured to each, when selected by the user, access a universal resource locator (URL) associated with an internet web server, and obtain information from the web server via the first wireless interface for display on the touch screen input and display device, at least one of the plurality of hyperlinks enabling access of information particularly relating to the actual geographic location or its immediate surroundings.

* * * * *